May 11, 1943.　　　P. L. COUFFIGNAL　　　2,318,591
APPARATUS CALLING FOR A MATERIAL REPRESENTATION OF NUMBERS
Filed March 26, 1937　　　25 Sheets-Sheet 1
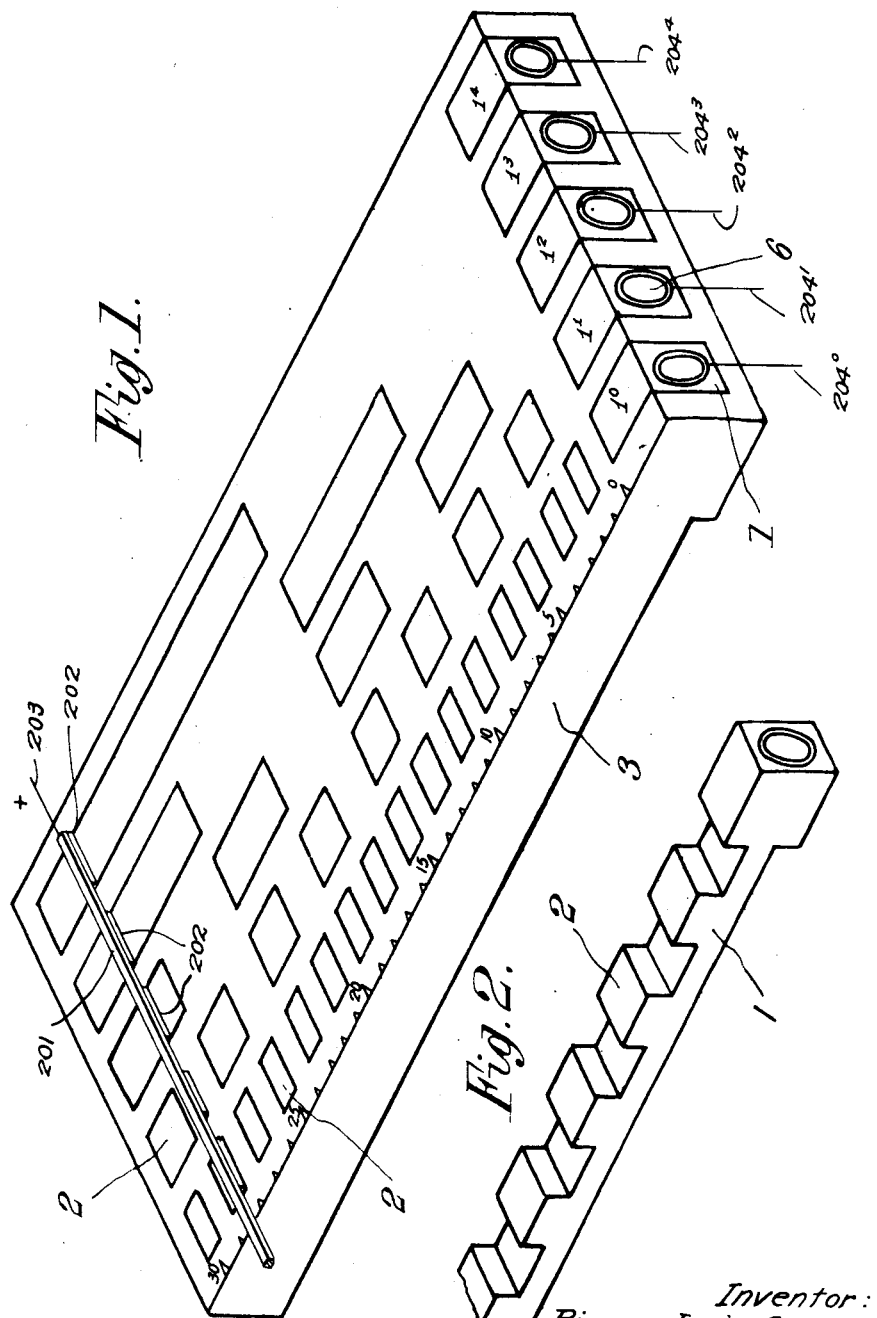
Inventor:
Pierre Louis Couffignal,
Attorneys May 11, 1943.  P. L. COUFFIGNAL  2,318,591
APPARATUS CALLING FOR A MATERIAL REPRESENTATION OF NUMBERS
Filed March 26, 1937   25 Sheets-Sheet 2
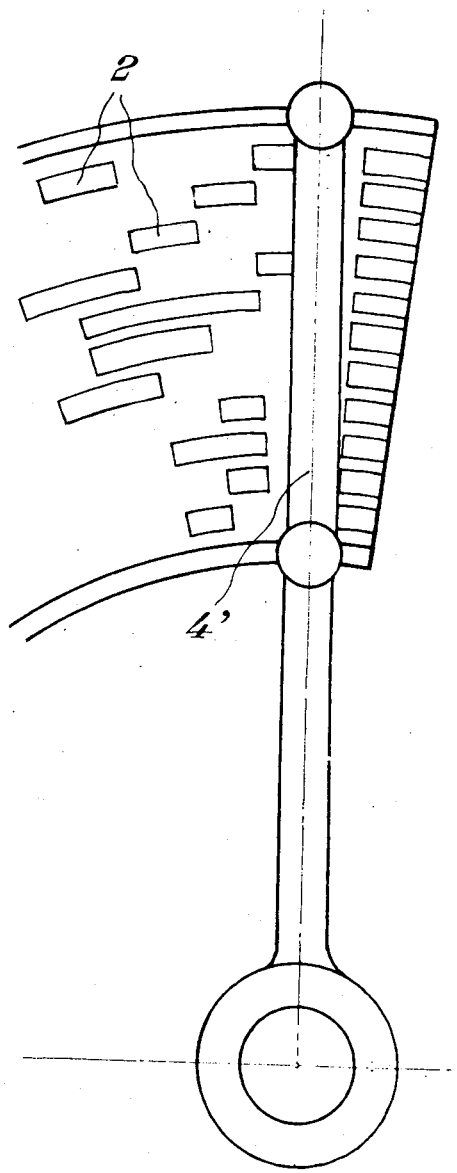
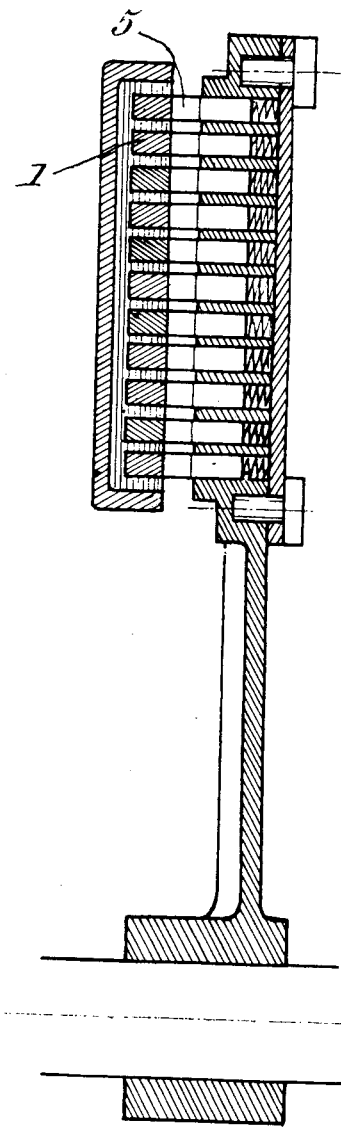
Inventor:
Pierre Louis Couffignal,
Attorneys

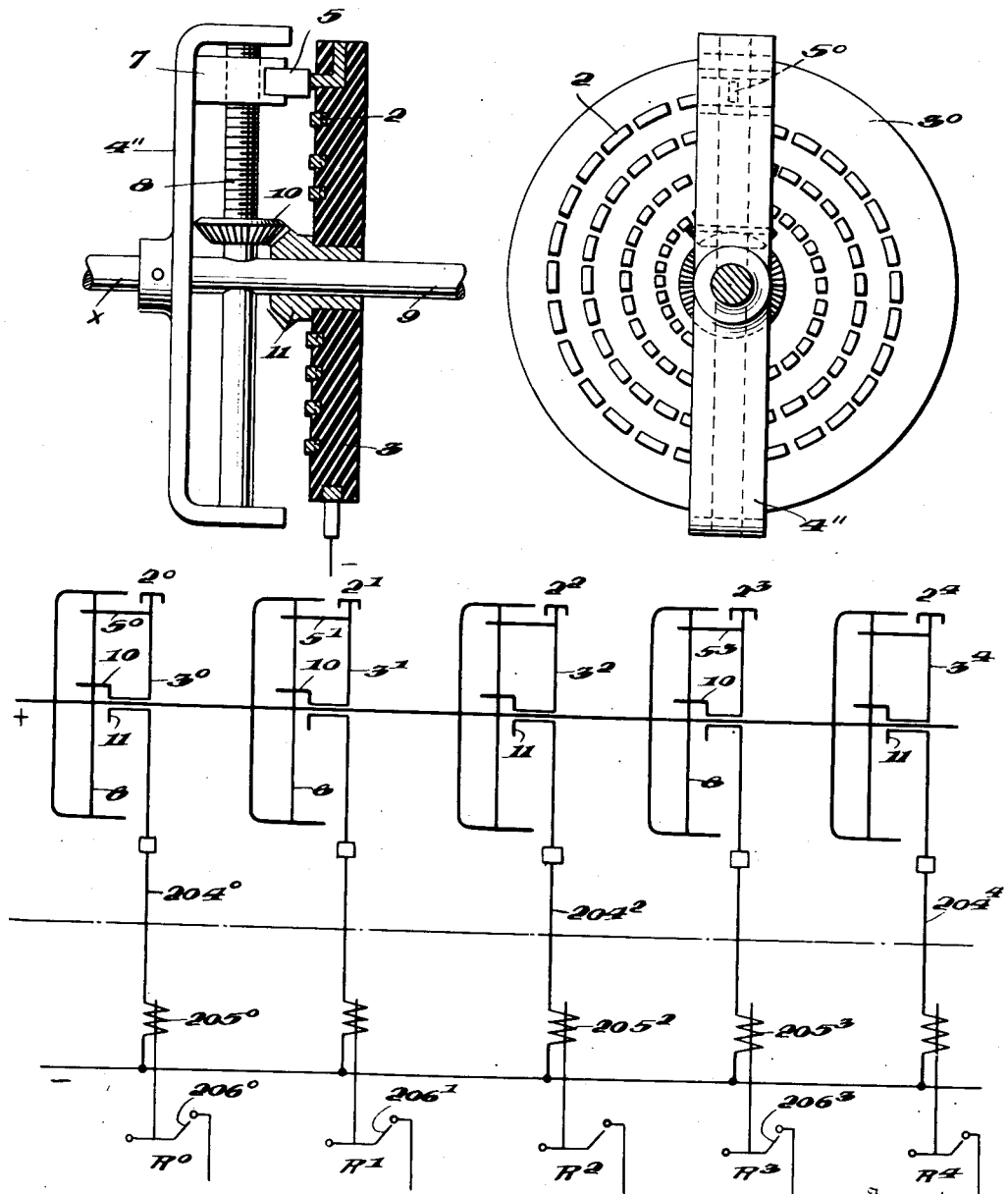

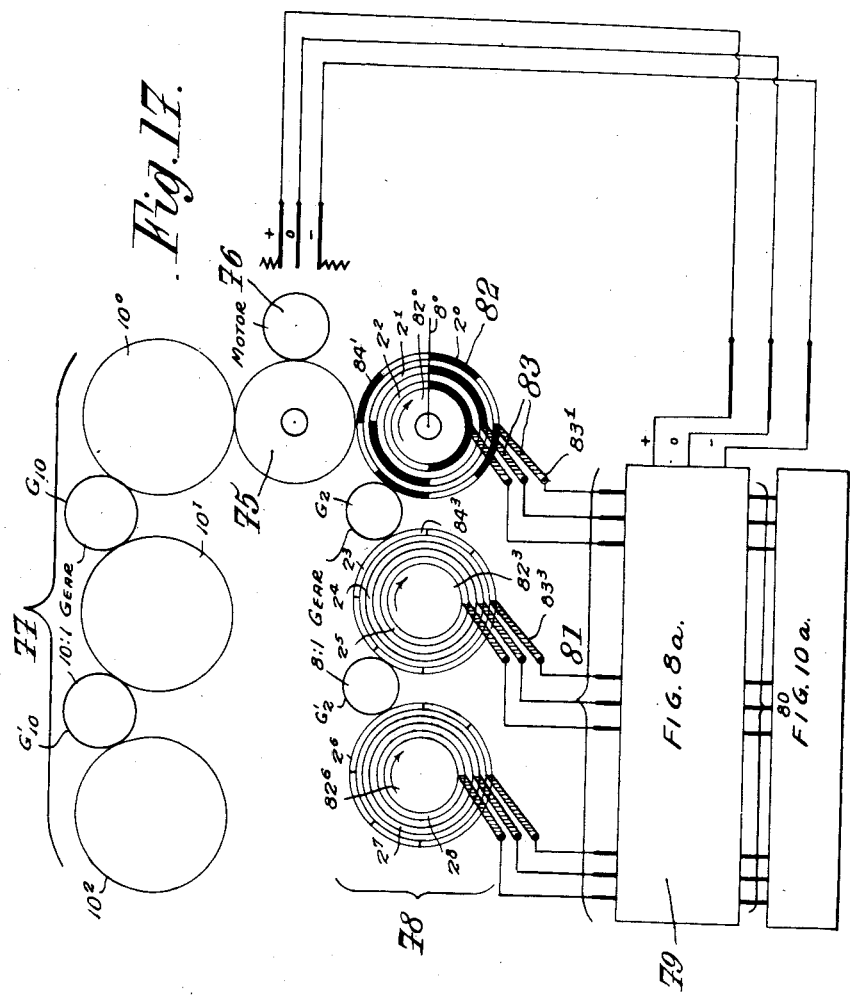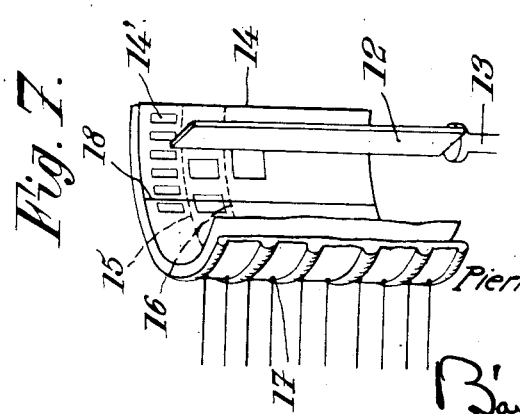

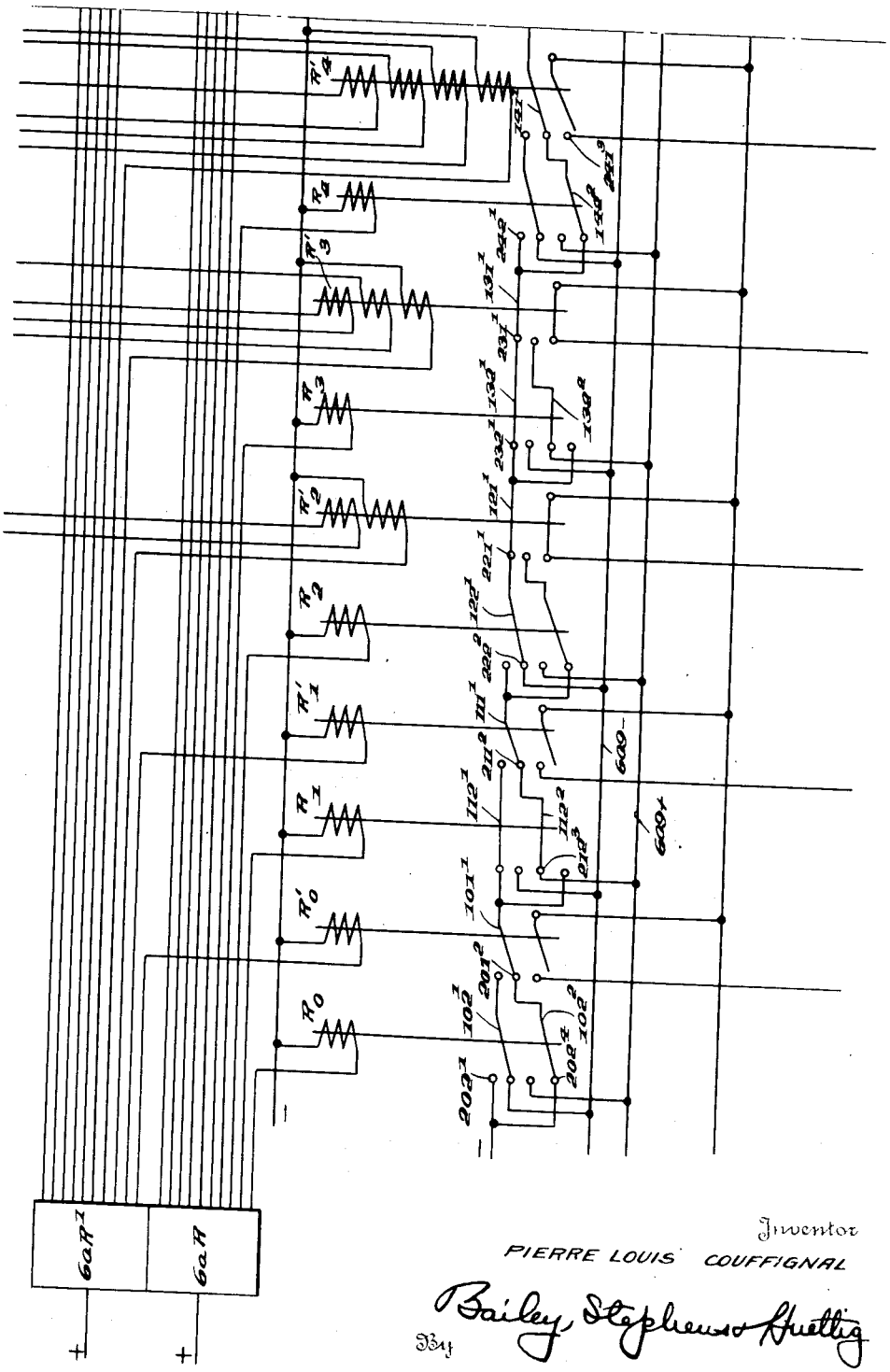

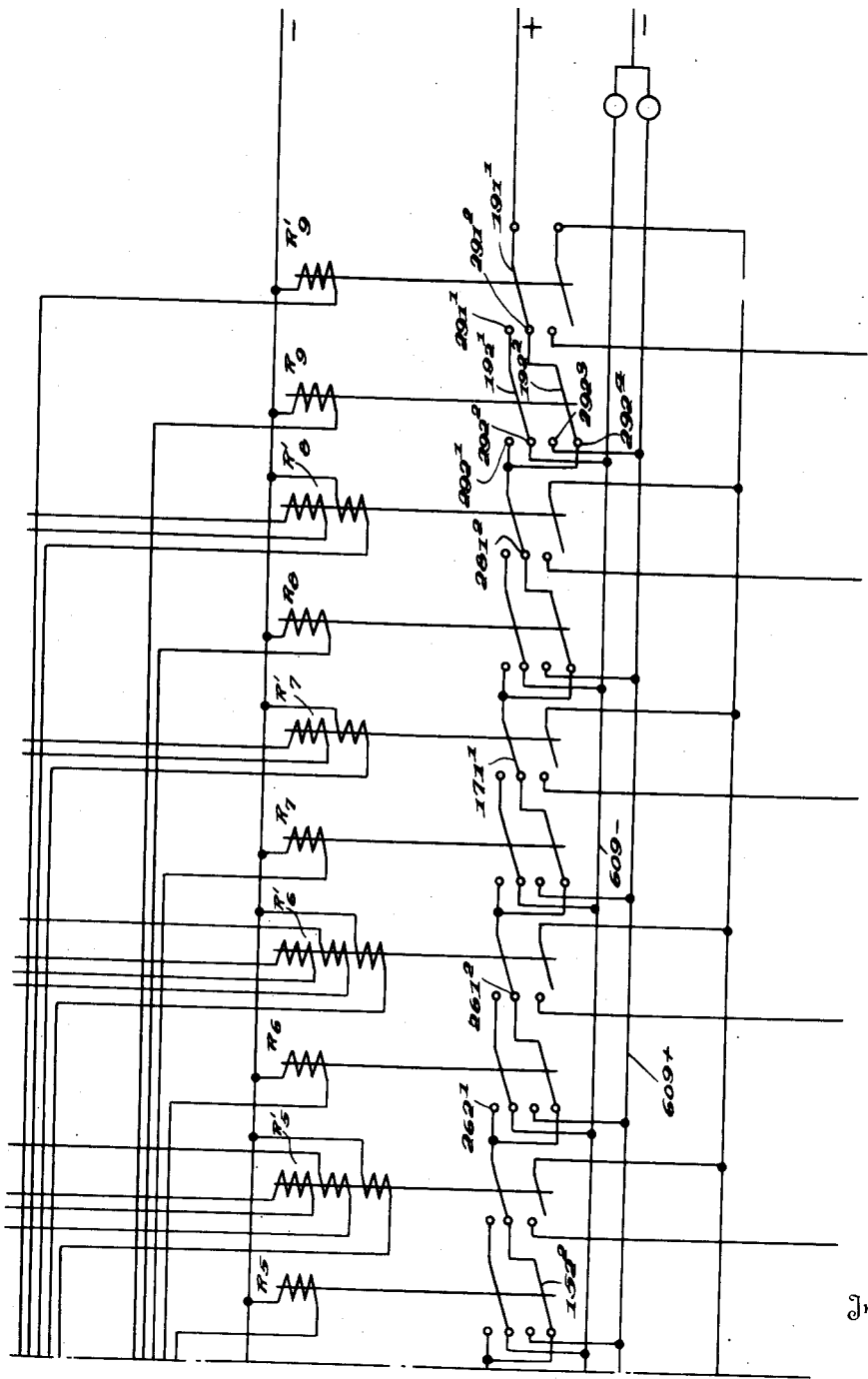

May 11, 1943.　　　P. L. COUFFIGNAL　　　2,318,591
APPARATUS CALLING FOR A MATERIAL REPRESENTATION OF NUMBERS
Filed March 26, 1937　　25 Sheets-Sheet 8
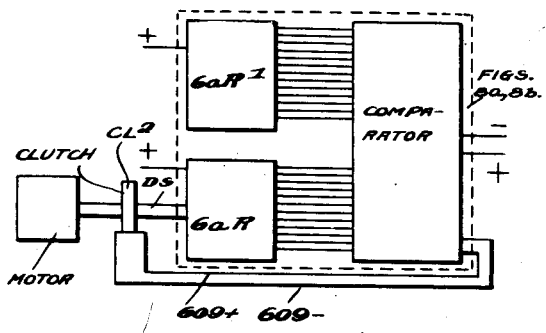
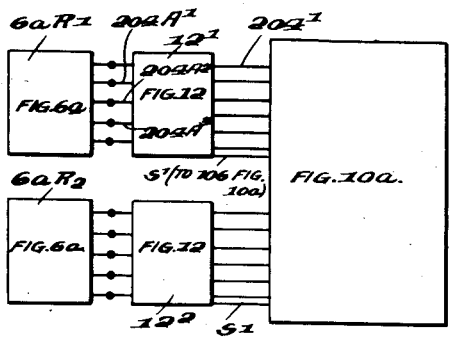
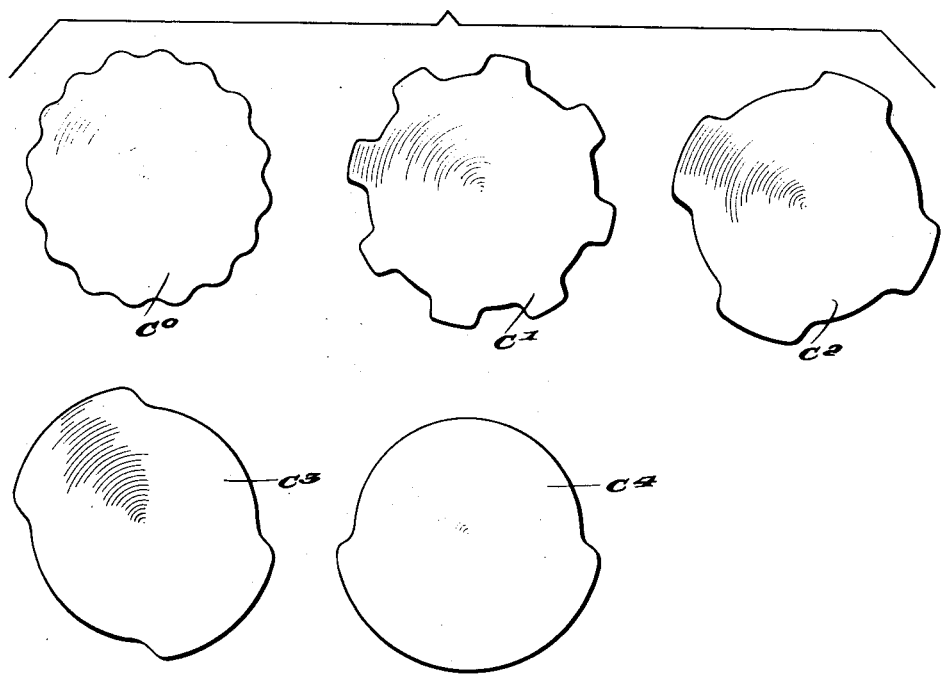
Inventor
PIERRE LOUIS COUFFIGNAL,
By Bailey, Stephens & Huettig
Attorneys

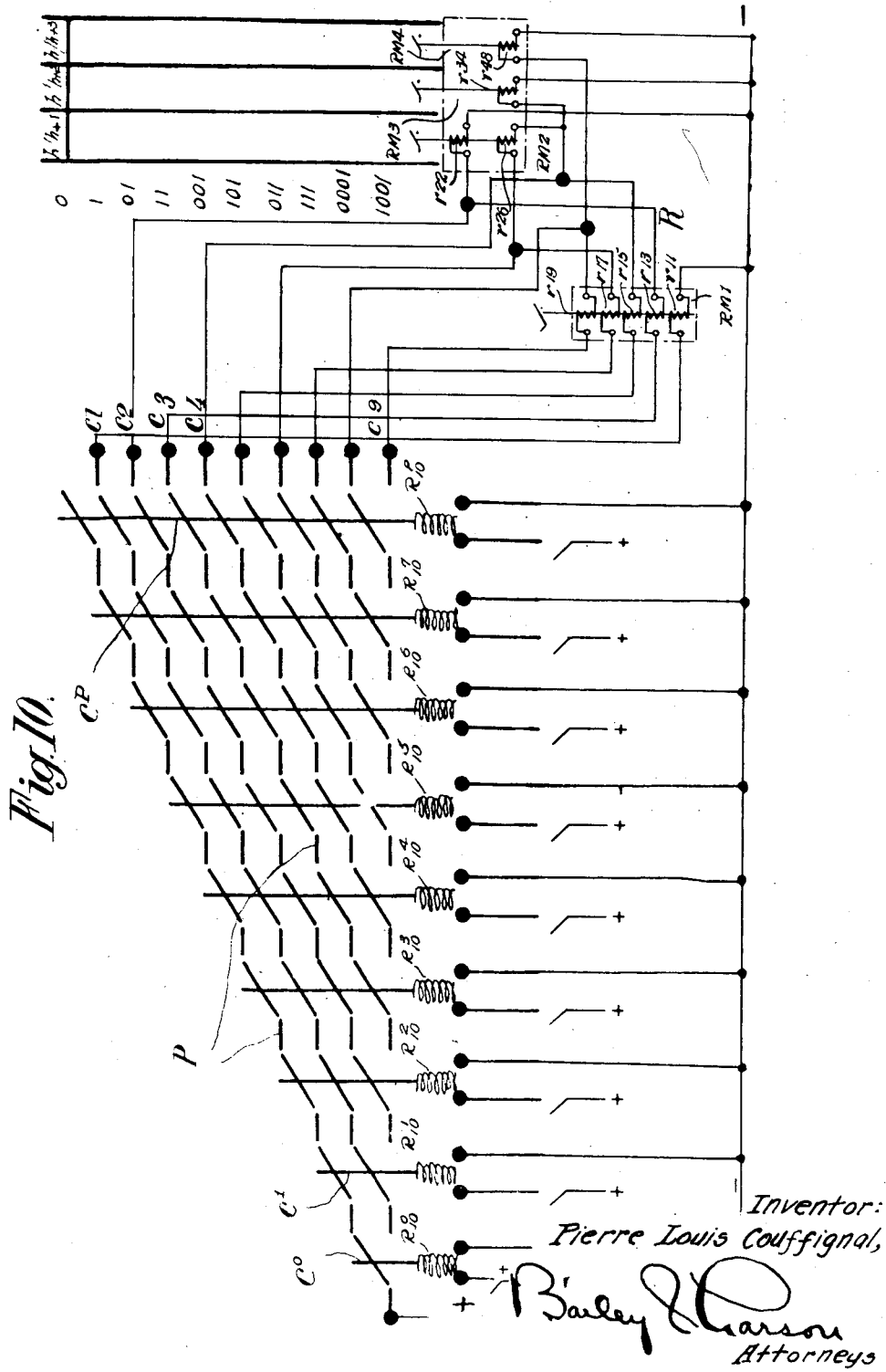

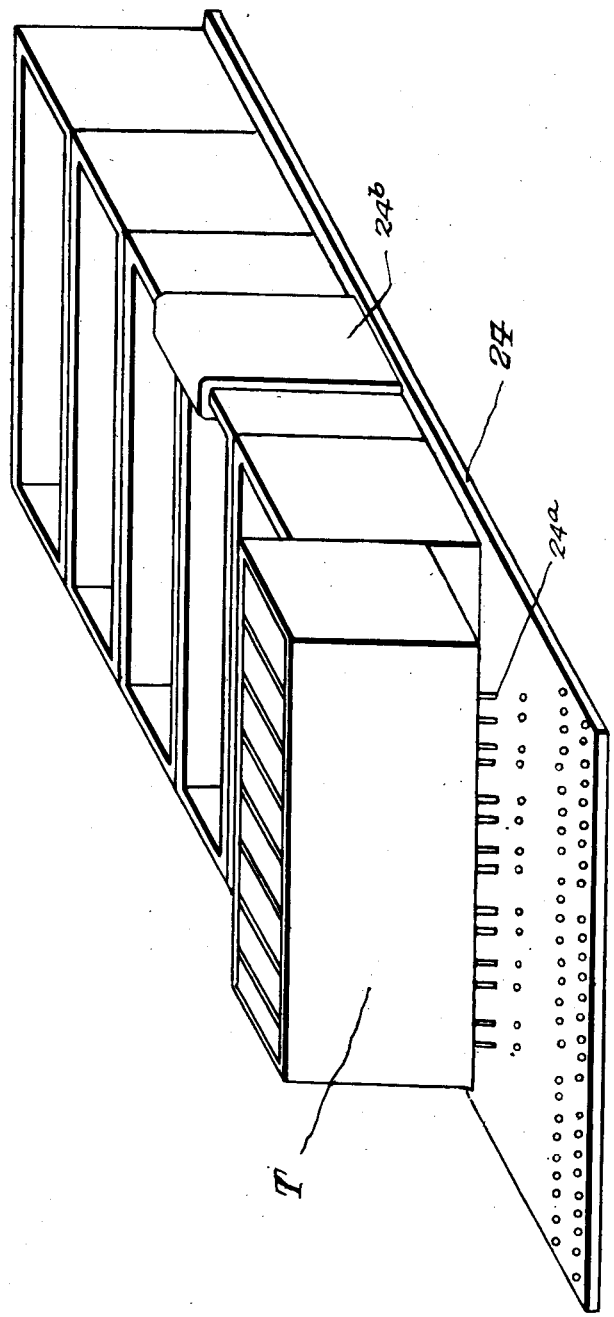

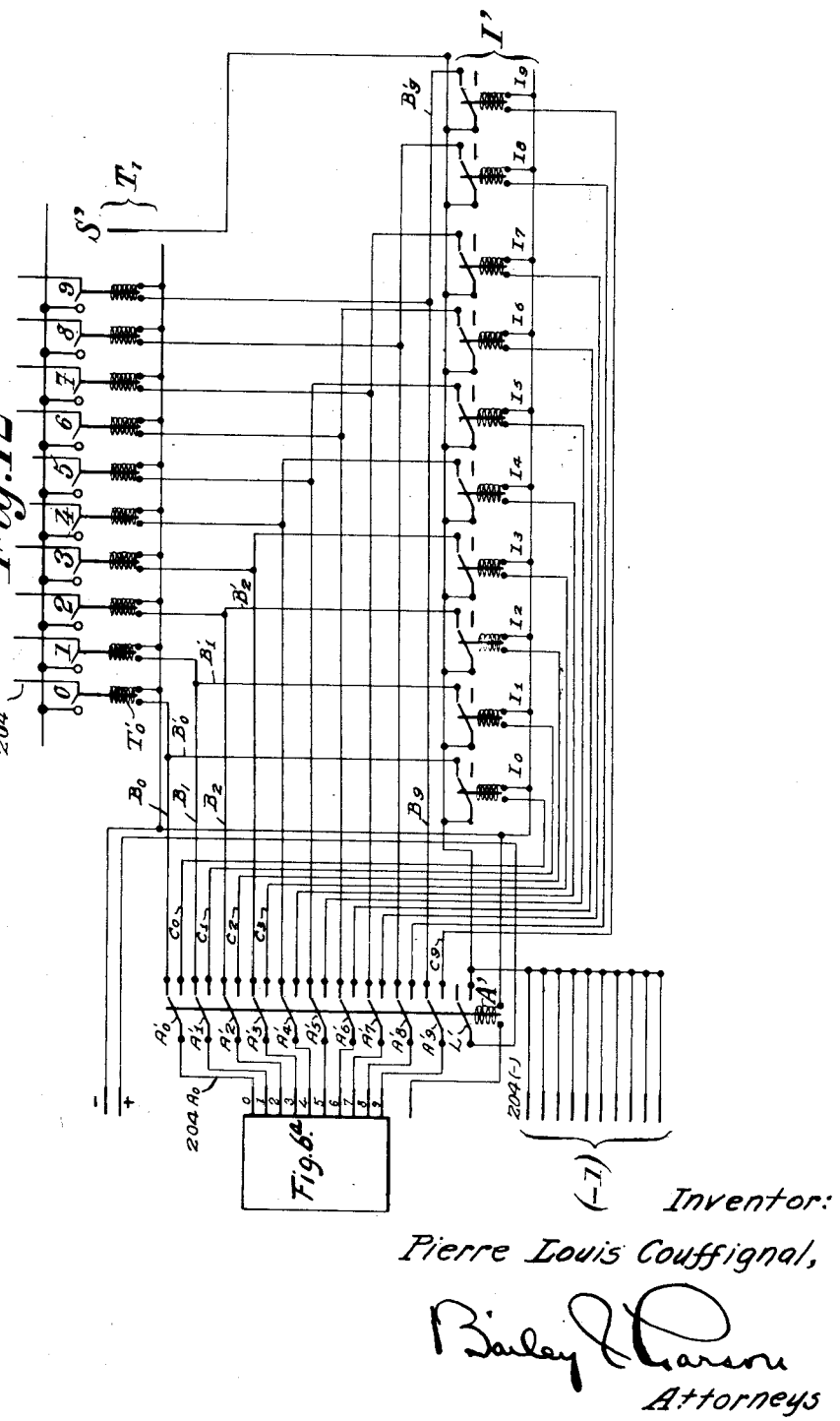

May 11, 1943. P. L. COUFFIGNAL 2,318,591
APPARATUS CALLING FOR A MATERIAL REPRESENTATION OF NUMBERS
Filed March 26, 1937 25 Sheets-Sheet 14
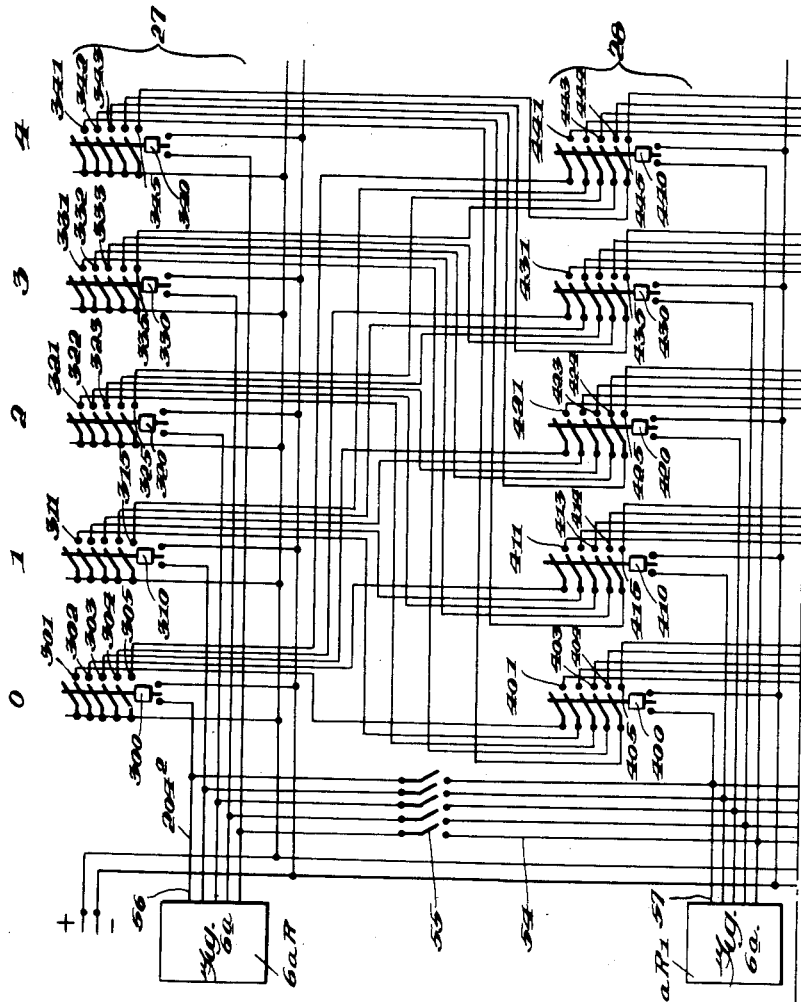
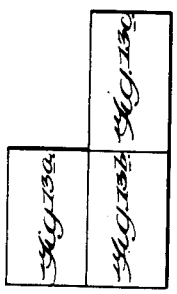
Inventor
PIERRE LOUIS COUFFIGNAL,
By Bailey, Stephens & Huettig
Attorneys

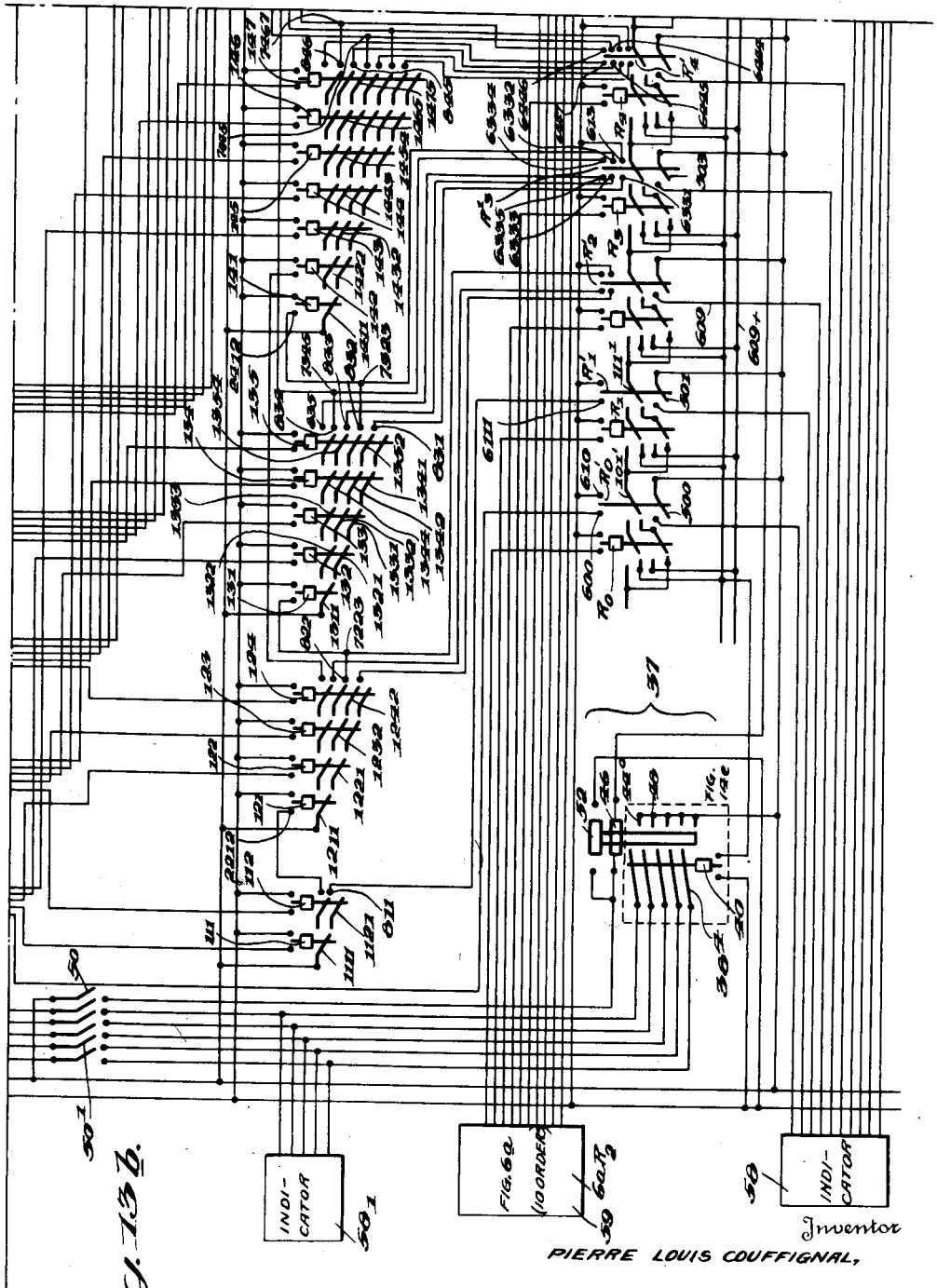

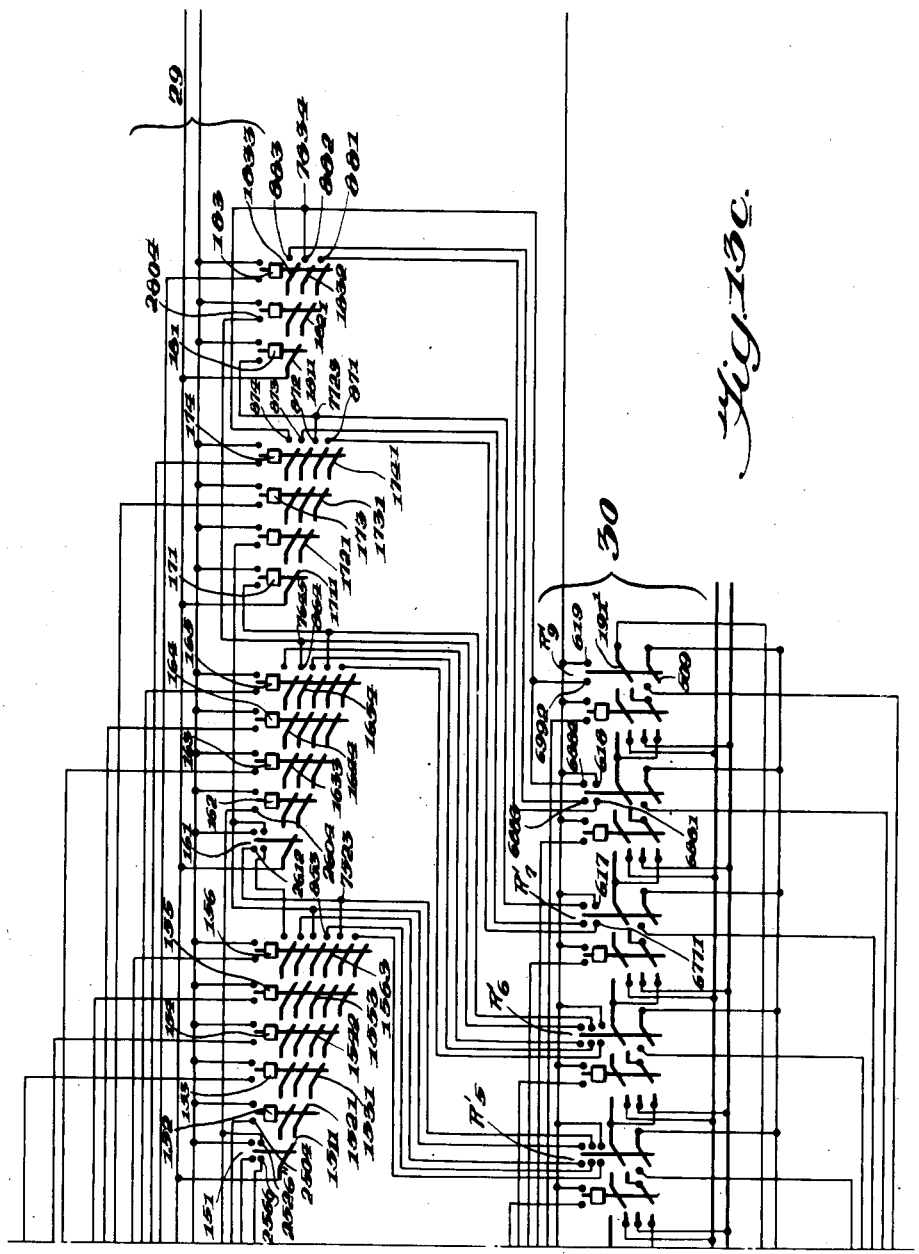

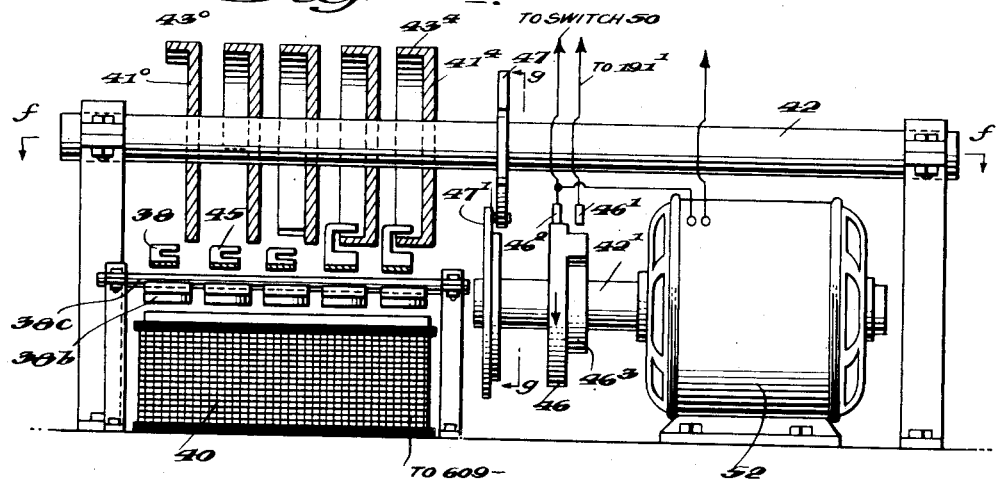

May 11, 1943.    P. L. COUFFIGNAL    2,318,591
APPARATUS CALLING FOR A MATERIAL REPRESENTATION OF NUMBERS
Filed March 26, 1937    25 Sheets-Sheet 18
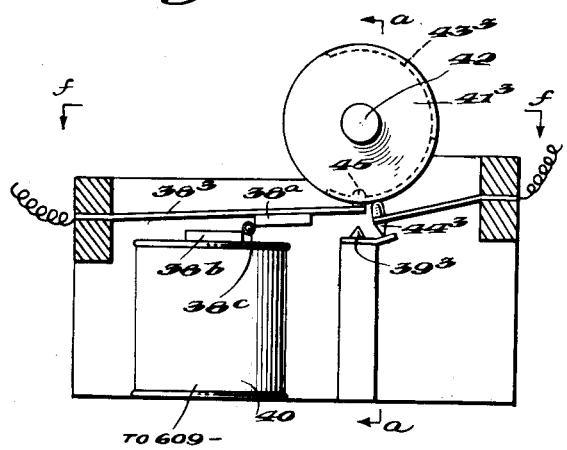
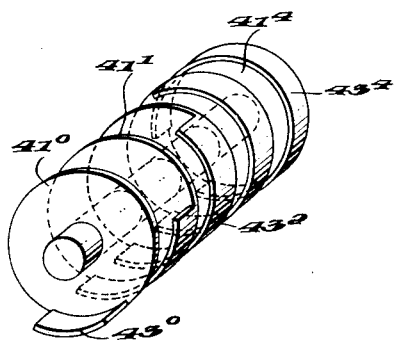
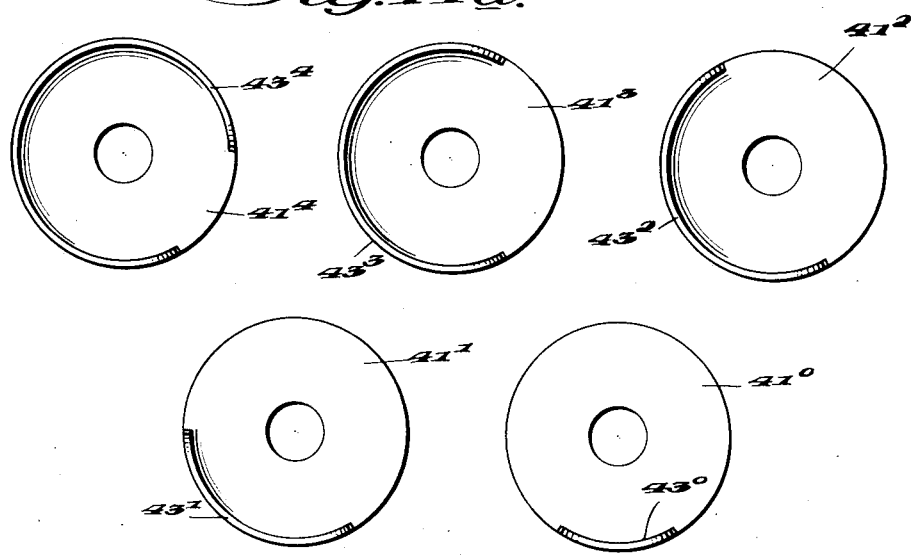
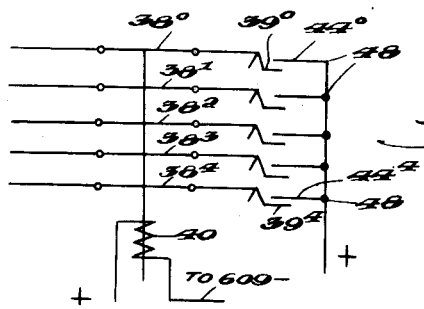
Inventor
PIERRE LOUIS COUFFIGNAL,
By Bailey, Stephens & Huettig
Attorneys

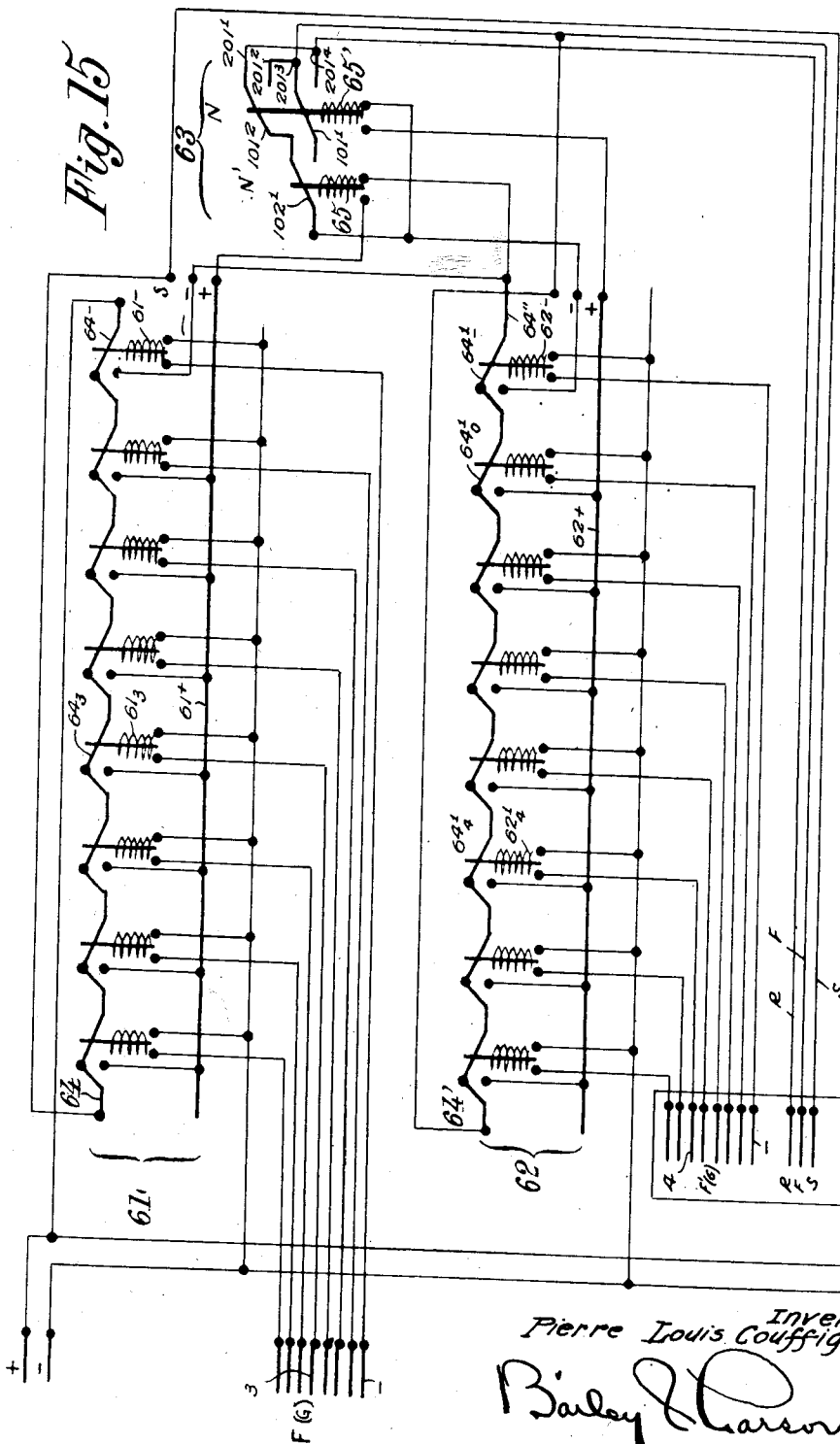

May 11, 1943.    P. L. COUFFIGNAL    2,318,591
APPARATUS CALLING FOR A MATERIAL REPRESENTATION OF NUMBERS
Filed March 26, 1937    25 Sheets-Sheet 20
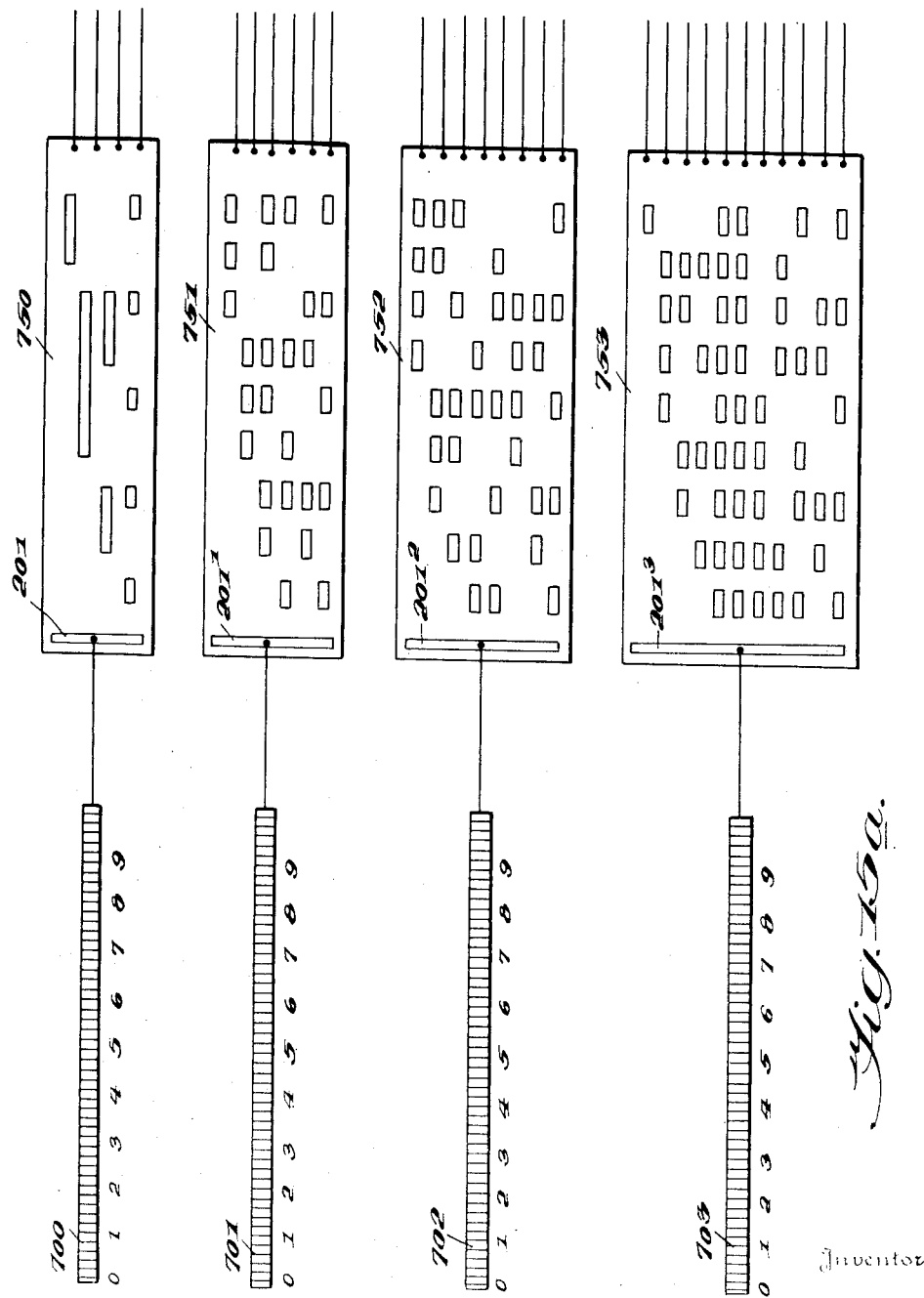

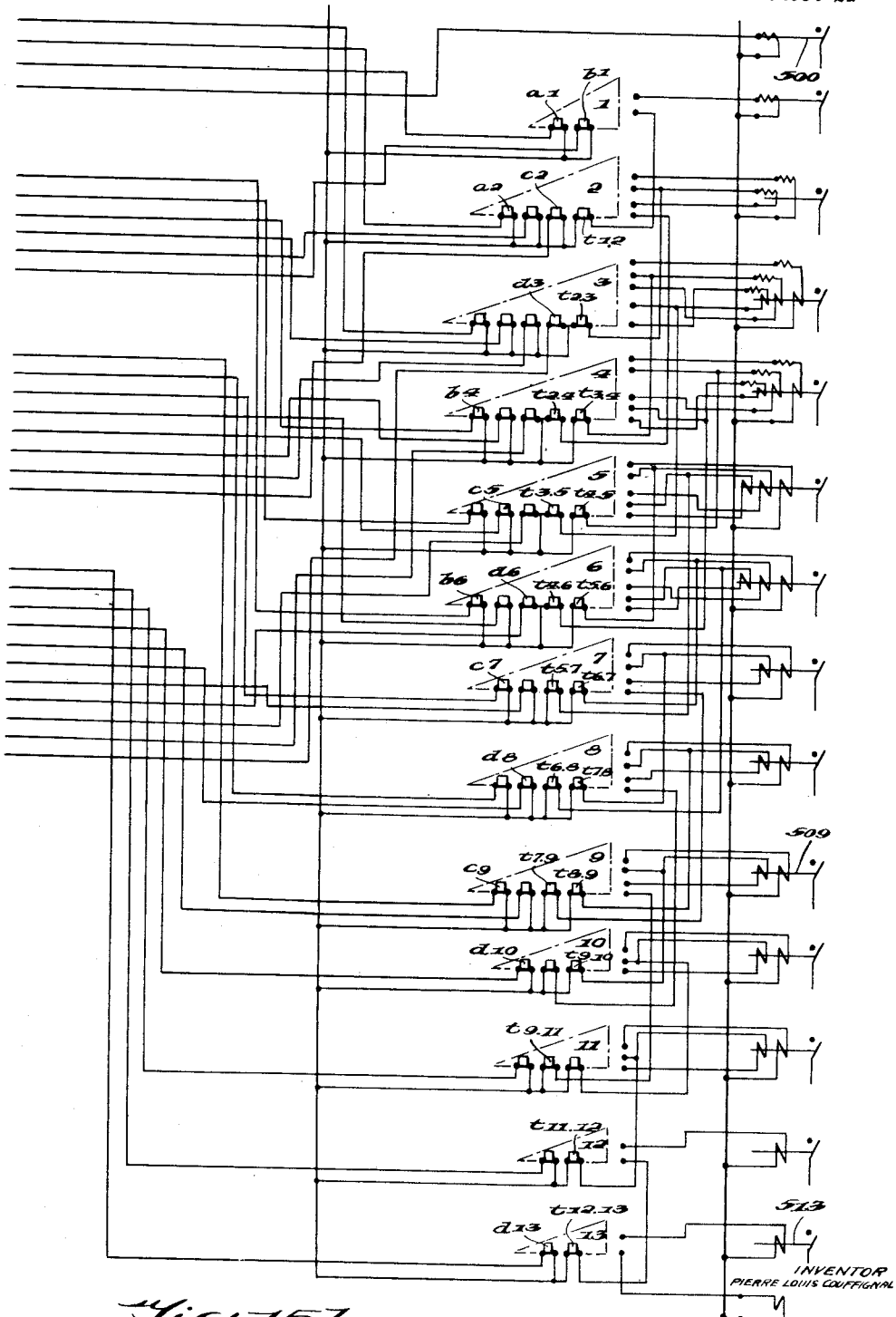

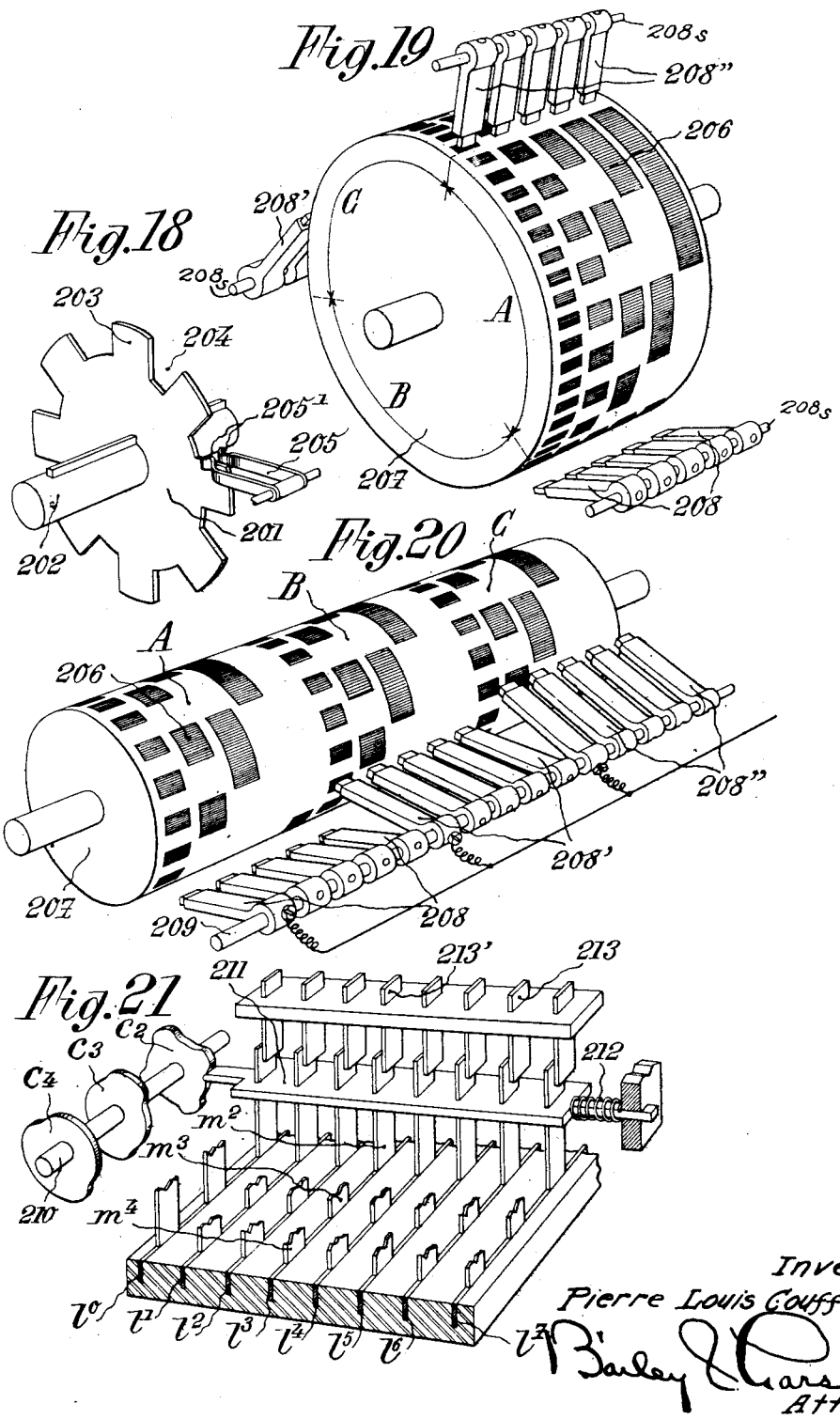

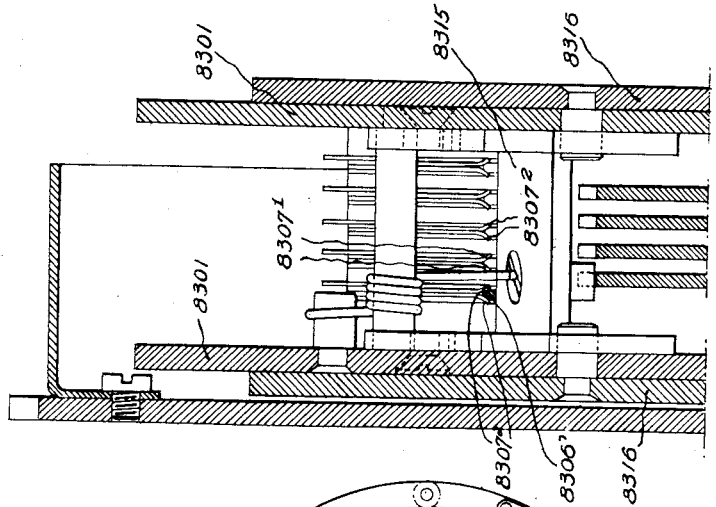
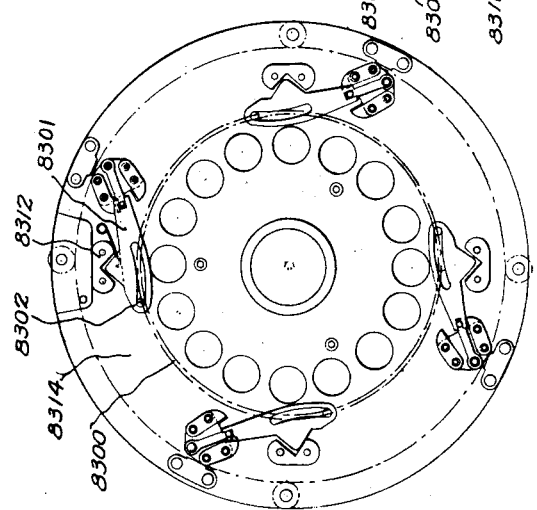
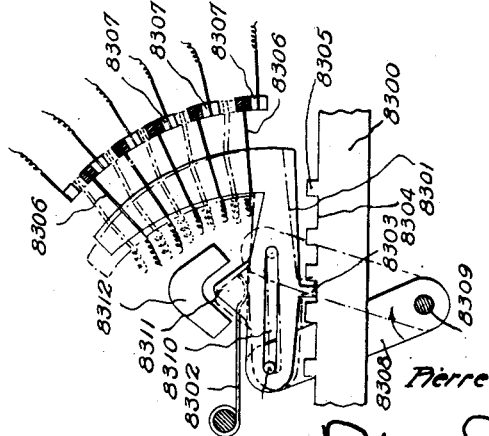

May 11, 1943.   P. L. COUFFIGNAL   2,318,591
APPARATUS CALLING FOR A MATERIAL REPRESENTATION OF NUMBERS
Filed March 26, 1937    25 Sheets-Sheet 25

Inventor
PIERRE LOUIS COUFFIGNAL,
By Bailey, Stephenson & Huettig
Attorneys

Patented May 11, 1943

2,318,591

UNITED STATES PATENT OFFICE 2,318,591

APPARATUS CALLING FOR A MATERIAL REPRESENTATION OF NUMBERS

Pierre Louis Couffignal, Brest, Finistere, France; vested in the Alien Property Custodian Application March 26, 1937, Serial No. 133,276
In Belgium March 27, 1936

13 Claims. (Cl. 235—61)

The present invention relates to apparatus such as telecontrol devices, teletype devices, automatic telephone devices, etc., calling for a material representation of numbers, and it is more especially, although not exclusively, concerned, among these apparatus, with calculating apparatus, and in particular such devices of the electric type, that is to say all apparatus capable of solving operations or problems of an arithmetic nature, or of an algebraic nature, the data of which are introduced either automatically or not into said apparatus.

The chief object of the present invention is to provide apparatus of this kind which are better adapted to meet the requirements of practice, and especially which occupy less room.

The essential feature of the present invention consists in providing said apparatus with devices capable of representing, in the binary arithmetic system, at least some of the numbers that are to be materialized by said apparatus.

Other features of the present invention will result from the following detailed description of some specific embodiments thereof.

Preferred embodiments of the present invention will be hereinafter described, with reference to the accompanying drawings, given merely by way of example, and in which:

Fig. 1 shows, in perspective view, an apparatus for representing a portion of the sequence of numbers, this apparatus being made according to the invention;

Fig. 2 shows, also in perspective, an element of said apparatus;

Figs. 3 and 4 are partial views showing, in plan and in axial section respectively, a modification of said apparatus;

Figs. 5a, 5b, 5c, 5d and 5e are side views of the various discs of a modified form of device for five different orders.

Fig. 6 is a cross section through one of the discs, such as disc 5a.

Fig. 6a is a diagrammatic drawing of a mechanism embodying five discs according to Fig. 6, and showing the electrical connections therefor.

Fig. 7 shows, with some parts cut away, an apparatus for representing a part of the sequence of numbers, this apparatus being made according to another embodiment of the invention;

Figs. 8a and 8b are the left and right hand sides respectively of the wiring of the mechanism according to Fig. 8, and showing additional features.

Fig. 8c shows diagrammatically a controlled reading device.

Fig. 10 is a diagrammatic showing of an addition triangle.

Fig. 11 is a perspective view of an apparatus for performing additions.

Fig. 12 is a diagram of an apparatus capable of use in effecting algebraic sums, or in carrying out both addition and subtraction.

Fig. 12a shows a connected series of devices using the mechanism of Fig. 12.

Figs. 13a, 13b and 13c are diagrammatic showings of portions of a mechanism capable of carrying out multiplications, divisions and square roots; Fig. 13d shows the arrangement and relation of these three figures in a single mechanism.

Figs. 14a, 14b and 14c show, in axial section on line $a$—$a$ of Fig. 14b, in end view and in perspective respectively, certain parts of apparatus according to the invention;

Fig. 14d shows the wheels or drums $41^0$ to $41^4$ of five different orders in side elevation.

Fig. 14e is a diagrammatic showing of the electrical connections of the mechanisms of Figs. 14a to 14d.

Figs. 14f and 14g are cross sections on the lines $f$—$f$ and $g$—$g$ respectively of Fig. 14a.

Fig. 15 shows a device for the solution of equations with one variable.

Figs. 15a and 15b show two parts of a mechanism for translating a number in the decimal system into the binary system.

Figs. 16 and 17 show two mechanisms for translating a number from the binary system to the decimal system.

Fig. 18 shows, in perspective view, an element of an electric binary reading device made according to the invention;

Figs. 19 and 20 show, also in perspective view, electric binary reading devices made according to other embodiments of the invention, respectively;

Fig. 21 shows, in perspective view, groups of members intended for a multiplication mechanism;

Fig. 22 shows in side elevation the cams $c^0$ to $c^4$ of Fig. 21 for five orders.

Fig. 23 shows, in a diagrammatic manner, certain elements of an apparatus for effecting additions;

Fig. 24 shows another embodiment of these elements;

Fig. 25 shows, on an enlarged scale, a modification of some of these elements;

Figure 5B:
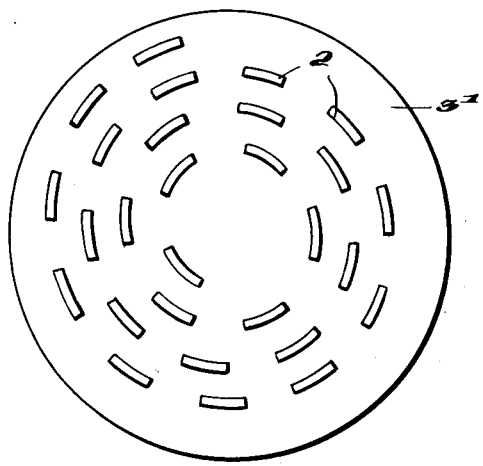
Figure 5C:
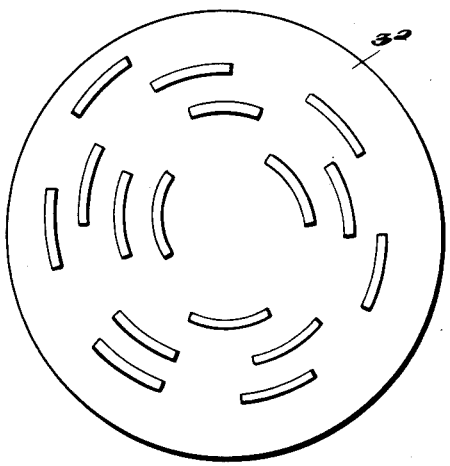
Figure 5D:
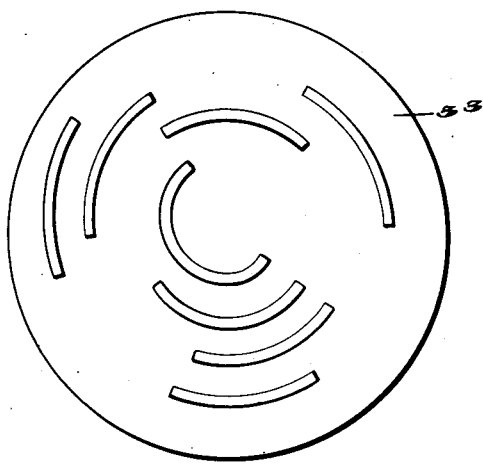
Figure 5E:
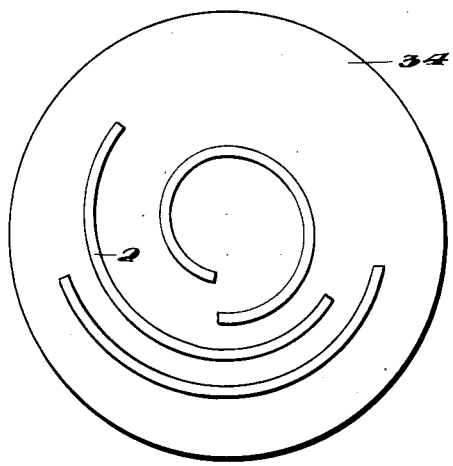

As a rule, in calculating machines, the numbers considered in the calculations have been shown in the decimal system, in which each order (units, tens, hundreds, etc.) is measured by a numerical coefficient corresponding to one of the digits from 0 to 9. These apparatus must therefore include, for designating each decimal order, a group of members capable of occupying ten different relative positions corresponding respectively to one of the coefficients 0, 1, 2, 3 . . . 9. Such apparatus occupy a space which may become very large when said apparatus are intended to effect operations on factors which contain a large number of digits. Furthermore, the rapidity of operation of these apparatus is necessarily limited since, in order to represent each decimal order, it is necessary to employ at least one movable element capable of occupying ten different positions, the passage from one position to another requiring a substantial period of time, especially when it is considered that all these periods of time are added together when the operation includes a series of elementary operations relating to different orders respectively.

According to the present invention, the apparatus in question are provided with devices capable of representing in the binary arithmetic system the numbers involved in at least some of the operations or problems to be solved by the apparatus.

It is known that a number N is represented in the binary arithmetic system by the following formula:

$$N = a_0 + a_1.2 + a_2.2^2 + \ldots + a_p.2^p$$

in which $a_0, a_1, a_2 \ldots a_p$ are coefficients smaller than the number 2; so that the only figures in the binary arithmetic system are 0 and 1. For instance, number 143, which can be written:

$$143 = 1 + 1.2 + 1.2^2 + 1.2^3 + 1.2^7$$

is written: 11110001 in the binary system, the orders increasing from left to right.

Throughout the present description this practise will be followed, of writing the binary numbers in the opposite order from decimal numbers; although it is of course obvious that this is not essential in practising the invention.

Therefore it follows that the expression, in the binary system, of a given number involves a maximum power of 2 which is higher than the maximum power of 10 necessary for expressing the same number in the decimal system. Therefore, a greater number (at most four or five times more) of figures is necessary for expressing a number in the binary system than for expressing it in the decimal system. But, on the other hand, in order to obtain a material representation of the numbers of a sequence by means of a numeral device, it is necessary to provide this numeral device in such manner that a greater number of elements or of different positions of each element is available if this numeral device is intended to represent numbers in the decimal system than if it is intended to represent the same numbers in the binary system, because the only figures of this binary system are 0 and 1.

For instance, in order to be able to represent all the numbers from 0 to 999, the number of different members or of different positions of the same member that is necessary is twenty-seven in the decimal system and merely ten in the binary system, the cipher 0 being characterized by the absence of any member.

Concerning now the devices that are to make it possible to represent a number in the binary system, they will be made in such manner that, for each binary order, they are capable of producing two different "circumstances," corresponding respectively to coefficients 0 and 1.

The expression "two different circumstances" may designate, for instance:

Two different positions of a movable member with reference to a stationary member;

Or two different phenomena;

Or again two phenomena of the same nature and of different intensities;

Or the production of a phenomenon and the absence of said phenomenon, respectively;

Or again, in a general manner, the two terms of an alternative.

For instance, I may, for this purpose, as will be hereinafter supposed, cause said phenomena to coact with a source of electric current, the two above mentioned "different circumstances" being then obtained:

One by the flow of an electric current, which is supposed to correspond, for instance, to coefficient 1, And the other, corresponding to coefficient zero, by the absence of said current.

It is sufficient, in this case, in order to identify each binary order, to have recourse to an electric circuit provided with a switch in such manner that the two different circumstances above referred to can be produced at will. In the following description, such a circuit arrangement will be called "numeral circuit."

It will be readily understood that the operation of calculating apparatus provided with such devices is extremely quick, the identification of the various binary orders being produced by the making or the breaking of a circuit, these operations being practically instantaneous.

On the other hand, the volume occupied by said apparatus is considerably reduced since the identification of each binary order requires but a single switch and the number of the members (in the present case said members are switches) necessary for representing the numbers of a given sequence is smaller if this representation is made in the binary system than if it is made in the decimal system.

Of course, said devices can be made in many different manners, their structure and their arrangement depending upon the type of calculation that the apparatus must be capable of effecting.

For the sake of clarity, I will examine successively and by way of example, the electric apparatus capable of solving, by means of the binary system, a certain number of elementary problems which are met with in most of the calculations for which it is of advantage to have recourse to a calculating apparatus.

I.—*Representation of a number*

It has been explained above that, in order to identify a binary order, use is made of a numeral circuit. It is therefore necessary, in order to identify the various binary orders of a given number, to provide as many numeral circuits as there are orders to be identified. Such a system of numeral circuits will be called "binary numeral device."

When the current flowing through said numeral circuits is too low for displacing mechanical members of a certain size, and also in the case in which it is desired that the arrangement of the circuits of a binary numeral device should influence the state of one or several other circuits, I find that it is advantageous to associate with each of said numeral circuits an electric relay capable of modifying the state either of another electric circuit through which a higher current is flowing or of the other circuits that are considered. The whole of the numeral circuits and their relays then constitutes a relay numeral device. Concerning negative numbers, they are advantageously represented in the following manner:

I represent the number complementary of their absolute value, this number being obtained by replacing, in the negative number, as far as the figure of $p$ order, 0 by 1 and 1 by 0 and adding one to the number thus obtained, when said negative number has no figure of an order higher than $p$, and I provide a special circuit, called "sign circuit" which will be hereinafter described in a more explicit manner.

For example, the number $-9$ might be written in the binary system as: $-10010$. According to the procedure set forth in the preceding paragraph, the 0 is replaced by 1 and vice versa in all orders up to the highest significant order (in this case the 3 order, which is the highest in which the coefficient 1 occurs), and then adding 1 as follows:

```
 01100
     1
 -----
 11100
``` which represents 7, the complement of 9 (since $2^4=16$).

II.—*Translation into the binary system of the value of a dimensioned variable*

By "dimensioned variable" I mean a variable the value of which is determined by the position of an index or the like with respect to a scale, either real or virtual.

According to my invention, I provide an apparatus capable of giving, for every value of a dimensioned variable, the representation of this variable numbered in the binary system. In the following description, such an apparatus will be called "electric reading device."

Such a device essentially includes a binary numeral device adapted to cooperate with a movable contact member, the dimensioned value of the variable being received, for instance, from a recording or registering apparatus or again by direct reading and its numbered value being eventually transmitted to calculation apparatus.

I may, for this purpose make use of one of the devices shown by Figs. 1 to 6, these embodiments concerning, by way of example, the translation into the binary system of the numbers of a sequence, every number corresponding to a given position of a slider or the like.

According to the first of these embodiments, illustrated by Figs. 1 and 2, the numeral circuits of said binary numeral device include small metallic rules or bars 1 (identified as $1^0$ to $1^4$ for the zero to fourth orders) which are provided with teeth 2 the size and spacing of which depend upon the order of the numeral circuit that is considered.

These bars are arranged parallel to one another and they are embedded in a block of an insulating material 3 in such manner that the teeth are flush with the surface of said block, the whole constituting the "binary numeral device."

The exposed portions of the bars in each order $p$ then represent $1 \cdot 2^p$, while the unexposed portions represent $0 \cdot 2^p$.

It will be noted that the contact spaces of each bar from $1^0$ to $1^4$ are each of one-half the width of the contacts of the next succeeding order, so that the single contact shown of bar $1^4$ is equal in length to 16 of the contacts of the bar $1^0$. As is also shown the contacts in each order are spaced apart by spaces equal to their widths. The contacts of each order overlie the second contact of each pair starting from the right (or zero point) of the next lower order, and the space between that contact of the lower order and the first contact of the same pair.

I further provide a movable contact member the positions of which correspond to different values of the dimensioned variable (in this particular case to the different numbers of a sequence). This movable contact member consists for instance of a slider 201 provided with as many brushes 202 as there are bars 1, these brushes being connected to a current inlet 203, in such manner that, whenever they come into contact with a tooth, the current flows through the corresponding bar 1, leaving the end of said bar through wires $204^0$ to $204^4$ so as to cooperate, for instance, with a calculation apparatus.

It should be noted that, in view of the fact that teeth 2 and the brushes have a certain thickness, current can flow from the time when the brush begins to touch a tooth until the time when it has wholly cleared said tooth. It is therefore necessary, in order to ensure an accurate correspondence between the positions of the movable contact member and the representation of the numbered variable in the binary system, to comply with the following conditions:

a. On the one hand the position of the axes of the teeth and hollows of a bar must be determined in accordance with the position of the marks of the scale of the recording apparatus with which the electric reading apparatus is to coact;

b. On the other hand, the width of the hollows must be greater than that of the teeth by an amount equal to twice the width of the brush.

Each position of the brush as it moves along from right to left on the surface of the block 3 then represents a different number, and energizes those bars of the orders in which the value of the coefficient is 1. The mechanism shown in Fig. 1 has five orders, from 0 to 4, and therefore is capable of representing all numbers in the decimal system up to 31. For instance, in the position of the brush actually shown in Fig. 1, it is in contact with the exposed portions of the blocks of the 0, 2, 3 and 4 orders. This position of the brush therefore represents $$1 \cdot 2^0 + 1 \cdot 2^2 + 1 \cdot 2^3 + 1 \cdot 2^4,$$

or, in the decimal system, 29.

In the embodiment of Figs. 3 and 4, bars 1 are made of circular shape and they are arranged concentrically. The brushes are fitted on a rotary arm 4' in such manner that each brush 5 moves along the corresponding bar 1.

In the third embodiment, illustrated by Figs. 5a to 5e, 6 and 6a, each element 1 is mounted along a spiral path, in order to increase the capacity of the electric reading device for a given size thereof. These elements 1 are embedded in as many insulating blocks 3 as there are orders.

Figs. 5a to 5e show the different discs for each order from 0 to 4, and it will be noted that the arrangement and spacing of the contacts or teeth to in these discs corresponds to that of the bars 1 in Fig. 1.

The movable contacting element includes brushes $5^0$ to $5^4$, each brush being mounted for movement with a rotating arm 4'' to which it is connected through a nut 7 capable of moving along a threaded rod 8 running between the ends of said arm.

In order to control the combined rotations of the various brushes along the spiral-shaped elements 1, I make use of a driving shaft 9 capable of driving in rotation the various arms 4'', a bevel pinion 10 rigid with each threaded rod 8 coacting with another bevel pinion 11 rigid with the corresponding insulating block, so as to produce the displacements of said brushes.

Fig. 6a shows diagrammatically the arrangement of these five discs on a single shaft. Obviously as the shaft is turned more and more it represents higher and higher numbers, and by increasing the number of discs the highest number which the device is capable of representing may be increased. As shown in Fig. 6, current is supplied to the shaft 9 and thereby to the brush 5. The current may be withdrawn from rings $2^0$ to $2^4$ in the peripheries of the discs $3^0$ to $3^4$ which are connected to the contact strips 2. From each of these rings there extend connections $204^0$ to $204^4$. These connections may be utilized in various manners as will be described below, it being evident that whenever any number is set by turning the shaft 9 the connections $204^0$ to $204^4$ will be energized only in those orders in which the coefficient is 1.

If, for example, it is desired merely to indicate which orders contain a coefficient of 1, such connections operate relays $205^0$ to $205^4$ which will in turn close switches $206^0$ to $206^4$. The relays 205 are connected to the negative side of the source of current.

I might also provide other arrangements for distributing elements 1 in one or several insulating blocks and arrange accordingly the brushes of the contact member.

In any case, such an electric reading device makes it possible through the mere displacement of a contact member, to cause the electric current to flow through certain of the numeral circuits, the various combinations of distribution of the current among the various numeral circuits being sufficient to represent a portion of the sequence of numbers in the binary system and the capacity of such a device depending, of course, upon the number of elements 1 which it includes.

I might also, for constituting the movable contact member of an electric reading device, have recourse to a light beam, in order to reduce the weight of the movable parts of said electric reading device.

Such an arrangement is shown by way of example in Fig. 7.

In this embodiment, I provide a rotating mirror 12, movable manually or automatically, of elongated narrow shape, in such manner that it pivots about a shaft 13 having its axis in the plane of the mirror, parallel to its longer sides. I provide around this mirror a screen 14, preferably of substantially cylindrical shape, the axis of which coincides with 13. This screen is provided with ports 14' the size and relative arrangement of which are those of the teeth of elements 1 of the electric reading devices above described. All the ports or apertures that correspond to the teeth of the same element 1 are located between two planes 15 and 16, both at right angles to axis 13.

I provide, on the outside of the screen, photoelectric cells 17 the active surfaces of which are preferably of cylindrical shape, having axes coinciding with 13, each of these cells being located wholly between two planes such as 15 and 16 and having its active surface turned toward the mirror.

Finally, I provide a stationary light source and a stationary optical device arranged in such manner that this system, in association with mirror 12, forms on the screen a luminous line 18 parallel to axis 13.

This apparatus works in the following manner:

Each cell being connected in series with a numeral circuit (account being not taken of the current amplification devices which may be necessary), if the luminous line is formed on an aperture 14 of the screen, the corresponding cell is energized and current flows through the corresponding numeral circuit. If, on the contrary, the luminous line is formed on the solid part of the screen, the cell is not energized and no current flows through the numeral circuit.

Consequently, if the position of mirror 12 is a function of a variable $g$, it is sufficient, in order that the binary numeral device formed by the cell circuits may mark number $g$, to dispose the apertures in such manner that, for a given position of the mirror, apertures are located on the illuminated generatrix for all the binary orders in which the binary representation of number $g$ corresponds to figure 1.

III.—*Comparison of two numbers represented in the binary system*

In order to solve this problem I make use of an apparatus called comparator and which is devised in such manner that the comparison of said numbers is effected figure after figure, by starting from the highest order toward the lowest order.

For this purpose, and supposing that the numbers to be compared with each other are N and N', I inscribe each of said numbers respectively on a special relay numeral device, the relays of any order $p$ of which are designated by $Rp$ for the first one and $R'p$ for the second.

As shown in Figs. 8a and 8b, these relays from the nine to the zero order are disposed in the following order from right to left in Figs. 8b, 8a:

$$R'_9, R_9, R'_8, R_8 \ldots R'_1, R_1, R'_0, R_0$$

I connect the contacts controlled by relay $R'_9$ of the highest order with a conductor of electric current which is sent either in one direction corresponding to coefficient 1 to contact $291^1$ or in another direction corresponding to coefficient 0 to contact $291^2$ according to the position of said relay, that is to say according as the figure of the 9th order of number N' is 1 or 0. In both cases, the current is fed to a switch controlled by the coil of relay $R_9$ which is provided with two oscillating contacts $192^1$ connected to contact $291^1$ and $192^2$ connected to contact $291^2$ respectively, capable of sending the electric current to one of the contacts 202¹ to 202⁴, according as said current came from contact 201² or 201¹ and according as the figure of the 9th order of number N is 0 or 1.

The elements are arranged in each order, in the manner to be specifically explained for the 9th order, in such manner that:

a. On the one hand, contacts 202⁴ and 202¹, which correspond to identical figures of the 9th order in numbers N and N' (0 in the first case and 1 in the second case) both lead to blade 201¹ of relay R's, which coacts in the same manner with relay Rs, for comparing the figure of the 8th order of numbers N and N':

b. On the other hand, contact 202³ (which corresponds to the figure of the 9th order of N' being 0 and the figure of the 9th order of N being figure 1) leads to a common conductor bar 609+ connected with all the relays, whereas contact 202² (which corresponds to the figure of the 9th order of N' being 1 and the figure of the 9th order of N being 0) leads to a conductor bar 609 which is also common to all the relays.

It will be understood that, with such an arrangement, as long as the figures of the same order are the same for both of the numbers N and N', the current will flow to the relay conductors of the next lower order, whereas, as soon as said figures are different, the current is fed to bar 609+ or bar 609, according as number N is greater or smaller than N'.

As shown more fully in Figs. 8a and 8b, I provide two sets of relays identified as R₀ to R₉ and R'₀ to R'₉. Relays R₀ to R₉ are connected to a device of the type shown in Fig. 6a and indicated at 6aR, while relays R'₀–R'₉ are connected to a similar device indicated at 6aR'.

When relays R₀ and R'₀ are both deenergized, as shown in the drawings current will flow from the terminal of the next higher relay through switch member 101¹ to a contact 201². In these reference characters, the first digit (1 or 2) indicates the switches and contacts respectively of the relays; the second digit, the order of 2 to which the relay corresponds; the third digit 1 or 2 indicates relays R' and R respectively, and the exponent indicates the order, from top to bottom, of the switch or contact in the relay. This supplies current to the switch blade 102² of the relay R₀ which is in engagement with the contact 202⁴ connected to the negative side of the source of current.

If one of the relays R is energized and R' is not (for instance, as shown in Figs. 8a and 8b, if relay R₁ is operated and relay R'₁ is not) the parts take the position shown in Figs. 8a and 8b. Under these conditions current flows from blade 111¹ to contact 211² and then by blade 112² to contact 212³, and thence to line 609+, which indicates in any suitable manner, as by a light, that in this particular order, assuming that all higher orders are equal, R₁ is greater than R'₁, or that the number set on 6aR is greater than that set on 6aR'.

If, on the other hand, in a higher order, such as the 2 order, R' is 1 and R is 0, then the parts assume the position shown in the 2 order in Figs. 8a and 8b. In this and certain higher orders, in addition to the relays R' other coils operate on the same relay as shown. The purpose of these additional coils will be explained below in connection particularly with Fig. 13.

R₂ being deenergized and R'₂ being energized, the current flows through blade 121¹ to contact 221¹, and then over blade 122¹ to contact 222², and thence to the line 609−, thus indicating that in this order R' is greater than R.

If both relays R and R' in any order are energized, as for instance, relays R₃ and R'₃, current will flow over switch 131¹ to contact 231¹, thence over blade 132¹ to contact 232¹ and will pass on to the blade 121¹ of the next succeeding relay R'.

It will be noted that, starting with the highest order at the right of Figs. 8a and 8b, as long as both coefficients are 0 or 1 of the numbers to be compared in any given order the current will merely flow through to the blade of the relay R' of the next succeeding order. When an order is reached in which the coefficient of one of the numbers is 1 and of the other is 0, then current will flow to one of the wires 609+ or 609−, thus indicating that the number R is greater or less than the number R', and breaking the circuit to the remaining orders. The device will thus indicate immediately which of two numbers is greater.

Such an apparatus has, among other advantages, that of permitting an accurate and practically instantaneous comparison of numbers expressed in the binary system, and that of occupying but little room, the width and height of said apparatus being independent of the number of relays, said number influencing only the length of the apparatus.

Figure 9:
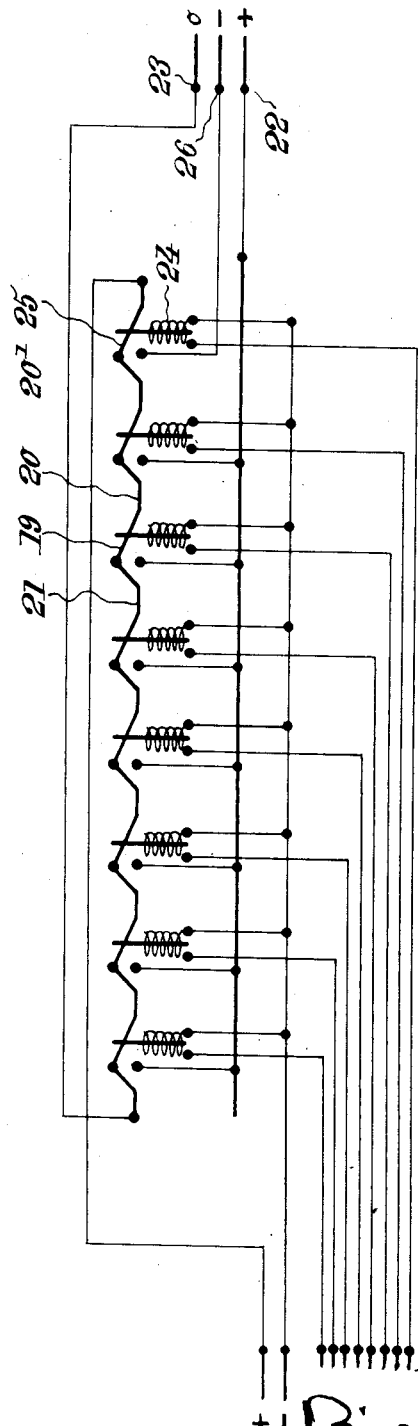
Fig. 9 shows a modification of said apparatus adapted for special purposes.

In the particular case in which number N is zero, blades 101¹ etc. and 102¹ etc. remain stationary in the position in which they represent zero, thus playing the part of mere conductors and the whole device is reduced (as shown by Fig. 9) to a relay numeral device each electro-magnet of which controls an oscillating contact 19, which receives current from the contact stud 20 of the next higher binary order and transmits the current either to the next lower binary order contact stud 21 or, through a common bar, to a terminal 22 marked +, and the last contact stud of which is connected to terminal 23 marked 0, this system being completed, in the case in which the number can become negative, by a relay 25, called sign relay, which precedes the relay of the highest binary order and which, receiving current from the positive pole, transmits it through an oscillating contact either to the contact stud of the highest binary order 20¹, or to a terminal 26 marked −.

This system works in the following manner:

The number that is to be compared to zero is marked on the relay numeral device. If it is negative, the sign relay is operated and contact 25 is lowered. The current therefore flows out through the terminal marked −. If the number marked on the relay numeral device is zero, all the relays, including the sign relay, are in the state of rest. The current therefore flows out through the terminal marked 0. Finally if the number marked on the relay numeral device is positive, the sign relay is in the state of rest and at least one of the other relays is operated; the current then flows out through the terminal indicated at +.

This device will be called zero comparator.

CALCULATION OF A DIMENSIONED FUNCTION OF A NUMBERED VARIABLE

In order to effect the calculation of a dimensioned function of a numbered variable of the form:

$$y = f(g)$$

which will be supposed to be linear in the interval of variation of $g$ within which the apparatus is to be utilized, I proceed as follows:

I establish an apparatus shown in Fig. 8c and hereinafter called "controlled reading device" which comprises the following elements:

a. A binary numeral device $6aR'$ capable of representing the numbered variable $g$;

b. A functional reading device corresponding to the function $g'=F(y)$ inverse of the function $y=f(g)$, $g'$ being represented by another binary numeral device $6aR$ and $y$ by the position of the contact member of said functional reading device;

c. A comparator $8a, b$ of the type shown in Figs. $8a$ and $8b$ of the values of $g$ marked on the binary numeral device $6aR'$ and on the functional reading device $6aR$;

d. A clutch device $Cl^2$ capable of coacting with a driving shaft DS for producing the displacement in one direction or the other of the contact member of the functional reading device;

e. And a system of connections associating the following elements:

On the one hand the numeral device $6aR'$ of the variable with one set of relays $R'_0$, $R'_1 \ldots R'_9$ of the comparator $8a, b$;

On the other hand the numeral device $6aR$ of the functional reading device with the other set of relays $R_0, R_1 \ldots R_9$ of said comparator, And finally the current output terminals $609^+$, $609$ of the comparator $8a, b$ with the controls of the clutch $Cl^2$, corresponding respectively to a forward movement (direction of the movement of the contact member for which $y$ increases) (line $609^-$ being energized), to a rearward movement (direction of the movement of the contact member for which $y$ decreases) (line $609^+$ being energized), and to the neutral position of said clutch, neither line being energized.

The operation of such an apparatus takes place as follows:

The numbered variable $g$ is inscribed on the numeral device $6aR'$ R of the comparator, and the value of $g'$ on the numeral device $6aR$ R' of said comparator. The latter starts the clutch in the forward or rearward direction according as $g$ is greater than $g'$ or smaller than $g'$ (supposing that $y$ varies in the same direction as $g$) and, as a consequence of the corresponding displacement of the contactor of the functional reading device, the value of $g'$ tends toward that of $g$. When $g$ is equal to $g'$, no current leaves the comparator, setting the clutch in the neutral position, and the contact member of the functional reading device $6aR$ occupies a position corresponding to $y=f(g)$ for the value of $g$ initially inscribed upon the numeral device.

ADDITION OF NUMBERS MARKED IN THE BINARY SYSTEM

In order to carry out this operation, I provide an apparatus which will be hereinafter called a "relay totalizer" which apparatus is so devised as to include, for each binary order $h$, a device capable of effecting the sum of the coefficients corresponding to said order in all the numbers $a_0$, $a_1, a_2 \ldots a_p$ which are to be added together.

For this purpose, and concerning, for instance, that one of said devices that corresponds to order $h$, said device includes the following parts:

a. On the one hand a series of contact studs P which are arranged as shown by Fig. 10 in the form of columns the whole of which constitutes a triangle, each column including one contact more than the next column on the left hand side, the last contact stud on the left hand side being connected to the positive bar of an electric generator;

b. On the other hand, relays $R^0{}_{10}$, $R^1{}_{10} \ldots R^8{}_{10}$ controlled respectively by the numeral circuits of order $h$ of the numbers above mentioned, said relays controlling in turn switches $c^0, c^1 \ldots c^8$, the first switch $c^0$ being of the simple type and the others of the multiple type, and each switch being capable of connecting respectively each of the contact studs of a column either with the contact stud of the next column on the right hand side located on the same line or with the contact stud of said column located on the line immediately above, according as the relay that corresponds indicates figure 1 or figure 0.

It will be readily understood that, if the contact studs of the last column on the right hand side are numbered from C1 to C9, starting from the top, that one of said contact studs to which the current is led indicates, by its number, the number of numeral relays that indicate coefficient 1, since every time a relay passes from the position 0 to the position 1, it sends the current along the same horizontal line, instead of causing it to pass to the next line above it, whereby the finally energized contact stud on the right column on the right hand side is one line lower.

Furthermore, this system, called "addition triangle" must further include the following elements:

a. On the one hand means for effecting transfers to other orders; and b. On the other hand a binary numeral device capable of recording the figure of the $h$ order of the sum.

Concerning first the above mentioned means, they are constituted by providing in the triangles of higher orders, for instance in the triangle of the $h+k$ order, a supplementary column the relay of which is inserted in series in circuits which are connected, as will be more fully explained hereinafter, to the numbered contact studs of the triangle of $h$ order which imply, in the binary representation thereof, the coefficient 1 in the $h+k$ order. Such a relay is called transfer relay $h/h+k$ and, since it is obvious that for many numbers having the coefficient 1 in more than one order, as for instance the number 011 a given contact stud must control several transfer relays of different orders, I provide, for each of said relays, distinct windings.

For instance, there is associated with the triangle of $h$ order shown by Fig. 10:

A multicoil relay $RM^2$ of $h/h+1$ order having one coil $r^{22}$ connected directly to contact stud 01 and through coil $r^{13}$ of multicoil relay RMI to stud 11; and a second coil $r^{26}$ connected directly to stud 011 and through coil $r^{17}$ of relay RMI to stud 111;

A relay RM3 of $h/h+2$ order having a coil $r^{34}$ connected directly to stud 001; through coil $r^{15}$ of relay RMI to stud 101; through coil $r^{26}$ of relay RM2 directly to stud 011 or also through coil $r^{17}$ of relay RMI to stud 111;

A relay RM4 of $h/h+3$ order having a coil $r^{48}$ connected directly to stud 0001, and through coil $r^{19}$ of relay RMI to stud 1001.

This mechanism operates in the following manner: When none of the relays R are operated, the circuit runs through the upper switch of each column, but is broken at the right hand side of the triangle. When any one of the switches is operated, the circuit is shifted down to the next diagonal row of switches, and current is supplied to the first contact C1 at the right of the triangle. The contact of the group C1 to C9 which is energized will correspond to the number of relays R which are energized.

From the contact C1, current flows through a coil $r^{11}$ of a multicoil relay RM1, which may operate an indicating device or any other mechanism to show that one relay of the tens triangle has been operated, or that any value thereby represented contains 1 times the order of 2 to which the adding triangle corresponds. From the other side of this coil $r^{11}$ current flows to the negative side of the source. From contact C2 current flows to a coil $r^{22}$ of a multicoil relay RM2 in the next higher order, which may be suitably utilized as a member of an addition triangle in the next higher order or in any other fashion. From contact C3 current flows through a coil $r^{13}$ of relay RM1 and then to the coil $r^{22}$ to represent 1 in the order in which the adding triangle is arranged and 1 in the next higher order, since $3 \cdot 2^n = 2^n + 2^{n+1}$. From contact C4 current flows through a coil $r^{34}$ of relay RM3 in the second higher order, since $4 \cdot 2^n = 2^{n+2}$. From contact C5 current flows through a coil $r^{15}$ of relay RM1 in the same order and then to coil $r^{34}$ of relay RM3 of the second higher order. Contact C6 directs current through a coil $r^{26}$ of relay RM2 of the next higher order and then through coil $r^{34}$ of relay RM3 of the second higher order. Contact C7 sends the current through coil $r^{17}$ of relay RM1 of the same order, then through coils $r^{26}$ and $r^{34}$. Contact C8 transmits the current to a coil $r^{48}$ of relay RM4 of the third higher order, since $8 \cdot 2^n = 2^{n+3}$. Contact C9 sends current through a coil $r^{19}$ of relay RM1 of its order and then to coil $r^{48}$.

From the above it will be obvious that when any odd numbered contact is energized, by the operation of an odd number of switches, it will energize a relay in the same order, and, if it is more than 1, also relays in higher orders. If the number of the contact is even only relays in higher orders will be energized.

Figure 10A:
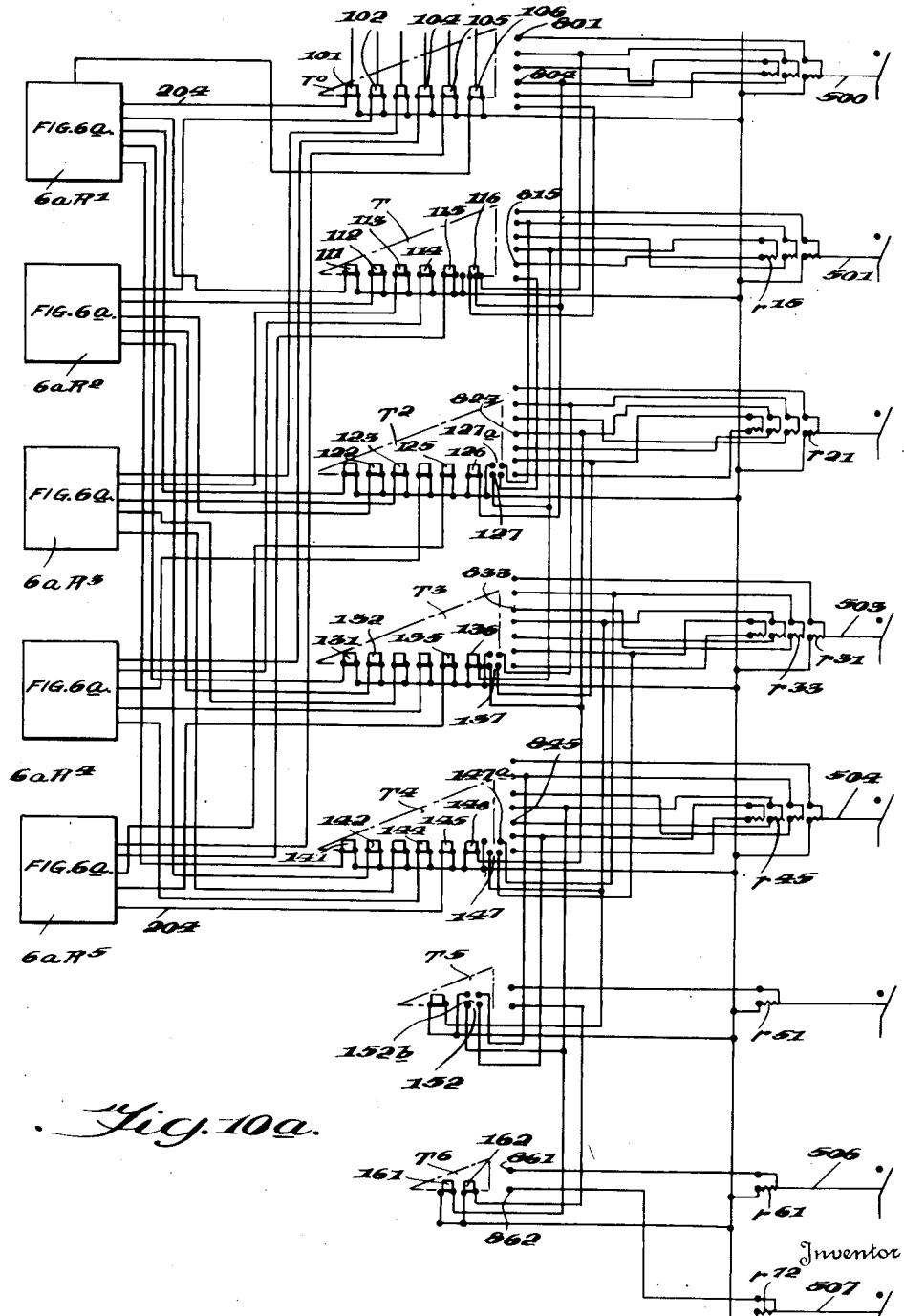
Fig. 10a is a diagram of an adding mechanism utilizing a plurality of the addition triangles shown in Fig. 10.

Fig. 10a shows a mechanism capable of carrying out addition of numbers, as well as subtraction in a manner to be described hereinafter. The device shown in Fig. 10a is applicable to the addition of five numbers of not more than five orders each. The various relays in the addition triangles $T^0$ to $T^6$ have been given numbers from 101 to 162, the second digit indicating the order of the addition triangle and the third indicating the number of the relay from left to right in the triangle. Relay 106 is not used in addition, and its use in subtraction will be explained hereinafter.

As will be noted, each of these addition triangles has a number of contacts corresponding to those of Fig. 10, these contacts being identified by reference characters 801 to 862, the second digit representing the order of the adding triangle and the third digit representing the order of the contact in the triangle from top to bottom, and corresponding to the operation of one or more relays in the triangle.

Suppose now that we wish to add the following numbers: 11, 23, 6, 19, 31.

These numbers may be written in the binary system, in five orders, reading from left to right as follows: 11010, 11101, 01100, 11001, 11111.

Each of these numbers is now set up on one of the setting devices $6aR_1$ to $6aR_5$ of the type shown in Fig. 6a, and the lines 204 extending from these devices are energized in those orders in which the coefficient is 1. In Fig. 10a this means that, taking the 25 output lines from top to bottom of the figure, the following will receive current: 1, 2, 4, 6, 7, 8, 10, 12, 13, 16, 17, 20, 21, 22, 23, 24 and 25. As a result, the following relays in the adding triangles will be energized: 101, 102, 104, 105, 111, 112, 113, 114, 115, 122, 123, 125, 131, 135, 142, 144, 145.

In the zero order, four relays are energized and current will therefore be supplied to contact 804. As will be evident, this will energize relay 126 in the 2 order, since $4 \cdot 2^0 = 2^2$. None of the relays in the first order will be energized from the zero order, nor will indicating relay 500 be operated.

In the first order five relays are energized, so that current will be supplied to contact 815. This will energize coil $r^{15}$ of the multicoil indicating relay 501 of the 1 order, and also relay 136 of the 3 order.

In the 2 order relays 122, 123, 125 and relay 126 operated from the zero order are all energized, so that current is supplied to contact 824. This energizes relay 146 in the fourth order.

In the third order, relays 131 and 135 are energized, and 136 from the first order. This causes current to be supplied to contact 833, from which it flows through coil $r^{33}$ of the multicoil indicating relay 503 to coil 147a of multicoil relay 147 in the fourth order.

In the fourth order three relays (142, 144, 145) are energized, and two additional relays have been energized from the second (146) and third (147a) orders respectively. Current will therefore be supplied to contact 845 from which it will pass through coil $r^{45}$ of multicoil relay 504 to relay 151 of the sixth order.

No relays are operated in the fifth order. In the sixth order only relay 161 is operated, which supplies current to contact 861 to operate coil $r^{61}$ of relay 506.

We now find that indicating relays, those at the right of the figure, have been operated in the 1, 3, 4 and 6 orders. That is, the sum of the various components is equal to $$1 \cdot 2^1 + 1 \cdot 2^3 + 1 \cdot 2^4 + 1 \cdot 2^6$$

representing 0101101, or 90, which is the correct result.

A few points of this diagram may require further explanation. In the indicating relays of each order, there may be several coils operating the same relay. Each of these coils is controlled by the energization of one of the odd numbered contacts of the addition triangle, and the number of coils must be equal to the number of odd numbered contacts in any order. When a contact of an odd number greater than 1 is energized, the current flows first through a coil of its relay and then through one of the transfer coils in one of the succeeding addition triangles.

Some of the transfer relays (that is, the relays which are actuated from a preceding addition triangle) in certain orders are provided with two separate coils (see the relays 116, 127, 137, 147 and 152), the separate coils being designated by the addition of letters a, b, etc. One of these coils is energized from the 2 contact of the preceding triangle, and is intended to be used as a transfer coil from that triangle. One terminal of the other coil is connected to the 6 contact of the preceding triangle, and the other terminal is connected into a line leading from the 4 contact of the preceding triangle to a coil of the corresponding transfer relay in the succeeding triangle. Thus when 6 is set up current will flow through relays in each of the next two succeeding triangles. For large numbers, greater numbers of windings, or additional relays might be necessary.

The second contact 86² of the highest order relay $T^6$ is connected merely to a relay $r^{72}$ of a seventh order indicator 50⁷.

It is believed that with the above explanation the operation of the adding mechanism will be clear.

In order to constitute the whole of the totalizer, I can, for instance, place the elements of a given addition triangle one behind the other, as shown by Fig. 11, between two parallel frame elements and juxtapose the successive triangles in parallel lines.

Furthermore, advantageously, I arrange each addition triangle T in such manner that it constitutes a unit capable of being set in position on a base 24 inside which the various connections are provided, said addition triangles being fitted with plugs 24ᵃ fitting exactly in sockets provided for this purpose on said base 24. Furthermore hooks 24ᵇ are advantageously provided for causing the addition triangles to be secured on said base.

ALGEBRAIC SUM OF SEVERAL NUMBERS MARKED IN THE BINARY SYSTEM

Advantageously, I make use, in order to make subtractions in the binary system, of the method of complements, this method consisting, instead of subtracting a number, in adding the complementary number, which can be obtained:

Either as above explained,

Or again by first subtracting 1 from the number that is considered and replacing, in each order, 1 by 0 and 0 by 1.

The arrangement represented by Fig. 12 is adapted to be used with other arrangements which have been described above, in order to produce the calculation of the complement of a number, by either of the procedures above described, the first of these procedures being utilized preferably to impose a negative number on the totalizer and the second to establish in its usual form the result of a subtraction already effected in the totalizer (when the result of this subtraction is negative).

The invention therefore contemplates the use of a "reverser." Concerning the reverser proper, assuming that it is desired to apply it to a numeral device which may include ten binary figures, it includes the following essential elements:

a. A sign relay A' controlling a switch having ten blades $A'_0$ to $A'_9$ (and a blade L', to be described below) receiving current from the input leads 204A₀, etc. of the reverser, which are preferably energized through a device of the type shown in Fig. 6a, and with a supplementary blade L' receiving current from the positive terminal;

b. A device I' with ten switches $I_0$ to $I_9$ capable of receiving the current from blade L' and the relays of which can be controlled by the blades $A'_0$ to $A'_9$ of the sign relay;

c. A numeral device $T_1$ which includes; on the one hand, ten relays which receive current either from the blades $A'_0$ etc. of the sign relay through wires $B_0$, $B_1$, $B_2$ etc. or from the device I' through wires $B'_0$, $B'_1$, $B'_2$ etc.; and on the other hand, a terminal S' which receives current from blade L'.

When reversers are connected between devices of the type shown in Fig. 6a and a numeral device such as that of Fig. 10a (see Fig. 12a) for subtraction:

a. The outlets of devices 6aR₂ and 6aR₁ are connected to the input blades $A'_0$ etc. of the reversers;

b. The outlets 204¹ of the reversers are connected in the same manner to the inputs of relay coils 10¹, etc. of Fig. 10a;

c. The sign relay A' receives current from a special wire which will be called the sign wire; and d. The sign terminal S' controls a supplementary relay 10⁶ of the addition triangle of the first order of the relay totalizer shown in Fig. 10a, or adding mechanism.

The operation of this device takes place in the following manner.

If the numbers marked on the numeral devices 6aR₁ and 6aR₂ are positive, the sign relays A' of the reversers are not operated. Current flows from each outlet of the devices 6aR₁, 6aR₂ to the relays of device $T_1$ which corresponds thereto through the blades $A'_0$ etc. of the sign relay and wires $B_0$, $B_1$ etc. (case illustrated in Fig. 12).

If the number marked on one of the devices, as 6aR₁, is negative, the sign relay A' is operated, which produces the following results:

a. On the one hand, the current of the input plugs of the reverser is fed through wires $c_0$, $c_1$ etc. to the device I'; and b. On the other hand, current is fed to the switch of each of the relays of the device I' through blade L'.

The reversal of the number is carried out by the device I' which, for every binary order $h$ of the number $a-1$, sends the current into the total relay $T'_h$ (subscript $h$ identifying the relay of order $h$) of the same order, if the relay $I'_h$ of this order is not energized, that is to say, if the figure of order $h$ of $a-1$ is 0, and, on the contrary, cuts off the current in the total relay of order $h$ if the relay $I'_h$ of this order is energized, that is to say, if the figure of order $h$ of $a-1$ is 1.

Finally, the sign plug of the device $T_1$ receives the current, which energizes relay 10⁶ of device of Fig. 10a.

Taking a specific example, the mechanism then operates as follows:

For example, if it is desired to subtract 14 from 26, the following operations take place:

The number 26 is set on the setting mechanism $6aR^2$ and in the binary system is represented by 01011. The number 14 represented in the binary system by 01110 is set on the device $6aR^1$, thus energizing input lines 204A₁, 204A₂ and 204A₃ of the group of the mechanism 12¹ of Fig. 12a. At the same time, since the number is to be subtracted, the sign relay A' of device 12¹ is energized by the sign wire.

Current now flows through input lines 1, 3 and 4 of device 12², and 1, 2 and 3 of 12¹ and the corresponding switches $A'_1$, $A'_3$, $A'_4$ and $A'_1$, $A'_2$, $A'_3$ respectively. In device 12², since relay A' is not energized, this merely energizes relay $T'_1$, $T'_3$ and $T'_4$. In device 12¹, on the other hand, the effect is to operate relays $I'_1$, $I'_2$ and $I'_3$. These relays break the circuits to the corresponding relays $T'_1$, $T'_2$ and $T'_3$, so that in the T' group only relays $T'_0$ and $T'_4$ are energized through switch L' and relays $I_0$ and $I_4$. These operate the corresponding relays to energize the leads 204¹ of device 12¹ in the 0 and 4 orders.

As a result of the setting of number 26 on mechanism $6aR^2$, relays 11², 13² and 14² of Fig.

10s are energized. As a result of the operation of relays T'₆, T'₄ and S' relays 101, 141 and the supplementary relay 106 are energized, thus representing 1 in those orders in which, in the number 14 to be subtracted, the coefficients are 0 and an additional 1 in the 0 order. The addition of 1 at this time is the equivalent of the subtraction of 1 from 14 before the inversion takes place.

As a result of this operation, two relays are energized in the 0 order, which results in the energization of relay 116 of the first order. Relay 112 of the first order is also energized, so that two relays are energized in this order to energize coil 127a of relay 127 of the second order. This is the only relay energized in the second order and therefore energizes indicator relay $r^{21}$. Only one relay, 132, is energized in the third order, and thus relay $r^{31}$ is energized. Two relays 141 and 142 are energized in the 4 order, thus energizing relay 152b in the fifth order. This being the only relay energized in the fifth order, indicating relay $r^{51}$ will be energized.

As is always true in subtraction, by the addition of complements, the coefficient in a higher order than those of the two numbers in which subtraction is taking place must be ignored, and therefore the indication in the 5 order is immaterial. The resulting product is then 00110, which is equal to 12, the difference between 26 and 14.

MULTIPLICATION OF TWO NUMBERS MARKED IN THE BINARY SYSTEM

In order to calculate the product of two numbers A and B marked in the binary system, and which may be expressed as follows $$A = a_0 + a_1.2 + a_2.2^2 + a_3.2^3 + \ldots a_p.2^p$$
$$B = b_0 + b_1.2 + b_2.2^2 + b_3.2^3 + \ldots b_p.2^p$$

in which letters $a$ and $b$ are intended to represent numbers smaller than 2, it is advantageous to note that the product $A.B$ can be written $$A.B = \sum_{i=0}^{i=p+q} 2^i \Sigma_i a_m.b_n$$

numbers $m$ and $n$ being positive integers which comply with the condition $$m + n = i$$

and the product $a_m b_n$ being equal to 1 if both $a_m$ and $b_n$ are equal to 1, whereas said product is equal to zero in all other cases.

It will be understood that, if $a_m$ and $b_n$ are marked by numeral circuits, it is possible to constitute a numeral circuit of the product $a_m.b_n$ by placing in series the numeral circuits of $a_m$ and $b_n$. The circuit thus constituted is then closed in the case of the numeral circuits of $a_m$ and $b_n$ being both closed and only in this case.

I obtain the sum $\Sigma_i a_m.b_n$ by means of an addition triangle. The whole of these addition triangles, fitted with the necessary transfer relays, constitutes a relay totalizer.

Figs. 13a, 13b and 13c, arranged together as shown in Fig. 13d, make up a diagram showing the connections of an apparatus capable of performing, according to the principle just above described, the multiplication of two numbers inscribed in the binary system. This figure also shows the connections of other devices which will be more fully described in what follows.

Such an apparatus comprises, essentially, two relay numeral devices 27 and 28 (Fig. 13a) on which are set the two factors of the product.

The apparatus further includes a relay totalizer 29 (Figs. 13b, 13c), which controls the total relays R'₀, R'₁, R'₂ etc. of device 30 (Figs. 13b, 13c) and blades 500, 501 etc. of the switches moved by said relays, the other blades moved by said relays acting not in multiplication but merely in other kinds of calculation. As this device 30 acts, in some kinds of calculation, in the same manner as the binary numeral device of Figs. 8a, 8b in comparing numbers, it can be called "the product numeral device 8a, b."

Each relay of the numeral device 27 is provided with a switch operated by a coil such as 300 which, receiving the current (through an output line 204¹ of a device of the type shown in Fig. 6a, whenever such line is energized) from the positive terminal of an electric generator, distributes said current, when the switch in question is in active position, among contact studs such as 301, the number of which is equal to the capacity of the numeral device, that is to say five in the example shown by the drawings.

In a similar manner, each relay of the numeral device 28 is caused to control by its coil such as 400 a switch which receives current from numeral device 27 as will be hereinafter explained, and distributes said current, when it is in the active position, among the relays of the relay totalizer 29 through the contact studs such as 401 of the relay.

In order to facilitate explanations, the contact studs of each switch will be numbered from 1 to 5, starting from the top, and I will number by their binary order the switches of the relay numeral devices 27, 28 and the product numeral device 8a, b and also the addition triangles of the relay totalizer 29, as will be explained below. These conventions having been fixed, it follows, in particular, that any contact stud of one of the numeral devices 27 or 28 is perfectly identified by the order $h$ of the switch to which it belongs and by the rank $j$ of said contact stud, in this switch; for instance contact stud 323 is characterized by order 2 and rank 3.

Finally, the connections between the relay numeral devices 27 and 28 and the relay totalizer 29 are fully determined by the following rules:

1. The output contact stud of numeral device 27 the order of which is $h$ and the rank of which is $j$ is connected through a particular wire with the contact stud of numeral device 28 the order of which is $j$ and the rank $h$;

2. The output contact stud of numeral device 28 the order of which is $h$ and the rank of which is $j$ is connected through a particular wire to one of the relays of the addition triangle the order of which is $h+j$.

Figs. 13a, 13b and 13c show such a multiplying mechanism. In this figure, there are five orders or powers of 2 in each factor, so that the machine will multiply any numbers less than 32. It will be obvious that the principle can be equally well applied to a machine having any desired number of orders.

The general operation of the device shown in this figure is as follows: 56 represents the contacts of one setting mechanism of the type shown in Figs. 1 to 7, as 6aR, and 57 represents the contacts of another device, 6aR₁. When the contacts of groups 56 and 57 are closed in various orders, they energize lines 204 and operate relays to close switches 300, etc., of groups 27 and 28 respectively. These switches in combination operate various relays in the addition triangles 29.

Combinations of switches in group 29 in turn operate various relays in group 30, which are connected with indicating switches arranged at 58.

In order to explain more fully the operation, I have utilized the reference characters as follows:

300, 310, 320, 330, 340; and 400, 410, 420, 430 and 440 indicate the relays in groups 27 and 28 respectively of the zero to fourth orders (the order being indicated by the second digit of the reference characters) which are operated respectively by the contacts of the zero to fourth orders of groups 56 and 57.

Each of these relays operates a mechanism having five switches and contacts.

301 to 305, 311 to 315, 321 to 325, 331 to 335, 341 to 345, 401 to 405, 411 to 415, 421 to 425, 431 to 435, and 441 to 445 represent the contacts of these switch mechanisms. In these reference characters, the first digits 3 and 4 indicate that the switches belong to group 27 or group 28 respectively. The second digit indicates the order of the switching mechanism of which the switch is a group. The third digit represents the position of the contact in the group, the numbers running from top to bottom.

111, 112, 121 to 124, 131 to 135, 141 to 147, 151 to 156, 161 to 165, 171 to 174 and 181 to 183 represent the relays of group 29. In this grouping the first digit 1 indicates that the device is a relay of group 29. The second digit indicates the order of the adding triangle in which the relay is arranged, it being noted that there is no adding triangle for the 0 order for reasons which will be explained below. The third digit indicates the position of the relay in that order, numbered from left to right. Relays 151 and 161 are of the multicoil type.

The reference characters 1111 to 1833 indicate the individual switches of the switching triangles. The first three digits indicate the relay by which the switch group in which the particular switch is located is operated. In other words, switches 1341 to 1344 are operated by relay 134. The last digit indicates the order of the switch in this switching group, numbered from bottom to top.

Numbers 811 to 883 indicate the contacts at the right hand sides of the addition triangles. In these reference characters, the first digit 8 indicates the fact that the element is one of the contacts of the switching triangles. The second digit indicates the order of the switching triangle in which the contact is located, and the third digit indicates the order of the contact in the triangle, these contacts being numbered from bottom to top.

Reference characters 2212 to 2804 indicate the contacts of the transfer relays to be described below. The first digit 2 indicates that the element is an input contact or is an input terminal of the coil of one of the transfer relays. The second digit indicates the order of the addition triangle in which the transfer relay is located. Of the third digits, 0 indicates that the transfer relay is the second from the left in an addition triangle; while 1 indicates that the contact is the terminal of the first (in some cases only) coil, and 2 indicates the terminal of the second coil of the first transfer relay in an addition triangle. The fourth digit indicates the lowest numbered contact of a preceding group to which the terminal is connected. This terminal may be located either in the next preceding group or in an earlier group, and is one of the terminals 811 to 883.

The same numbers with prime indications designates the other terminals of the same coils. The same numbers with double prime indications designate connections from the output terminals of the coils into a line leading to a relay of a higher order.

Reference characters 7223 to 7723 represent connections in the circuits of the contacts 811 to 883, the purpose of which will be described below. In these connections, the first digit indicates that the element is one of these connections, the second digit indicates the order of the addition triangle in which the connection is located, and the third and fourth digits indicate the numbers of the contacts in each group between which the connection is arranged.

Reference characters 500 to 509 indicate the switches of the relays of the group 30 which are closed by the operation of the relays and which close circuits to switches or indicators 58. The last digit indicates the order to which the relay corresponds.

Reference character 600 indicates one terminal of the coil of the relay R'o of 0 order. Reference characters 610 to 619 indicate the output terminals of the coils of the relays of the 0 to 9 orders, which are connected back to the negative side of the source of current.

Reference characters 6111 to 6883 indicate terminals of coils of the relays operating switches 501 to 509, the second and third digits indicating respectively the order of the relay and the order of the addition triangle to which the terminals are connected, and the last digit indicating the position in the addition triangle of the contact to which the terminal is directly connected.

6992 indicates a special terminal in the ninth order, the operation of which will be described below.

With the above reference characters in view, applicant will now describe the operation of various parts of the device. Contacts 301 to 305 of 0 order are connected respectively to contacts 401, 411, 421, 431 and 441. Similarly the contacts of the 1 order of group 27 are connected respectively to the second contacts of each of the switch mechanisms of group 28, the contacts of the 2 order to the third switches of each mechanism, the contacts of the 3 order to the fourth switches of each mechanism, and the contacts of the 4 order to the fifth switches of each mechanism. Obviously the contacts of the 0 to 4 orders represent the first to fifth groups of switches, and the effect of this whole mechanism is to produce a complete crossing of connections.

The closing of any circuit through a switch of the first group 27 and a switch of the second group 28 will operate one of the relays 111 to 183. The accompanying chart, in which the horizontal indications represent the group of relays 27 and the vertical indications represent the group of relays 28, shows which of the relays 111 to 183 is operated by the closing of a switch of the first group and a switch of the second group:

|  | 300 | 310 | 320 | 330 | 340 |
|---|---|---|---|---|---|
| 400 | 500 | 111 | 122 | 132 | 143 |
| 410 | 112 | 123 | 133 | 144 | 153 |
| 420 | 124 | 134 | 145 | 154 | 163 |
| 430 | 135 | 146 | 155 | 164 | 173 |
| 440 | 147 | 156 | 165 | 174 | 183 |

It will be noted that the closing of switches 300 and 400 alone does not operate any of relays 111 to 183, but merely operates relay R'₀ of the 0 order.

This apparatus is intended to work on the following principle:

As has been previously explained, the binary principle is that any number may be broken down into the sum of a plurality of powers of 2, each occurring not more than once in the sum. Taking for example such a number as 29, this number may be represented as $1·2^0+0·2^1+1·2^2+1·2^3+1·2^4$. In the same way 23 may be represented as $1·2^0+1·2^1+1·2^2+0·2^3+1·2^4$. If now we set up a square, divided into five vertical and horizontal columns, in which the vertical columns represent the various powers of 2 in the multiplier 29, and the horizontal columns represent the powers of 2 in the multiplicand 23, and if we select those columns in which the value of the coefficient is 1 (and not 0) in each of the factors, we may then select those squares formed by the intersecting horizontal and vertical columns of which the coefficient is 1. Taking the example given above, these would be all squares except those in the vertical column of order 1 and the horizontal column of order 3, or if we number the squares from 1 to 25 in order going from left to right and top to bottom, they will be squares 1, 3, 4, 5, 6, 8, 9, 10, 11, 13, 14, 15, 21, 23, 24 and 25.

If now we draw diagonals across the smaller squares from the lower left to the upper right, we may indicate these diagonals, of which in this example there will be nine, by the indicia $2^0, 2^1, 2^2 \ldots$ to $2^8$ respectively, numbering from the upper left to the lower right. Now we may take the number of squares on each diagonal for which both the horizontal and vertical coefficients are 1, and multiply the designation of that diagonal by the number of such squares. In the example given, we will obtain $1·2^0+1·2^1+2·2^2+2·2^3+4·2^4+2·2^5+2·2^6+1·2^7+1·2^8$. The sum of all these will be 667, which is the product of 29 by 23.

The chart hereto appended shows the square as described above:

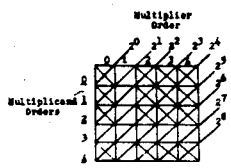

This arrangement of crossing or cross-multiplying the individual orders is accomplished by the switch groups 27 and 28. It will be noted that in the chart given above of the relays operated by various combinations of switches of groups 27 and 28 diagonals similar to those drawn above will show that all of the relays in any given diagonal are located in the same addition triangle of the proper order. These diagonals, in other words, represent all squares in which the sum of the orders of the horizontal and vertical columns defining the squares are equal to each other. In this manner the multiplication of any two values $2^a·2^b$ will operate a relay of the order $2^{a+b}$.

The relays 111 to 183 are intended to operate the indicating relays R'₁ to R'₉. However, by the use of a transfer mechanism it is only necessary to provide one indicating relay R' in each order, providing there is an indicating relay of a one higher order than the highest order of addition triangles, which is of course the sum of the two highest orders of the group 27 and 28.

In the present instance, the highest order of addition triangles is 8, while an indicating relay of order 9 is provided.

In the addition triangles, if no relays are operated, no current will flow through the triangle since the first or bottom switch of the last group in the order, to which current is conducted, is out of engagement with the corresponding contact.

If one relay only in any addition triangle is operated, then, as in Fig. 10a, the current will be transferred at some point so that it will be conducted to the first contact (or the bottom contact). For example, if relay 134 is operated current will flow over switches 1311, 1321, 1331, 1341 and 1352 to contact 831. Current will then flow from this contact to contact 6331, through the coil and through contact 613 to close the circuit. The energization of the coil will operate relay switch 583, so that an indication will be given in the third order.

If now two relays of any one addition triangle are operated, the current will be supplied to the second contact. For example, if relays 132 and 135 are operated, current will flow through switches 1311, 1321, 1332, 1342, and 1352 to contact 832. This means that there are two cross multiplication products equal to $2^3$ in the result. Now $2^3+2^3=2·2^3=2^4$. Therefore the proper result may be obtained by operating one relay in the fourth group in place of the two relays in the third group. Current flows from contact 832 through contact 7323 to contact 2412, which is the terminal of a coil operating relay 141. Thus a relay of the fourth addition triangle is operated. At the same time, terminal 7323 is connected to terminal 6332 of a second coil of relay R'₃, but the other terminal 6333 of this coil is connected to contact 833, the connection to which is broken in the addition triangle. Therefore, no current will flow through the coil having terminals 6332 and 6333.

Where three relays in any one group are operated, the current will be supplied to the third contact, as to the contact 833. Current will then flow to terminal 6333, through the coil to terminal 6332 so as to operate relay R'₃, then to connection 7323, and terminal 2412 to operate relay 141. Thus there will be an indication in the relay of the third order and an operation of one of the addition triangle relays of the fourth order. This then correctly represents the equation $2^3+2^3+2^3=2^4+2^3$.

If four relays in any one order are operated, current will be supplied to the fourth contact as to 834. Current will flow from this through connection 7345 to terminal 2504 of relay 152, in the fifth order and will operate this relay so as to represent $2^5$. This is proper since $4·2^3=2^5$. At the same time there is a connection from terminal 7345 to one terminal 6334 of a third coil or relay R'₃, but the return circuit through terminal 6335 from this coil is interrupted since the connection to contact 835 is broken in the addition triangle of the third order.

If five relays of one group are operated, such as all five relays of the third order addition triangle, current will be supplied to the fifth contact, as contact 835. Current then flows to terminal 6335, through the coil of relay R'₃ to terminal 6334, to connection 7345, to terminal 2504 of the fifth order relay, and thus operates a relay of the fifth order addition triangle and also relay R'₃. This represents the equation $5·2^3=2^5+2^3$.

The operation of six relays in any group will furnish current to the sixth contact, as for example 846. Current will then flow to contact 7467, terminal 2526 and through the coil to terminal 2526" of a relay 151 of the fifth order addition triangle. From the terminal 2526" current flows to terminal 2604 to operate relay 162 of the sixth order. This then represents the equation $6 \cdot 2^4 = 2^5 + 2^6$. At the same time, there is a partial circuit from connection 7467 to terminal 6446 through a coil of relay R'4 to terminal 6447 and thence to contact 847. The circuit of this contact, however, is not closed, so that no current will flow.

The operation of seven switches of one group will close the seventh contact, such as 847. Current will then flow to terminal 6447, and through a coil of relay R'4 to terminal 6446, through connection 7467 to terminal 2526, through the coil operating relay 151, then through terminal 2526" to terminal 2604 operating relay 162. Thus we represent the equation $7 \cdot 2^4 = 2^4 + 2^5 + 2^6$.

It is obvious that this type of arrangement could be equally well carried out for higher orders by the provision of the necessary circuits.

I will now take the example given above, namely the multiplication of 29 by 23, and develop the operation of the device in this problem. It will be evident that this problem involves the closing of the circuits at 56 in the 0, 2, 3 and 4 orders, and at 57 in the 0, 1, 2, and 4 orders. This will cause energization of relays 300, 320, 330, 340, 400, 410, 420 and 440.

Contacts 301 and 401 will operate relay 500. Since, as will be evident from the square and diagonal chart given above, there is never more than one product in the 0 order, there is no need for an addition triangle and the relay 500 of the 0 order is operated directly through terminals 600, 610.

The relays of the group 29 which are operated by the various combinations are indicated in the following diagram:

| Switch of group 27 | Switch of group 28 | Relay of group 29 |
|---|---|---|
| 302 | 411 | 112 |
| 303 | 421 | 124 |
| 305 | 441 | 147 |
| 321 | 403 | 122 |
| 322 | 413 | 133 |
| 323 | 423 | 145 |
| 325 | 443 | 165 |
| 331 | 404 | 132 |
| 332 | 414 | 144 |
| 333 | 424 | 154 |
| 335 | 444 | 174 |
| 341 | 405 | 143 |
| 342 | 415 | 153 |
| 343 | 425 | 163 |
| 345 | 445 | 183 |

The mechanism now operates as follows: Relay switch 500 being actuated indicates $1 \cdot 2^0$ or 1.

Only relay 112 of the first addition triangle is energized. Current therefore flows through switch 1111 and switch 1121 to contact 811, and thence to terminal 6111 to actuate relay R'1 and give an indication of $1 \cdot 2^1$ or 2.

In the second order triangle, relays 122 and 124 are operated. Current therefore flows through switch 1211, switch 1221, switch 1232 and switch 1242 to contact 822. This then energizes relay 131 in the third order, while relay R'2 is not energized.

In the third order relays 132 and 133 are energized, and relay 131 is energized from the second order. Current therefore flows through switches 1311, 1322, 1333, 1344 and 1354 to terminal 833. From this terminal the current flows through terminal 6333 and the coil of relay R'3 to terminal 6332 and thence by contact 7323 to terminal 2612 of relay 141 of the fourth addition triangle, thus operating relay R'3 and relay 141. This therefore gives an indication of 1 in the third order, or, in other words, shows that $1 \cdot 2^3$ is a part of the products.

In the fourth order triangle relays 143, 144, 145 and 147 are energized, and relay 141 has been energized from the preceding third order triangle. Current therefore flows through switches 1411, 1422, 1432, 1443, 1454, 1465 and 1475 to contact 845. From this contact current flows to terminal 6445 and through a coil of relay R'4 to terminal 6444, thence by contact 7445 to terminal 2604 of relay 162 of the sixth order, thus actuating that relay, and at the same time setting up relay R'4 to indicate that $1 \cdot 2^4$ forms a part of the product.

In the fifth order relays 153 and 154 are actuated. Current therefore flows through switches 1511, 1521, 1531, 1542, 1553 and 1563 to contact 852. From this contact current flows through connection 7523 to terminal 2612 of relay 161 so as to actuate this relay. As has been explained above, relay R'5 is not actuated since the circuit for operating this relay passes to contact 853, which is not connected.

In the sixth order, relays 163 and 165 are energized, and relays 161 and 162 have been energized by the fifth and fourth order triangles respectively. Current therefore flows through switches 1611, 1622, 1633, 1644, 1654 to contact 864. Current then flows through connection 7645 to terminal 2804 of relay 182 in the eighth order. Relay R'6 is not operated, and there is therefore no indication in the sixth order.

In the seventh order relay 174 is energized, and current flows through switches 1711, 1721, 1731 and 1741 to contact 871, which through terminals 6771 and 617 energizes relay R'7 and indicates that the product contains $1 \cdot 2^7$.

In the eighth order, relay 183 is energized, and relay 182 is energized from the sixth order triangle. The current therefore flows through switches 1811, 1821 and 1832 to terminal 882. From this, current flows to contact 6992 of the coil of relay R'9, thus operating that relay and setting up $1.2^9$ in the product.

The relays which have been set are then those of the 0, 1, 3, 4, 7 and 9 orders. The sum of $2^0 + 2^1 + 2^3 + 2^4 + 2^7 + 2^9$ is 667, which is the product of 29 by 23. The mechanism operates in the same manner for other numbers.

In connection with the seventh and eighth order of the addition triangles and the seventh, eighth and ninth order indicating relays, a slight additional explanation may be necessary.

The first contact 871 of the seventh order triangle operates the relay R'7 in the manner described above. The second terminal 872 operates relay 181. The third contact 873 operates relay R'7 and relay 181. The fourth contact 874, however, is connected through connection 7834 to terminal 6882 of the eighth order indicating relay R'8 and terminal 6992 of the ninth order indicating relay R'9. Only the relay R'9 is operated, the current passing through the coil and terminal 619 to the negative side. The other terminal 6883 of the coil in the eighth order relay R'8 is connected to the contact 883 of the eighth order, which is not connected. Therefore $4 \cdot 2^7$ will register as $2^9$.

The first contact 881 of the eighth order relay is connected to terminal 6881 of a coil, of which the other terminal 618 leads to the negative side, so that closing a circuit through this contact operates the eighth order relay R's to register 1·2⁸.

The second contact 882 of the eighth order triangle is connected through connection 7834 to terminals 6882 and 6992, operating the ninth order relay R's through terminal 819, but not operating the eighth order relay.

The third contact 883 of the eighth order is connected to terminal 8883 of a coil of relay R's, from which the current passes through terminal 8882 to terminal 8992 of the coil of relay R's, and thence through terminal 819 to the negative side. In this way both relays R's and R's are operated, which is proper since $3 \cdot 2^8 = 2^8 + 2^9$.

It will be evident then that the following takes place in the seventh and eighth orders:

When one relay of the seventh order only is operated, relay R'₇ is energized. When two relays of the seventh order are operated, relay 181 of the eighth order is operated so as to set up 1 in the eighth order. When three relays are operated, relays R'₇ and 181 are both operated. When four relays are operated, relay R's is energized.

When one relay of the seventh order and one of the eighth order are operated, relays R'₇ and R's are energized. When two relays of the seventh order and one of the eighth order are operated, relay 181 is operated in the eighth order and this with the other relay of the eighth order operates relay R's. When three relays in the seventh order and one in the eighth are operated, relays R'₇ and 181 are operated, and the two relays now energized in the eighth order operate relay R's. When four relays in the seventh order and one in the eighth order are operated, relays R's and R's are energized independently.

When one relay in the seventh order, and two in the eighth order are energized, relays R'₇ and R's are operated. When two in the seventh and two in the eighth are operated, relay 181 in the eighth order is also operated, so that contact 883 is energized to operate relays R's and R's. When three relays in the seventh order and two in the eighth order are energized, relays R'₇, R's and R's are all energized. This is accomplished since the three relays of the seventh order energize relays R'₇ and 181, so that relays R's and R's are energized through contact 883.

Within the fourth order multiplication it is impossible to energize four relays in the seventh order and two in the eighth order simultaneously, since the amount represented by $4 \cdot 2^7 + 2 \cdot 2^8$ is greater than any possible product. Also it is impossible to have any product in which three of the eighth order relays are energized directly, since there are only two relays of this order which can be energized except from the seventh order. Therefore the arrangement described takes care of all possible combinations.

In the following description, the device which has just been described will be called a "relay multiplier," numeral devices 27 and 28 will be called "factor numeral devices", and the numeral device of the comparator 30 will be called "product numeral device".

DIVISION OF A NUMBER MARKED IN THE BINARY SYSTEM BY A NUMBER MARKED IN THE BINARY SYSTEM

First, it should be noted that the problem of finding the quotient of one number divided by another number can always be caused to correspond to the division of a number by an integer, whatever be the desired approximation. Therefore it is sufficient to effect the division of an integer $a$ by another integer $b$.

According to the definition of the division of integers, in order to find the quotient of $a$ by $b$, I may compare $a$ with the products of $b$ by the natural sequence of numbers, these products being:

$$0, b, b \times 2, b \times 3 \ldots b \times q, b \times (q+1) \ldots$$

until two consecutive products are found, to wit $b \times q$ and $b \times (q+1)$ which comply with the condition that $b \times q$ is smaller than, or equal to, $a$, which, in turn, is smaller than $b \times (q+1)$.

Furthermore, the duration of the operation can be shortened by remarking that if $2^{p-1}$ is smaller than, or equal to, $a$, which, in turn is smaller than $2^p$, the number $q$ is such that $b \times q$ is smaller than $2^p$.

Consequently, in order to find the quotient of $a$ divided by $b$, I proceed in the following manner:

1. I mark the divisor $b$ on one of the factor numeral devices of a relay multiplier, for instance numeral device 27 (Fig. 13a by device 6aR);

2. I mark on numeral device 28, which will be called "quotient numeral device," by device 6aR the highest power of 2 that can be marked by this numeral device, that is to say $2^r$, and I form, by means of the relay multiplier, the product of $b$ by $2^r$, which product is marked on that numeral device of comparator 30 which includes relays R'₀, R'₁, etc. and blades 101¹, 111¹ etc., the comparator being similar to that shown in Figs. 8a, 8b and operating in the same manner.

3. I mark the dividend $a$ on the other set of relays R₀ etc. of the comparator, by device 6aR₂, of ten orders and I effect the comparison between number $a$ and the product marked on relays R's etc. If the first number is equal to the second, the quotient is $2^r$. If the first number is smaller than the second, the quotient is smaller than $2^r$. If the first number is greater than or equal to the second, the quotient is higher than, or equal to, $2^r$.

In the first case, the operation is finished. In the second case, I replace, on numeral device 28, number $2^r$ by number $2^{r-1}$. In the third case, I keep number $2^r$ on numeral device 28 and I add number $2^{r-1}$ to number $2^r$.

And I perform the product of $b$ by the new number marked on numeral device 28, which is done as above explained.

The two first operations are automatically performed by the combination of a relay multiplier, such as diagrammatically shown at 27, 28, 29 in Figs. 13a, 13b and 13c and above described concerning the multiplication of two numbers marked in the binary system, with a comparator 30, a distributor 37 (Fig. 13b), and connections which will be more specifically described hereinafter.

Concerning first said distributor, I devise it in such manner that, after having effected the calculation of each product through the relay multiplier and the comparison of this product with the dividend, it performs the following operations:

On the one hand, to cancel the last digit 1 of the quotient, when the product is greater than the dividend; and, On the oher hand, to mark digit 1 in the next binary order of the quotient.

Such an apparatus is essentially constituted by the following elements: (see Figs. 14a to 14g).

a. A switch, which is constituted by spring blades of identical structure 38, capable of receiving the current from studs 39 (Fig. 14b) and of transmitting it, for instance, to the relays of a relay numeral device, and capable of simultaneously moving upwardly all the blades 38, through an electro-magnet 40;

b. A gradual action switch made of discs $41^0$ to $41^4$ rigid with a shaft 42 and provided with annular elements $43^0$ to $43^4$, partly cut off, and the remaining lengths of which correspond to an arithmetic progression, said annular elements being capable, in the course of the rotation of the shaft, of performing the following operations:

First, to transmit current to contacts 39 by moving down switches $44^0$ to $44^4$ which receive current directly from the positive terminal through contacts shown at 48;

Then, to keep blades 38 in the upward or downward position according as the hook 45 of these blades is above or below the level of the corresponding annular elements $43^0$ to $43^4$, and this in such manner that current cannot flow through blades 38 as long as they are kept in the upper position by annular elements $43^0$ to $43^4$;

c. A rotary switch 46, for example, composed of a drum in the form of a cylinder having a notched portion $46^3$, rigid with shaft $42^1$, and engaged by a brush $46^2$ connected to a source of current and engaging the continuous portion of the cylinder to supply current thereto, and by a second brush $46^1$ connected to the blade $191^1$ of relay R'$_9$ engaging the notched portion of the cylinder, and through which current leaves the cylinder when the brush is not opposite the notch $46^3$. In this manner the current is transmitted to the blade $191^1$ for certain positions only of the shaft $42^1$ corresponding to certain phases of calculation, as will be explained below. The shaft $42^1$ of switch 46 meshes with the shaft 42 in an intermittent manner, for instance through a Maltese cross gearing or connection composed of a continuously turning driving element $47^1$ mounted on shaft $42^1$ and an intermittently driven element 47 rigid on shaft 42.

d. A motor or clutch 52 capable of moving shaft $42^1$, said motor or clutch and the rotary switch 46 being provided with current through an automatic or manual switch 50;

e. An automatic or manual switch $50^1$ so arranged that current can flow from blades 38 to the numeral device 28, this switch being closed only for operations other than multiplication, for example, for division, or square root.

It will be noted that there is a member having two rigidly connected parts 38a and 38b pivoted at 38c. Member 38a is engageable under the blades 38 on one side of the pivot, while member 38b is in a position to be operated by the electromagnet 40. The resiliency of blades 38 tends to hold them in lowered position.

Fig. 14d shows suitable shapes of the discs for a number not exceeding the fourth order of 2, the discs $41^0$ to $41^4$ representing proper proportions of the flanges $43^0$ to $43^4$ in each order.

Fig. 14e is a diagrammatic showing of the electrical connections. Blades $44^0$ to $44^4$ are all connected to a suitable source of current, and may be moved down by the discs $41^0$ to $41^4$ into contact with the terminals $39^0$ to $39^4$ respectively. Blades $38^0$ to $38^4$ are normally in contact with terminals 39, and may be moved out of such contact by electromagnet 40, which operates on all the blades. The other terminals of these blades are connected as shown in Fig. 13b to a switch $50^1$, or to any other suitable device.

The mechanism of Fig. 14e and its position in Fig. 13b is indicated by the broken line showing in Fig. 13b, and marked Fig. 14e.

The operation of said apparatus takes place in the following manner:

In the initial position, the distributor is arranged in such manner that annular elements 43 do not act on any of the switches 44.

The dividend and the divisor being set on devices 6aR, and 6aR$_2$, when the shaft $42^1$ is started, it causes the shaft 42 to move forward one step, which through flange $43^4$ moves downwardly the switch $44^4$ of the highest binary order and feeds current to the corresponding blade $38^4$.

From this time on, the following operations are repeated successively for every period of the rotary switch:

a. First, the multiplier forms the product of the divisor (set on 27) and the number marked on the quotient numeral device (28), the rotary switch member 46 being in such a position as to break the circuit to blade $191^1$ of relay R'$_9$;

b. Then the rotary switch on turning further feeds current to the blade $191^1$ of the comparator. If the product which appears on relays R'$_0$ etc. is higher than the dividend which appears on relays R$_0$ etc., line 609— is energized in the manner described for Figs. 8a, 8b and the electromagnet 40 is operated and lifts all the blades 38 which have not yet been reached by the annular members 43 corresponding thereto, the other blades which have been reached by flanges 23 being kept in the upper or lower position by the corresponding annular members 43.

Finally, after a time shorter than the delay of a numeral device relay of a quotient numeral device, starting from the time at which the electro-magnet 40 can have finished its action (that is, before line 609— is deenergized, if it has been energized), the driven member 47 of the Maltese gearing is turned and causes the gradual action switch to move forward one step, which produces the following results:

On the one hand, either the hook 45 of that one of the blades 38 which has been the last to receive the current is engaged with the corresponding annular element 43, in the case of the product being higher than the dividend (because the electromagnet 40 has been energized from line 609) so that the current remains cut off in the circuit to which this blade belongs, or the annular member 43 passes over the hook 45, so as to hold down blade 38 in the inverse case, so that the current is maintained in the circuit to which this blade belongs;

And, on the other hand, the switch 44 of the next blade is depressed by a flange 43, the rapidity of operation of the rotary switch and of the gradual action switch permitting the engagement of the blade 38 or its maintenance in the lower position according to the indications of the comparator, although the action of said comparator on electro-magnet 40 first has the effect of modifying one of the factors of the product which acts upon the comparator itself.

The operation is finished when all the blades have been tried. The rotary switch is then disengaged in any suitable manner.

Concerning now the connections described above in such an apparatus in addition to the connections corresponding directly to the relay multiplier, they must be established in such manner as to comply with the following conditions:

a. Switches 44 must receive the electric current from the positive terminal through contacts shown at 48 (Figs. 13b and 14e);

b. The blades of the distributor (38, Figs. 13b and 14e) feed current to the quotient numeral device 28, across a manual or automatic switch 50, 50' (as shown by Fig. 13b) capable of acting at the same time on the circuits of blades 38 and on the circuit feeding current to the rotary switch 46 and to the motor or clutch 52, which starts the distributor.

Switch 50, 50' makes it possible to arrange the apparatus either for multiplication or for division, as will be hereinafter explained.

Assuming now that we are to divide 27 by 9. In the binary system, these two numbers are represented by 11011 and 10010 respectively. The result, 3, is written 11000.

We now set up by the mechanism of Fig. 6a the number 9 or 10010 at 56 in Fig. 13a, and the number 27 or 11011 on 59 of Fig. 13b. Mechanism 56 will then operate relays 300 and 330. Mechanism 59 will operate relays $R_0$, $R_1$, $R_3$ and $R_4$. Switches 50, 50' are closed and the mechanism of Fig. 14a begins to operate. By the Maltese gear 47, 47' driven by motor 52, the shaft 42 is moved forward one step and disc $41^4$ depresses blade $44^4$ into engagement with terminal $39^4$. Current then flows to relay 440, representing the number 24 or 16. This, by multiplication with relays 300 and 330 operates relays 147 and 174, thereby operating relays $R'_4$ and $R'_7$, and setting up in the comparator 30 the number 00001001. Since this number has 1 in the seventh order, while the number set on 59 has 0 in that order and all higher orders, the line 609— will be energized (as explained in connection with Figs. 8a, 8b) and the magnet 40 will be operated thereby. This will raise all of the blades 38. As the driven gear 47 now turns, it imparts a step forward to the discs 41. Although the circuit has been broken at 39 by the raising of the blades 38, the timing is such that with the delay in the relays R' and R the blades will remain raised momentarily and during this period flange $43^4$ will catch the hook $45^4$ of the highest order blade $38^4$. During the remainder of the operation this blade will be held in raised position.

Disc $41^3$ now engages blade $44^3$ and closes a circuit through relay 430. This with the various relays of the group 27 will energize relays 135, and 164, thus operating relays $R'_3$ and $R'_6$, and representing the number 0001001. Since this has a 1 in a higher order than any order of the dividend 27, line 609— will be again energized and all of the blades $38^0$ to $38^3$ will be raised. Movement of the disc $41^3$ will now catch the blade $38^3$ and hold it in raised position.

The same thing will take place when blade $44^2$ is depressed, and energizes relay 420, which will energize relays $R'_2$ and $R'_5$, representing the number 001001. This number is still higher than the number set on relays R, and line 609— will again be energized so that blade $38^2$ will be raised and caught by disc $41^2$.

Blade $44^1$ is now depressed, and energizes relay 410. This energizes relays $R'_1$ and $R'_5$, to represent number 01001. In the fifth order, both this number and the dividend have a 1. In the fourth order, however, the dividend has a 1 while the number set on relays R' has a 0, and current will flow to line 609+. Magnet 40 will not be energized, and blades $38^0$ and $38^1$ will therefore remain down. When the discs 41 now turn, disc $41^1$ will pass above nose $45^1$ of blade $38^1$, so as to hold it in depressed position.

Now blade $44^0$ is depressed by disc $41^0$, thus energizing relay 400. Since blade $38^1$ is held down, along with blade $44^1$, relay 410 will also be energized. This will then energize relays $R'_0$, $R'_1$, $R'_3$ and $R'_4$, representing number 11011. Since this is the same as the number on relays $R_0$, etc. current will not flow to either of lines 609+ or 609—, thus indicating that the numbers are the same. As discs 41 turn, they will now engage blade $38^0$ and hold it down.

The quotient is then indicated by the blades 38 which are in depressed position, namely those of the 0 and 1 orders. The quotient is therefore 11000, or 3.

SQUARE ROOT OF A NUMBER MARKED IN THE BINARY SYSTEM

It is to be noted that the procedure of obtaining a square root can be caused to correspond, whatever be the desired approximation, to that of obtaining the square root of an integer, within an approximation of one unit. Therefore it is sufficient to be able to find the square root of an integer within an approximation of one unit.

According to the definition of the square root $b$ of an integer $a$, I may compare $a$ to the series of the squares of the numbers of the natural sequence, which is:

$$0, 1, 4, 9, 16, 25 \ldots b^2, (b+1)^2 \ldots$$

until I find two consecutive integers $b$ and $(b+1)$ which comply with the condition that $b^2$ is smaller than, or equal to, $a$, which, in turn is smaller than $(b+1)^2$.

As this condition differs from that set forth above with reference to division merely in that products $b \times q$ and $b \times (q+1)$ are replaced by the products $b \times b$ and $(b+1) \times (b+1)$, it is clear that the device described with reference to division also applies to the problem of extracting a square root, provided it is completed with means for permitting the simultaneous setting of two equal factors on numeral devices 27 and 28.

I may, for instance, constitute said means by providing connections between the relays of the same order of numeral devices 27 and 28, as shown at 54, said connections passing across a switch 55, either manual or automatic, the function of which is to set the apparatus either for a multiplication or a division, or for the extraction of a square root, as is to be hereinafter explained.

SELECTION THROUGH A SINGLE APPARATUS OF ONE OF THREE OPERATIONS. TO WIT, MULTIPLICATION, DIVISION, OR EXTRACTION OF A SQUARE ROOT

The apparatus the diagram of which is shown by Figs. 13a to 13c is intended to make it possible to perform either a multiplication, or a division, or the extraction of a square root. It makes it possible to calculate the following values:

a. The products of two numbers including from one to five binary digits;

b. The quotient of two numbers including from one to five binary digits, one by the other, the quotient having at most five binary digits;

c. Finally the square root of a number having from one to ten binary digits.

Concerning first the product, the factors are set simultaneously on binary numeral devices 56 and 57, then transferred to relay numeral devices 27 and 28 of the multiplier. Switches 50 and 55 are open. Elements of the same order of the relay multiplier are sent into the addition triangles of this same order of the relay totalizer. The total relays of this totalizer are also relays $R'_0$ etc.

of comparator 30 intended for division and extraction of a square root. But, as far as multiplication is concerned, each switch of the comparator is fitted with a supplementary blade 501 to 509 which serves merely to close the numeral circuit of order $p$ of a binary numeral device 58 on which the product is read.

Concerning now the quotient, the divisor is set on the binary numeral device 56. The dividend is set on a binary numeral device 59 and transferred to the relay numeral device (relays $R_0$ etc.) of comparator 30. Switch 55 is open; switch 50, 50' is closed. Distributor 37 sets coefficient 1 successively on relays of orders 4, 3, 2, 1, 0 of the relay numeral device 28. The multiplier forms the product of the divisor by the number set on numeral device 28. The comparator compares this product with the dividend and, through the distributor 37, cancels the last digit 1 set on numeral device 28 in the case of the product being higher than the dividend and maintains it in the inverse case.

Furthermore, the product can be read on the numeral device 58.

Finally, concerning the extraction of a square root, the number the root of which is to be found is set on numeral device 59 and it is transferred to the relay numeral device $R_0$ etc. of comparator 30. Switches 50 and 55 are closed.

Distributor 37 sets coefficient 1 successively on the relays the orders of which are 4, 3, 2, 1, 0 of the relay numeral devices 27 and 28, simultaneously, and also on binary numeral device 58. The multiplier forms the square of the number set on numeral devices 27 and 28. The comparator compares this square to the number that is given and, through distributor 37, eliminates the last digit set on numeral devices 27 and 28 in the case of the square being greater than the given number and maintains it in the inverse case.

SOLUTION OF SOME EQUATIONS WITH ONE VARIABLE

The apparatus for mechanically and automatically solving an equation with one variable disclosed in the preceding description, relate more especially to equations of the form:

$$F(G, a, b, c \ldots) = 0$$

in which $G$ is the unknown quantity, $a, b, c \ldots$ being known parameters which are variable, and $F$ a function the numerical value of which can be calculated for given values of parameters $a, b, c,$ and variable $G$, preferably through mechanical means and the direction of variation of which, with respect to $G$, is known when said variable is within an interval in which it is known that the root of the equation is, either because this direction of variation is known a priori, or because it is possible to calculate the derivative $F'(G, a, b, c \ldots)$ with reference to $G$ to funtion $F(G, a, b, c \ldots)$, this calculation being preferably carried out through mechanical means.

Parameters $a, b, c \ldots$ keep the same values in the course of a given operation, so that it is possible, to reduce the indication of function $F(G, a, b, c \ldots)$ and its derivative with respect to $G$ to $F(G)$ and $F'(G)$.

Variable $G$ being set on a mechanism, the index of which is controlled through a clutch with two directions of operation, the three manners of operation of which will be characterized by the expressions "forward" to designate the manner of operation for which $G$ increases, "backward" to designate the manner of operation for which $G$ decreases, and "stop" to designate the mode of operation for which the clutch ensures the constancy of $G$, it will be readily understood that it is possible, by making use of a device an embodiment of which will be hereinafter described, by way of example, to set on a relay numeral device the value of $F(G)$ corresponding to the value of $G$ marked on the dimensioned indicator.

Such a numeral device consists of the numeral device $X$ of a zero comparator and the output terminals of said comparator are connected either to said clutch or to an intermediate device which will be more fully described in the following description, according as the direction of variation of $F(G)$ is known a priori or through the value of the derivative function $F'(G)$.

In the first case, function $F(G)$ being linear (it will be supposed, for the sake of example, that it increases) I connect: the terminal (0) of the zero comparator with the "stop" control of the clutch, the positive terminal of the zero comparator with the "backward" terminal of the clutch and the negative terminal of said zero comparator with the "forward" terminal of said clutch, and then, according as said zero comparator marks that number $F(G)$ is, for the value of $G$ indicated by the indicator device, zero, positive, or negative, the index remains in position or moves, either backwards (in which case the value of $G$ decreases) or forwards (in which case said value increases) and function $F(G)$ has the same direction of variation since it has been supposed that this function increases. The value of said function therefore becomes nearer to zero. When it reaches zero, the comparator stops the action of the clutch and the index stops on the value of $G$ for which $F(G)$ is equal to zero, that is to say the root of the equation.

In the second case, in which the direction of variation of function $F(G)$ can be known only by ascertaining the sign of its derivative $F'(G)$, I proceed as follows:

When it is desired to tend toward the value of $G$ for which $F(G)$ is equal to zero, it is necessary, according as $F'(G)$ is positive or negative, to vary $G$ in the direction that causes $F(G)$ to decrease or increase. Now, $F(G)$ and $G$ vary in the same direction or in opposite directions according as the derivative $F'(G)$ is positive or negative.

Being given an approached value $G_0$ of $G$, I calculate $F(G_0)$ and $F'(G_0)$.

If $F(G_0)$ and $F'(G_0)$ are of the same sign, it is necessary to cause $G$ to decrease. If these values are of different signs, it is necessary to cause $G$ to increase.

If $F(G_0)$ is equal to zero, it is unnecessary to ascertain the sign of $F'(G_0)$.

Finally, if $F(G_0)$ is different from zero, and if $F'(G_0)$ is equal to zero, $F(G_0)$ is a maximum or minimum and different from zero. Whatever be the direction of variation of $G$ from $G_0$, $G$ comes nearer to a root of the equation $F(G)=0$ and steps are taken for causing $G$ to tend toward that of the two roots that is closer to the maximum or minimum which can be utilized. Thus, for instance in the case in which this equation has a negative root and a positive root, if the latter is the only possible one (for a reason of continuity when both of the roots are positive), it is the greater root which is the value of $G$ that is looked for, and therefore, if $G_0$ corresponds to a maximum or minimum of $F(G)$, the root of the equation that is to be utilized is greater than $G_0$ and it is necessary to increase $G$ for bringing it nearer to said root.

For this purpose, I make use of the apparatus diagrammatically shown in Fig. 15, which essentially includes the following elements:

a. A first zero comparator 61 in which the number $F(G_0)$ is received;

b. A second zero comparator 62 in which the number $F'(G_0)$ is received; and c. A normal comparator 63.

Concerning now the connections between these respective apparatus, they are established in the following manner:

I connect the bar 64 of comparator 61 with the contact S of the clutch and the negative and positive bars of said comparator respectively with comparator 62 and through the coil of relay 65 of comparator 63 to said comparator 62.

I connect the bar 64' of comparator 62 to the forward contact of the clutch and the negative and positive terminals of said comparator to comparator 63, the positive bar further coacting with the coil of relay 65' of comparator 63.

I couple in the following manner the output bars of said comparator 63:

I connect the two bars corresponding to the identity of the signs of $F(G_0)$ and $F'(G_0)$ to the backward contact R of the clutch and the two bars corresponding to the fact that these signs are different to the forward contact F of said clutch.

This device works in the following manner:

If $F(G_0)$ and $F'(G_0)$ are different from zero, the comparator 63 compares their signs and controls the clutch in the rearward or forward direction, according as they are of the same sign or of different signs.

If $F(G_0)$ is equal to zero, comparator 61 produces the stopping of the clutch and eliminates the action of the comparator 62 which gives the sign of $F'(G_0)$.

Finally, if $F(G_0)$ is different from zero and $F'(G_0)$ is equal to zero, comparator 62 controls the clutch in the forward direction.

It is clear that, in the three cases, said device operates controls capable of varying the value of $G$ in the direction corresponding to the hypothesis that is considered.

The operation of this device is more specifically as follows:

When none of the lines $F(G_0)$ is energized, or when this function is 0, current flows from the + source through all the switches 64—, 64₀ . . . 64ₑ to terminal 64, thence to terminal S of comparator 61 and finally to motor terminal S. Thus motor terminal S is energized whatever be the value of $F'(G_0)$.

If $F(G_0)$ is positive, for example if line $F(G_0)_3$ is energized, relay 61₃ is also energized, moving switch 64₃. Current then flows from the + source to switch 64₃ and then to line 61+ to the + terminal of comparator 61.

If $F(G_0)$ is negative, line $F(G_0)$ — is energized, switch 64— is operated by relay 61—, and current flows from the + source to the — terminal of comparator 61.

If $F(G_0)$ is positive, and $F'(G_0)$ is also positive (as if line $F'(G_0)_4$ is energized), current flows from terminal + of comparator 61 through the coil of relay 65, to terminal 64'' of comparator 62, to switch 64'₄ which has been operated by relay 62'₄, and thence to line 62+. The current then passes through the coil of relay 65' to the input of switch 102¹. Since both relays are energized, the current flows through switch 101¹ to terminal 201⁴ and thence to the terminal R (reverse) of the motor.

If $F'(G_0)$ is negative, terminal $F'(G_0)$ — is energized and operates relay 62—. If $F(G_0)$ is positive, current from terminal + of comparator 61 flows through the coil of relay 65, contact 64'' and switch 64'— to the input of switch 102¹. Since the relay of this switch is energized, while relay 65' is not current flows through switch 101¹ to terminal 201³ and thence to terminal F (forward) of the motor.

If $F(G_0)$ is negative, and $F'(G_0)$ is positive, current flows from terminal — of comparator 61 to terminal 64'', switch 64'₄ (for example), line 62+, relay 65', switch 102¹, switch 101², terminal 201² to terminal F of the motor.

If $F(G_0)$ is negative and $F'(G_0)$ is also negative, current flows from terminal — of comparator 61 to terminal 64'', switch 64'—, switch 102¹, switch 101², terminal 201¹ to terminal R of the motor.

If $F(G_0)$ is negative and $F'(G_0)$ is zero, current flows from terminal — of comparator 61 to terminal 64'', switches 64'—, 64'₀, etc. to terminal 64' and thence to motor terminal F.

If $F(G_0)$ is positive and $F'(G_0)$ is zero, current flows from the + terminal of comparator 61 through the coil of relay 65 to terminal 64'' and then as described in the preceding paragraph. As the switch 102¹ is not supplied with current, operation of relay 65 is immaterial.

TRANSLATION INTO THE BINARY SYSTEM OF A NUMBER MARKED IN THE DECIMAL SYSTEM OR IN ANOTHER NUMERATION SYSTEM

Being given a number set in the decimal system, on a decimal mechanical numeral device (system of wheels, racks the number of teeth of which is a multiple of 10, keyboard), if it is desired to provide an apparatus making it possible automatically to obtain the setting of the same number on a binary numeral device, I have found that it is advantageous to proceed as follows:

If the numeral device of the decimal type is a displacement system, that is to say an apparatus consisting of elements of invariable shape, such as wheels, racks, toothed sectors, and so on, corresponding each to a decimal order and capable of taking ten different positions, corresponding respectively to the ten digits 0, 1, 2, 3 . . . 9, of the decimal composition of a number, I couple with each of these elements the contactor of an electric reading device in such manner that said contactor takes ten distinct positions corresponding to the positions of the movable element of the decimal numeral device.

I dispose the teeth of the bars in such manner that, when the movable element of the decimal order $p$ indicates digit $b_p$ (smaller than 10), the brushes of the contactor are opposite a tooth of a bar for all the binary orders in which the representation of number $b_p.10^p$ includes digit 1, and opposite a hollow in all the other binary orders.

I connect each of these bars with a relay of the triangle of a relay totalizer of the same order as said bar.

Then, if I mark on the decimal numeral device a number N the decimal decomposition of which is:

$$N = b_0 + b_1 \cdot 10 + b_2 \cdot 10^2 + \ldots b_n \cdot 10^n$$

numbers $b_0, b_1 \ldots b_n$ being smaller than 10, all the terms $b_0, b_1 \cdot 10 \ldots b_p \cdot 10^p \ldots b_n \cdot 10^n$ of this number are marked separately on the functional reading devices and on the numeral devices of the relay totalizer, and therefore are added up by said totalizer, the total numeral device of which therefore marks the number N in the binary system.

If the decimal numeral device is of the deformation type, such as a complete keyboard, consisting of nine keys for each decimal order, I fix on each key a brush capable of touching, when the corresponding key is depressed, the teeth of a small bar, said teeth being such that if, for instance, the key represents digit $b$ in the decimal order $p$, the small bar has a tooth for all the binary orders in which the representation of the number $b_p \cdot 10^p$ includes digit 1 and a hollow for all the other binary orders.

I connect each of said bars with a relay of the triangle of a relay totalizer of the same order as said bar.

It will be readily understood that, with such a device, if one depresses, either successively or simultaneously, the keys representing the different digits of a number, all the terms $b_0$, $b_1 \cdot 10$, $b_2 \cdot 10^2$ ... $b_n \cdot 10^n$ of the decimal composition of number N will be added up on the relay totalizer the total numeral device of which will consequently mark the number N in the binary system.

In the case in which it is desired to translate a number marked in a numeration system of any base $u$ into the binary system, I proceed in an analogous manner to that just above described for the translation of a decimal number into the binary system.

The composition of number N being of the form:

$$N = c_0 + c_1 \cdot u + c_2 \cdot u^2 + \ldots c_n \cdot u^n$$

I would form on a totalizer of the relay kind numbers $c_0$, $c_1 \cdot u$, $c_2 \cdot u^2$ ... $c_n \cdot u^n$, by means of devices analogous to those just above described.

Figs. 15a and 15b show a mechanism for carrying out this arrangement.

Racks 700 to 703 of a decimal mechanism (see Fig. 15a), which racks are movable each to ten different positions representing 0 to 9 in the 0 to 3 decimal orders, carry secured to their ends brushes 201⁰ to 201³ which are movable over successive surfaces 750 to 753 of the type shown in Fig. 1, having the necessary contacts for representing numbers 1 to 9 in the 0, 1, 2 and 3 decimal orders respectively. The 0 order will have four output lines, the 1 order will have six, the 2 order will have eight, and the 3 order will have eleven output lines, representing binary orders 0 to 3, 1 to 6, 2 to 9 and 3 to 13 respectively. An addition mechanism of the type shown in Fig. 10a (see Fig. 15b) is controlled by these various lines, this mechanism having two relays in the first order, four in the second, five in the third, five in the fourth, five in the fifth, five in the sixth, four in the seventh, four in the eighth, four in the ninth, three in the tenth, three in the eleventh, two in the twelfth and two in the thirteenth, and having indicator relays controlled in orders zero to fourteen respectively. The mechanism operates in the same manner as that shown in Fig. 10a upon the energization of the relays, transfer relays being provided where necessary, and it is believed that a full description of its operation is not necessary as the same will be apparent from Fig. 10a. It should be explained, however, that the relays in the triangles have been indicated by a letter $a$ to $d$, indicating racks 750 to 753 respectively, and a number indicating the order of the triangle. Relays preceded by the letter $t$ are transfer relays, the first number indicating the order of the triangle from which and the second the order to which transfer takes place, these numbers being separated by a decimal point.

TRANSLATION INTO THE DECIMAL SYSTEM OR INTO A SYSTEM OF ANY BASE OF A NUMBER EXPRESSED IN THE BINARY SYSTEM

I may first, according to a first solution, account being taken of the fact that the numbers of the binary representation of a number represent each a determined number of simple units (digit $a_i$ representing for instance number $a_i.2^i$), successively set these various numbers on a decimal totalizer (it being supposed that the translation is made from the binary system into the decimal system), which has the effect of adding them up, the decimal totalizer thus representing, at the end of the operation, the number that is considered and making it possible either to read it on a reading device or to print it on a paper or the like.

Thus, supposing for instance that the decimal totalizer is a mechanical totalizer, I may make use of electro-magnets for simultaneously actuating some keys or the like of a complete keyboard capable, according to a known system, either of limiting the movement of the movable elements of the decimal totalizer in such manner that the latter receives the marked number written on the above mentioned complete keyboard, or of performing any other desired function.

Then:

On the one hand I connect said electro-magnets with the numeral circuits of the binary numeral device on which the number is represented, in such manner that, if the decimal composition of number $2^h$ is:

$$2^h = b_{h_0} + b_{h_1} \cdot 10 + b_{h_2} \cdot 10^2 + \ldots b_{h_n} \cdot 10^n$$

in which numbers $b_{h_i}$ are smaller than 10, the numeral circuit of order $h$ can feed current respectively to electro-magnets $b_{h_0}$, $b_{h_1}$, $b_{h_n}$ of the respective decimal orders 0, 1, 2 ... $n$.

And on the other hand I provide a rotary switch capable of feeding current separately and successively to the circuits at a rate such that a circuit receives current only after the addition in the decimal totalizer of the number that is represented by the preceding circuit is finished.

Figure 16:
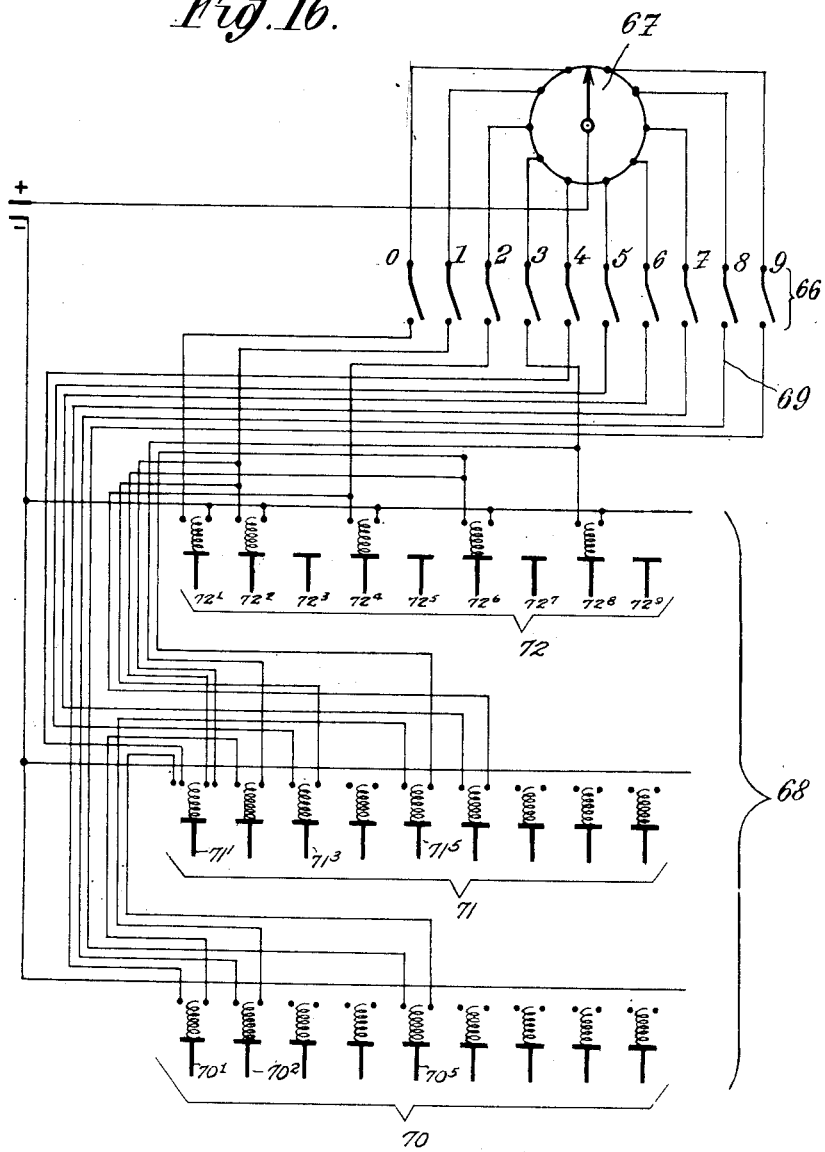

It is possible, for this purpose, to have recourse to the embodiment shown in a diagrammatical manner in Fig. 16 and according to which it is assumed that the numbers to be marked on the numeral devices were smaller than 1000.

According to this embodiment, I provide a binary numeral device 66 the circuits of which (ten of them) numbered from 0 to 9, receive current from a rotary switch 67; and a complete decimal keyboard 68, formed of three rows of nine keys, capable of controlling a totalizer, not shown, each key being for instance adapted to be actuated by an electro-magnet.

Furthermore, I arrange the device in such manner that each binary circuit, such for instance as the circuit 69 of the eighth order which represents the number $2^8 = 256$, is inserted in a more general circuit including electro-magnets $70^2$, $71^5$, $72^6$, which respectively control key 2 in the order of hundreds, key 5 in the order of tens, and key 6 in the order of units. Advantageously, I arrange the elements in such manner that current flows through the relays in the order of the decreasing decimal orders, this arrangement making it possible on the one hand, to feed the current from different circuits to the same relay, for instance to a relay such as 72⁸ without the relays of higher order being operated when said relay 72⁸ is to be actuated alone and, on the other hand, of reducing the total number of relays necessary in the device, some relays, for instance relay 71¹, being however necessarily of the multiple winding type.

The switches 66 may be separately controlled in any suitable manner, as for example by relays 500 to 509 of the mechanism shown in Fig. 10a, so that the switches are closed only in those orders in which the coefficient is 1.

Let us assume that the number 101001011 is set up on mechanism corresponding to that of Fig. 6a, and that switches 66⁰, 66², 66⁵, 66⁷ and 66⁸ are closed thereby. As the switch 67 turns, current will flow first through switch 66⁰ and energize relay 72¹. The mechanism controlled by the keys must then, as after each step of switch 67, perform an addition. Current will next flow through switch 66² and energize relay 72⁴. From switch 66⁵ current will flow through relay 71³ to relay 72² and will operate both these relays. From switch 66⁷ current will flow through relay 70¹ to relay 71² to relay 72⁸, operating all three of these relays. From switch 8 current will flow through relay 70² to relay 71⁵ to relay 72⁶ operating all three of these relays. Relays will then have been operated representing the numbers 200, 100, 50, 30, 20, 8, 6, 4, 2 and 1, the sum of which is 421, which in the decimal system represents the number 101001011 in the binary system, and such sum will appear on the totalizer controlled by the magnets.

The double coil shown for relay 71¹ is similar to the double coil shown in Fig. 10a, the two inner terminals being connected to one coil and the two outer terminals to another coil so that a circuit through either pair of terminals will operate the relay.

It is also possible, according to another embodiment, in order to translate into the decimal system, or into a system of any other base, a number represented in the binary system proceed in the following manner:

a. On the one hand to coordinate in such a manner, with a decimal numeral device, a dimensioned values marking device the index of which marks only integers, that the number marked on said decimal numeral device is equal to the number set on said binary numeral device; and b. On the other hand, to place the marking device in question under the control of a binary numeral device as already explained in the preceding description.

I may have recourse, for carrying out this second embodiment, to a device such as that diagrammatically shown in Fig. 17, which device is essentially composed of the following elements:

a. A dimensioned values indicator which is constituted by a toothed wheel 75 on which is marked, at least virtually, an index, said wheel being movable in front of a graduation, either real or fictitious, each unit of said graduation corresponding to a tooth of said wheel.

b. A motor 76 capable of driving said wheel; said drive being either in the forward direction (direction for which the number indicated by the dimensioned values indicator increases) or in the rearward direction (direction in which said number decreases), the position of said motor corresponding to the stopping of the movement being designated by the indication "stop";

c. A reversible decimal totalizer 77 and a totalizer of a base equal to $2^p$, also reversible, the unit wheels of said totalizers being constantly in mesh with wheel 75 (the gear ratio being 1:1 for the totalizer 77, and 4:5 for the totalizer 78) and the directions of rotation for addition for each of these two totalizers being chosen in such manner that:

The numbers increase simultaneously on totalizers 77 and 78 and on marking device 75, and These three devices indicate zero simultaneously.

d. Finally a comparator 79 like that of Figs. 8a, 8b including two relay numeral devices corresponding to relays $R_0$, etc. and $R'_0$ etc. respectively.

I further provide, on each of the wheels of the totalizer 78, a number $p$ of circular rings provided with teeth capable, in the course of the rotation of the wheel, of coming into contact with brushes 83, electrically insulated from one another, the whole of said rings being identical with the whole of the binary numeral device of a circular electric reading device of an order equal to $p$ of the type shown in Fig. 3.

Concerning then the connections to be established between these various mechanisms and the binary numeral device 80 on which is set the number N which it is intended to translate into the decimal system, they are preferably made as follows:

The various brushes 83 being characterized by two indexes, to wit the order $k$, in the numeration of an order equal to $2^p$, of that of the wheels of the totalizer 78 upon which depend respectively each of said brushes and the binary order $h$ of each of the latter in the numeral device carried by said wheel, I connect the brush the indexes of which are $k$, $h$ with the relay the order of which is $k_p+h$ of the relay numeral device 81 of comparator 79, which numeral device 81 then indicates the number N' indicated by the dimensioned values indicator.

Finally, I connect the output terminals of said comparator with the terminals of the clutch 76 in such manner that:

The terminal which makes it possible to ascertain that N is greater than N' is connected to the forward terminal (—);

The terminal which makes it possible to ascertain that N is smaller than N' is connected to the backward terminal (+);

And the terminal which makes it possible to ascertain that N is equal to N' is connected to terminal (0) (stop).

The operation of this device takes place in the following manner:

Number N being set on the relay binary device 80, number N', represented by the dimensioned values indicator 75 is translated into the system the base of which is $2^p$ by totalizer 78 and therefore into the binary system through the electric reading device consisting of brushes 83 and rings 82. It is further marked on the binary relay numeral device 81. If N is equal to N', the device remains at rest, in which case, number N is marked on the decimal totalizer 77. If N is different from N', the motor causes wheel 75 to turn in the direction that corresponds to N' becoming nearer to N, until N' is equal to N.

Among the advantages which result from the insertion of a mechanical totalizer of the numeration system having $2^p$ as base between the relay numeral device 81 and the marking device 75, there should be noted the rapidity of operation of the device, the motor serving merely to turn the unit wheels of the totalizers and said wheel being accordingly constructed of small size and with a low inertia moment with respect to its axis of revolution.

The devices which have just been described permit the transcription of a number from the binary system into a system having any base $u$, through the mere substitution of a totalizer the base of which is $u$ for the decimal totalizer 77.

This mechanism operates in the following manner:

79 represents a comparator of the type shown in Figs. 8a, 8b the terminals 80 of the relays R, R₀ etc., for example, being connected to relays 506, etc. of a binary numeral device such as shown in Fig. 10a, for example, while the terminals 81 of the relays R', R'₀, etc. are connected to brushes 83 as shown. At $G_2$ and $G'_2$ are indicated gears of 8 to 1 ratio transmitting movement from each wheel 82 to the succeeding wheel, while at $G_{10}$ and $G'_{10}$ are indicated gears transmitting at a 10 to 1 ratio from wheel $10^0$ to wheel $10^1$ and wheel $10^2$. Wheels $10^0$ and $82^0$ are geared together by gear 75, which may be driven by a clutch 76 controlled for movement in forward or reverse, or for stopping by the three lines +, — and 0, the + and — being connected to the lines 609+ and 609— respectively of comparator 79 of Figs. 8a, 8b and 0 to line — of such comparator.

Assuming that the wheels 82 and 10 are set to 0, and a number is set on the mechanism 10a, the comparator will indicate that this number is greater than 0, and will energize the — line so that clutch 76 will drive gear wheel 75 in the forward direction. As the gear turns, current will be supplied from the wheels 82 to brushes 83. The arrangements of the contact strips or rings on the three wheels 82 is the same, the strips on wheel $82^0$ representing $2^0$, $2^1$, and $2^2$ from the outside in, those on wheel $82^3$ representing $2^3$, $2^4$ and $2^5$, and those on wheel $82^6$ representing $2^6$, $2^7$ and $2^8$. For each full turn of wheel $82^0$ wheel $82^3$ will turn one-eighth, and for each full turn of wheel $82^3$ wheel $82^6$ will turn one-eighth. The zero line on wheel $82^0$ is indicated at $8^0$ in Fig. 17, the device not being shown in the drawing as set at 0. The three wheels turn in the direction indicated by the arrow.

It will be apparent that when wheel $82^0$ turns one-eighth of a turn, brush $83^1$ will engage strip $84^1$, and will indicate $2^0$ on the relays R' of the comparator (which in this case reads from left to right instead of from right to left). As wheel $82^0$ advances it will set up successive numbers on the comparator until as it completes a full turn, or in the last eighth of its revolution, it represents $2^2+2^1+2^0$. During its next revolution, segment $84^3$ of wheel $82^3$ will be brought into engagement with brush $83^3$, and as the wheel $82^0$ advances it will therefore set up consecutive numbers on the comparator. At the same time, wheels $10^0$, $10^1$ and $10^2$ will be advanced to set up the corresponding numbers in the decimal system. When the number on the relays R' becomes equal to the number on the relays R, and set by 10a no more current will flow through the comparator and the clutch 76 will be deenergized. When this occurs the number on totalizer 77 will be the decimal equivalent of the binary number set on 10a.

If at the beginning of the operation wheels 82 are in a position other than 0, the device will still operate. If the number set on these wheels is smaller than that set on mechanism 10a, the clutch 76 will advance gear 75 until the two are equal. If it is larger, the + line will be energized, and clutch 76 will turn gear 75 in the opposite direction, reducing the number on wheels 82 and totalizer 77, until it is equal to that set on 10a.

Finally, whatever be the embodiment that is chosen, it will be readily understood that the various apparatus above mentioned, the operation of which follows sufficiently clearly from the above description without any need of further explanations, can be combined in various manners according to the nature and the complexity of the problems that are to be solved. In any event, these apparatus have, among other advantages, that of making it possible to perform automatically and very quickly operations and calculations which are relatively complicated, while being of a size and weight which are relatively small.

According to another embodiment of the present invention, I make use, for representing every binary order in a binary reading device, of a corresponding number of metallic elements having castellated edges preferably of circular shape, which elements are connected to the positive terminal of a source of current and which are adapted to coact with an equal number of contactors connected to the other terminal of said source of current, said contactors being preferably constituted by metallic jaws adapted to engage the teeth provided on the edges of said metallic elements.

An example of such an embodiment of the invention is shown in Fig. 18 of the accompanying drawings.

In this example, the circuits of the electric reading device are constituted by metallic elements having a castellated edge, such for instance as discs 201 which are preferably fixed on a common shaft 202, these discs being connected to the positive terminal of a source of current and their teeth 203 and hollows 204 being so dimensioned that they make it possible to materialize, for a certain number of angular positions of said shaft 202, the coefficients 1 and 0 respectively corresponding to each binary number in a plurality of different numbers which may be either a portion of the sequence of numbers or the successive values of a numbered or dimensioned function, within a given interval.

With each of these discs 201, I cause to coact a contactor which is connected to the other terminal of said source of current and which preferably includes a pair of jaws 205 which are mounted astride the periphery of the disc in such manner that said jaws can bear respectively, through contacts $205^1$, provided for this purpose at the end of each of these jaws, against both faces of each tooth 203, the said jaws being adapted to contribute to guide said teeth in case of disc 201 being slightly warped.

Such a reading device has, with respect to reading devices constituted by metallic rules embedded in an insulating block, the advantage of being of smaller weight and size and of being much simpler to make, since castellated discs can easily be manufactured in great quantities.

I might also, according to another embodiment of the invention, make said electric reading device in such manner that it includes, for materializing every binary order, several strips or discs which can coact with the same number of contactors, said strips or discs being respectively adapted to represent numbers ranging within different intervals and means being provided for ensuring the bringing into play in the various binary orders, preferably in an automatic manner, of the contactors and strips or discs corresponding to the interval in which is the number to be represented.

I may, for instance, carry out such an arrangement, by making use of one of the embodiments shown in Figs. 19 and 20 of the drawings, which embodiments relate to reading devices of the type including strips 206 embedded in a cylinder 207 of an insulating material.

According to the first of these two embodiments, said strips are distributed over the cylinders 207, in several zones, for instance three zones A, B, C, separated from one another by radial planes which intersect the surface of said cylinder along three lines, said planes being, for instance, at angular intervals from one another of 120° as shown by Fig. 19.

I cause to coact respectively with the rules located in each of said zones, three sets of brushes 208, 208' and 208'', which are mounted in such manner, on the same number of distinct movable supports 208, that they can be moved away, from, or, on the contrary, brought into contact with, the corresponding strips, the brushes corresponding to the same order being connected to the same conductor.

According to the second of these embodiments (Fig. 20), zones A, B, C are separated from one another by planes at right angles to the axis of cylinder 207, each strip then running completely around said cylinder.

Preferably the sets of brushes 208, 208' and 208'' are mounted on the same support, such for instance as a shaft 209 mounted parallel to the lines of cylinder 207, said sets of brushes being disposed at angular intervals from one another in such manner that two of them cannot coact simultaneously with the strips of said cylinder.

I provide suitable means for causing the movement of the indicating device to produce an angular displacement of shaft 209, capable of bringing into play one or another of said sets of brushes.

Such reading devices have, over an ordinary reading device made with only one strip and one contactor for representing every binary order, the following advantages:

In the case of the first example, the operation is quicker because the displacement of the cylinder about its axis for representing any number can, at most, reach 120°, whereas, for the aforesaid ordinary reading device, it can be as great as 360°.

In the case of the second example, the advantage lies in the fact that the space occupied in the diametral direction is smaller than with the aforesaid ordinary reading devices.

Now, if it is desired to provide a binary calculation device intended to include sets of switches it is advantageous to employ another feature of the present invention which consists in providing a mechanical binary reading device for operating said switches.

For instance, if said calculation device is a multiplier, I may have recourse to the arrangement partly shown in Fig. 21 of the drawings, according to which the following conditions are complied with:

a. On the one hand the numeral device of the multiplicand directly establishes, in every binary order, as many derivations as the binary representation of the multiplier requires binary orders. For this purpose, I may advantageously, by way of example, have recourse for representing each binary order in said numeral device, to metallic blades $L^0$ to $L^7$ (supposing that the binary representation of the multiplicand calls for at most seven orders) each of said blades being cut away in such manner as to be able to support vertical blades $m^0$ to $m^7$ corresponding respectively to the 7 binary orders which are necessary for ensuring the representation of the multiplier.

b. On the other hand the mechanical reading device of the multiplier which is constituted for instance by cams $c_0$ to $c_7$, mounted on a common shaft 210, coacts with said blades $m_0$ to $m_7$ for instance through insulating movable bars 211, respectively subjected to the action of each of said cams, against the action of springs 212, each bar being capable of applying all the blades $m_i$ corresponding, in the different orders of the multiplicand, to the same binary order of the multiplier, against the same number of output tongues 213, each of said elements 213 then characterizing the sum of the binary orders of the multiplicand and the multiplier to the representation of which it cooperates.

For instance, if the multiplicand is equal to $2^3$, the current will be fed to all the blades $m$ corresponding to blade $L^3$ of the numeral device of the multiplicand, and if the multiplier is equal to $2^2$, the corresponding bar will be pushed toward the right, the current then flowing out through a bar 213' characterizing the order 2+3 that is to say 5.

The shapes of cams $C^0$ to $C^4$ respectively are shown in Fig. 22, and from this figure it will be apparent that bars $211^0$ to $211^4$ will be selectively operated in accordance with the position of shaft 210 so as to represent any number below $2^5$. These cams by shifting bars $211^0$ to $211^4$ represent the operation of relays 400 to 440 in Fig. 13a. At the same time, blades $L^0$ to $L^4$ are energized by a mechanism of the form shown in Fig. 6a, thus representing relays 300 to 340 of Fig. 13a. Blades 213, 213' are properly connected to the triangles of a mechanism of the type shown at 29 in Figs. 13b, 13c and the whole device operates in the same general fashion.

Finally, if it is desired to establish a multiplication mechanism, it is advantageous, according to still another feature of the present invention, that said mechanism should be able to ensure the representation of the logarithms of the factors of the product, said mechanism performing the sum of said logarithms, a controlled reading device being further provided for ensuring the representation of the product from its logarithm.

For this purpose, said multiplication mechanism essentially includes the following elements:

a. A number of functional reading devices equal to the number of factors of the product, the strips or discs of each of said reading devices being arranged in such manner that, for each position of the reading device determined by a number or dimensioned value inscribing device, there corresponds the expression, in the binary system, of the logarithm of the factor inserted into the muliplication mechanism through said inscription device; and b. A relay totalizer, such for instance as that above described, capable of effecting simultaneously the sum of all the logarithms marked on said functional reading devices.

If it is desired to obtain the expression of the product in any system, for instance the binary system, the decimal system, or the english system, it is possible to cause to coact with said relay totalizer a controlled reading device capable of establishing the correspondence between logarithms expressed in the binary system and numbers expressed in said usual systems.

Such a multiplication mechanism has, over that described in the above disclosure, the considerable advantage of making it possible simultaneously to effect the product of a number of factors which is only limited by the number of functional reading devices of said mechanism.

I might also, for producing mechanisms for binary calculation intended to include sets of switches, have recourse to another feature of the invention according to which I cause to coact mechanically strips or the like of a mechanical reading device with the corresponding number of multiple blade switches.

In the case, for instance (as will be assumed hereinafter) of a mechanism which is to perform additions, that is to say a mechanism including essentially a totalizer and the same number of binary reading devices as there are possible terms in the sum, it is advantageous to have recourse to the embodiment shown by Fig. 23, which is based upon the following features:

Each slide 8300 of every reading device is caused to coact with a lever 8301 turnable about a pin 8302 and fitted with a tooth 8303 capable of engaging in the hollows 8304 of slide 8300 or of bearing against the teeth 8305 of said slide. It should be noted that said slide 8300 can be rectilinear or of any other shape.

Lever 8301 carries a plurality of blades 8306. Each blade is capable of feeding the current it receives to either of two consecutive terminals 8307.

Lever 8301, fitted with its blades 8306, plays the same part as one of the switches $Cn$ of the addition triangle shown by Fig. 10. It makes it possible, according as slide 8300 includes digit 0 or digit 1 for a number N, in order $h$, to pass in the triangle of order $h$ of the totalizer the current from a contact stud $i$ either to the contact stud $i$ of the next switch or to the contact stud $i+1$ of said switch. The number of blades 8306 on each lever 8301 and also the connections between contact studs 8307 corresponding to levers 8301 coacting with the rules of $h$ order of the various reading devices, that is to say the levers 8301 corresponding to the same triangle of an order equal to $h$ are established according to the rules above set forth with reference to the addition triangle represented by Fig. 10, the switches especially intended for transfers being still controlled by means of relays.

Although slide 8300 can be given a saw teeth shape in such manner as to permit its displacement with respect to lever 8301, it seems preferable to give the teeth of said slide a rectangular shape and to provide a control system making it possible to lift said lever with respect to slide 8300 when the latter is displaced. Such a system may, for instance, be made as follows:

The pivot pin 8302 of the lever 8301 is mounted at the end of an arm 8308 pivoted about a fixed axle 8309, arranged in such manner that, when said arm is caused to turn in the direction indicated by the arrow, it tends to move lever 8301 away from slide 8300.

I provide, in said lever, a slideway 8310 in which there is slidably mounted the pin 8302. Said slideway may be of a length making it possible merely to move away levers 8301. Or, preferably, said slideway is of a length such that, when arm 8308 has finished its movement in the direction indicated by the arrow, the action of the lever is changed, that is to say tooth 8303 can again coact with slide 8300, but this time in such a manner that a tooth 8305 produces a lowering of blades 8306 and a hollow 8304 produces a lifting of said blades, which makes it possible, as will be hereinafter more fully explained, with reference to the reverser system, to set 1 in the triangle of order $h$ every time the digit representing said order in the number that is considered is equal to 0 and inversely to mark 0 when said digit is equal to 1.

I provide, on lever 8301, a lug 8311 capable of coacting with a stop 8312 for limiting the displacements of said lever, a spring 8313 being advantageously further provided which tends to bring back said lever into its lower position.

Such a system has, over the combination of a reading device and a relay totalizer, the considerable advantage that it includes no relay.

Furthermore, the system for unlocking the teeth of the slide renders the working of the device noiseless and makes it possible to give said teeth a square or rectangular shape which, for a given length of the teeth, is stronger than the triangular shape, which should otherwise be employed if tooth 8303 could not be moved away from slide 8300.

Although I might dispose the levers 8301 corresponding to the various slides of the same order side by side, or in any other way, it seems preferable, for reasons of construction, to arrange them, according to the embodiment illustrated by Fig. 24, in which the levers 8301 corresponding to the different orders of the same term are mounted on a cylindrical support 8314, in parallel transverse planes, and coact with a corresponding number of circular slides 8300.

Although this arrangement is advantageous, I may also have recourse to the arrangement illustrated by Fig. 25, by way of modification. In this case, I provide insulating pieces 8306', rigid with levers 8301, capable, according to the position occupied by lever 8301, either of leaving in mutual contact groups of two blades $8307^0$, $8307^1$, $8307^i$, in such manner that the current flowing in through a blade having an index equal to $i$ also flows out through a blade having the same index $i$, or of inserting themselves between the blades of these groups, in such manner that each blade comes into contact with one of those of the succeeding group, that is to say the current flowing in through a blade the index of which is $i$ flows out through a blade the index of which is $(i+1)$.

Advantageously, I mount the whole of pieces 8306' on a support 8315 controlled by two levers 8301 and 8301' disposed symmetrically between two cheeks 8316 at right angles to the axis of support 8315.

I thus obtain an element of an addition triangle, these elements being eventually grouped either in such manner as to constitute a triangle of an order equal to $h$, or in such manner as to connect all the elements corresponding to the same reading device.

It has been above explained, with reference to the totalizers, that these devices are arranged in such manner that transfers take place directly from a triangle of order $h$ to the triangles of higher orders $h+1$, $h+2$ ... etc. For instance, four units in order $h$ gave rise to a transfer which is performed by marking one unit in the triangle of an order equal to $h+2$, without passing through the triangle of an order equal to $h+1$.

According to another general feature of the present invention, I can arrange a totalizer in such manner that all the transfers of a triangle the order of which is $h$ are effected on the triangle the order of which is $h+1$.

This result can be obtained in the following manners:

a. Either by adding to every addition triangle a number of switches equal to one-half of the number of contact studs of the triangle of the next lower order, all the switches being arranged as above explained:

b. Or by adding to each switch of a triangle analogous to that above described a number of supplementary blades also equal to one-half of the number of contact studs of the triangle of the next lower order.

If the number of contact studs is an odd number, I take one half of the next lower integer.

The first of these solutions makes it possible to obtain a totalizer the operation of which is quicker because every switch has a lower inertia. On the contrary, the second solution is simpler and it is that considered in the following description.

Of course, these supplementary blades or switches correspond only to the triangles which may give rise to transfers, that is to say triangles of an order higher than 0.

Figure 26:
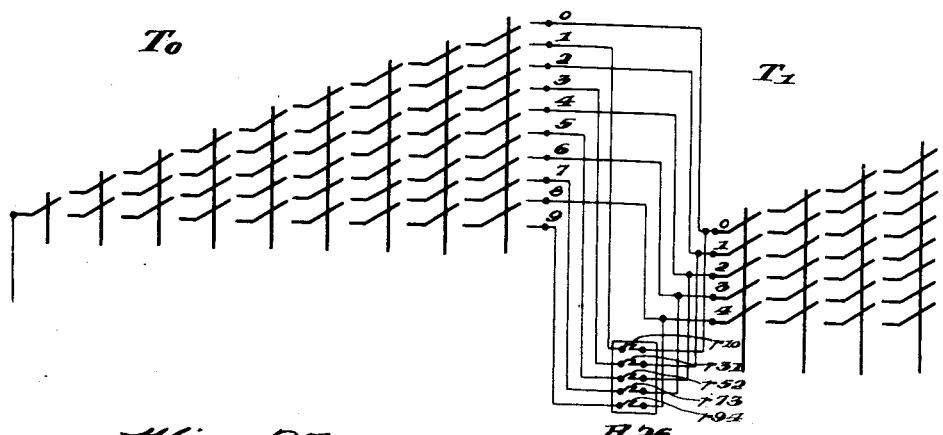
Fig. 26 is a diagram showing a part of an apparatus according to the invention for effecting additions.

In the diagram of Fig. 26 I have shown, by way of example, the connections to be provided for effecting the transfers of triangle $T_0$, of an order equal to 0, to triangle $T_1$ of an order equal to 1, for a totalizer which makes it possible to add up nine terms.

The output contact studs of triangle $T^0$ being numbered, from top to bottom, from 0 to 9, and the input contact studs of triangle $T^1$ being numbered from bottom to top, from 4 to 0, I connect the output contact stud 0 of triangle $T_0$, to which there corresponds no inscription in order 0 and no transfer, to the input contact stud 0 of triangle $T_1$.

I connect the even-numbered output contact studs of triangle $T_0$, that is to say contact studs 2, 4, 6 and 8, respectively with the input contact studs 1, 2, 3 and 4 of triangle $T^1$, because they give a transfer of 1, 2, 3 or 4 units, respectively, into order 1.

Finally, I arrange the odd-numbered output contact studs of triangle $T_0$, to wit contact studs 1, 3, 5, 7 and 9 in such manner that they cooperate with the same indicator $R^{26}$ of a numeral device, said indicator $R^{26}$ being constituted by a multiple winding relay having coils $r10$, $r31$, $r52$, $r73$ and $r94$ connected to said studs respectively and further connected respectively to the input contact studs 0, 1, 2, 3 and 4 of triangle $T_1$.

In this way, the current flowing out through one of the contact studs from 0 to 9 of triangle $T_0$ flows, in all cases, through triangle $T^1$ after having ensured the inscription of digit 1 in order 0 if there remains one unit in this order once the transfer to triangle $T^1$ has been performed.

Of course, the same arrangement of the connections would be employed if supplementary switches had been added instead of supplementary blades.

Such a totalizer has the particular advantage that it does not include a transfer relay and is therefore simpler than that precedingly described.

I may, further, according to still another feature of the invention, arrange the device in such manner that the windings of all the relays R have the same resistance and insert in series a resistance equal to that of each of said windings in all the conductors connecting together two consecutive addition triangles without passing through the relay mounted between said triangles.

This last mentioned arrangement has the advantage of rendering more regular the operation of the totalizer and increasing its rapidity of operation, since the intensity of the current flowing therethrough is independent of the path through which said current flows, that is to say of the value of the terms to be added together.

I will now describe another embodiment of a device making it possible to effect, in the binary system, an algebraic sum through the so-called "method of complements."

It is known that the method of complements consists in replacing every subtractive term by an additive term which can be obtained in the following manner:

1. The subtractive term is inscribed with significative digits as far as the highest order $n$ among the binary orders which may include digit 1 in the representation of the numbers that any of the numeral devices of the binary totalizer is intended to mark and in the number thus obtained all the 1 are replaced by 0 and all the 0 are replaced by 1.

2. 1 is then added, in order 0, to the number thus obtained.

3. 1 is inscribed in all the orders higher than $n$ as far as the highest order existing in the totalizer.

In order to perform these three operations, I add to the addition triangles of an order higher than $n$ of a totalizer as many blades and numbered contact studs as there are terms capable of being subtracted (or as many supplementary switches, the number of blades of the normal switches remaining in this case unchanged).

The number obtained is transmitted to the totalizer by taking the digits of the subtractive term as far as order $n$ and replacing 0 by 1 and 1 by 0, for instance by means of a device such as that described just above (Fig. 23) in which the axis of articulation of lever 8301 is displaced by means of a sign control, in such manner that the addition triangles received said number when the the blades mark the subtractive term.

In combination with said totalizer, there is provided a device, which will be hereinafter called "distributor" and which is capable of performing the following functions:

a. When the number of subtractive terms is equal to $k$, it feeds current to a supplementary blade of rank $k$ of the triangle of the order 0.

b. It moves forward $k$ ranks in each of the addition triangles of an order higher than $n$ the number of the numbered contact stud that receives the current.

c. And it places a set of brushes, with respect to contact studs which would constitute the input contact studs of the addition triangle successive to the highest order in such manner that, when one of the brushes is on the contact stud of rank $k$, the other brushes are on all the contact studs of ranks lower than $k$, this in order to make it possible to recognize, by means for instance of an electric signal, if the current has issued through the contact stud of rank $k$ or through a contact stud of lower rank, this indication making it possible to determine the sign of the sum marked on the totalizer, for the following reasons:

Through the method of complements, I replace each subtractive term the absolute value of which is $a$ by $2^q-a$, $q$ being the order of the highest order triangle of the totalizer. If I designate by $b$ the positive terms of the sum and if there are $k$ subtractive terms, the desired sum will be $\Sigma b-\Sigma a$, but the sum S marked on the totalizer will be $$S=k\ 2^q-\Sigma a+\Sigma b$$

If the current leaves the triagle of order $q$ through the contact stud of rank $k$, S is greater than $k$, $2^q$, and therefore $\Sigma b-\Sigma a$ is positive.

On the contrary, if the current leaves through a contact stud of a rank lower than $k$, then S is smaller than $k\ 2^q$, and consequently $\Sigma b-\Sigma a$ is negative.

Therefore the rank of the contact stud through which the current flows out makes it possible to know the sign of the sum.

Figure 27:
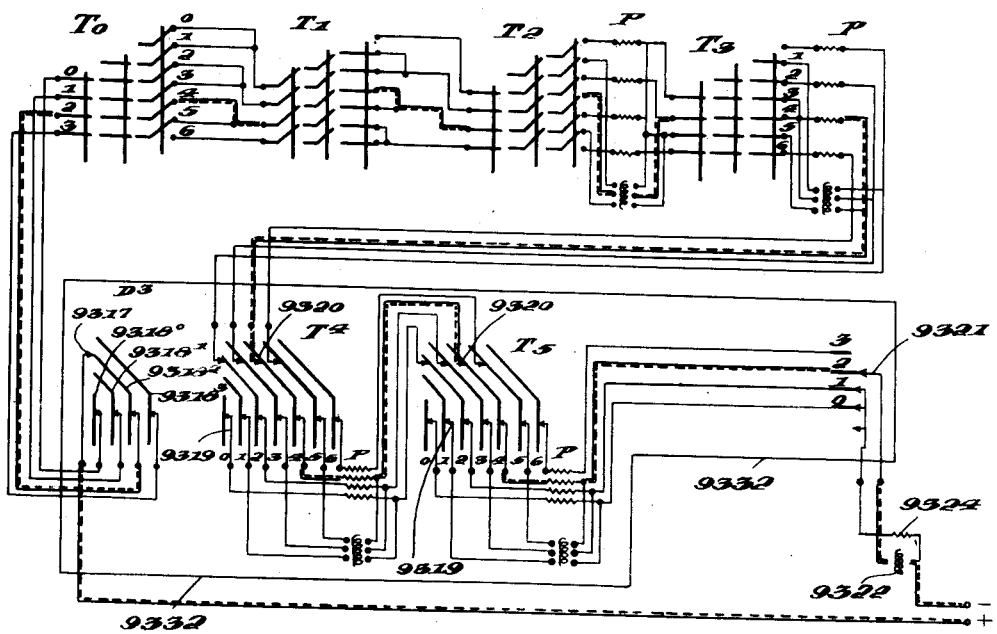
Fig. 27 is a diagram of the arrangement of an apparatus for performing algebraic sums.

In Fig. 27, I have shown diagrammatically and by way of example, an embodiment of a totalizer and a distributor in which it has been supposed that the maximum order represented in the totalizer is order 5, the order $n$ above described being order 3, and that the maximum number of terms of the sum was equal to 3, all the terms being possibly negative.

This embodiment is made in the following manner:

The totalizer includes six addition triangles from $T_0$ to $T_5$, the transfers taking place from one triangle to the next one through the method above indicated;

Current is sent to one of the input contact studs 0, 1, 2 or 3 of triangle $T_0$ after having passed through a device $D^3$ capable of feeding current to one of said contact studs according as there are 0, 1, 2 or 3 subtractive terms, this device $D^3$, which thus makes it possible to add 1, 2 or 3 to the sum in order 0 effecting the operation set forth in the above paragraph 2.

For instance, such a device $D^3$ can be constituted by causing a brush 9317 to coact with four movable blades 9318⁰ to 9318³, mounted on the same frame 9332 of insulating material and respectively connected to the input contact studs 0 to 3 of said triangle $T^0$, said frame and brush 9317 being movable with respect to each other in such manner that current can be sent to one or the other of said contact studs. For instance, said brush may be stationary, the frame being movable and controlled in such manner that, under the action of the sign lever, every time said lever is moved, the whole of the frame is moved downwardly a distance equal to the space between two blades.

Then each triangle of an order higher than 3, that is to say triangles $T^4$ and $T^5$, is constituted by a group of seven blades numbered from 0 to 6, with which coacts a corresponding number of output brushes 9319 and four current intake brushes 9320, the latter serving to transfer 1, 2 or 3 units to the triangle that is considered. The whole is arranged, similarly to what was above stated concerning device $D^3$, in such manner that the whole of said blades can be displaced with respect to the current feed brushes, whereby it is possible to introduce one or several units into the triangle, according as there are one or more subtractive terms, the whole arrangement making it possible to perform the operation set forth in the above paragraph 3.

Finally, I cause to coact with the four contact studs 0 to 3, which would constitute the input contact studs of triangle $T^6$ if said triangle was materialized, a set of four brushes with respect to which said contact studs can be displaced, the upper brush 9321 being connected to a signal 9322 and the other brushes 9323 to a common signal 9324.

It will be readily understood that, every time a negative term is inscribed, contact studs 0 to 3 are moved one step toward the bottom of the figure, the upper brush 9321 coming on a contact stud the rank $k$ of which is equal to the number of negative terms, the other brushes being on contact studs of lower rank. From the preceding explanations, it results that, if the current leaves through brush 9321 and signal 9322, then the sum is positive, whereas, if the current leaves through one of the lower brushes and the other signal, then the sum is negative.

Of course, it is advantageous to arrange the device in such manner that the sign lever of each numeral device ensures the displacement of all the elements that are to be moved one step in the downward direction every time the term of the sum inscribed on said numeral device is negative, the above mentioned elements being the blades of device $D^3$, those of triangles $T^4$ and $T^5$, and finally the output contact studs 0 to 3 of the whole of the totalizer. For that purpose all of these parts are mounted on a common frame 9332.

Finally, this system is completed by balancing resistances disposed as above explained in the circuits which do not pass through the numeral device relays.

In order to better set forth the operation of said system, I have shown in dotted lines the path of the current corresponding to the production of a sum A—B—C, in which:

$$A=1011$$
$$B=011$$
$$C=101$$

As the number of subtractive terms is equal to two, the blades of device $D^3$ are moved two steps in a downward direction and current fed to the positive terminal is sent to the input contact stud 2 of triangle $T^0$. It leaves triangle $T^3$ through contact stud 4, which causes a transfer of 2 to triangle $T^4$ and as the blades of said triangle have also been displaced two steps in the downward direction, just as have those of triangle $T^5$, the corresponding brush 9320 sends current to the blade 4 of triangle $T^4$, which, in a similar manner causes a transfer of 2 to triangle $T^5$, from which said current flows out through blade 4, on its way to output contact stud 2 and signal 9322.

Therefore, the sum that is considered is positive.

If this sum had been negative and if it had been desired to translate it on an inscribing device of the dimensioned values indicating type, by means of a controlled reading device, it would have been necessary to perform the following operations:

On the one hand, to move forward one tooth in the direction of decreasing numbers slides of said reading device, the frame carrying the whole of the movable blades;

On the other hand, to interchange digits 0 and 1 of the number mechanically read on said rules, said interchange being for instance effected by means of a sliding action device such as that shown by Fig. 23, which device can be controlled either manually or in an automatic manner through a relay itself operated by the current flowing through the signal corresponding to sign minus for said sum.

Such a system has, among other advantages, that of comprising a much smaller number of relays than the reverser precedingly described, and that of making it possible to operate with several subtractive terms.

It should be noted that, if it is desired to keep, in the indication of the total, only the binary digits of an order at least equal to $m$, while taking into account the transfers produced by the elements of the terms of the algebraic sum of an order lower than $m$, it is sufficient to eliminate the windings of the circuits of odd rank from the addition triangles of an order lower than $m$, and, eventually the resistances of the corresponding circuits of even rank.

If, on the other hand, it is desired to complete the digit of order $m$, either to 0 or to 1, according as the number neglected by eliminating the total relays of an order lower than $m$ is smaller or equal to, or greater than one half-unit of order $m$, it is sufficient, in addition to the arrangement which has just been described, to connect each numbered contact stud of odd rank of the addition triangle of order $m-1$ to the same blade of the first switch of the addition triangle of order $m$ as the consecutive contact stud of even rank.

This method has been applied in the example precedingly considered, for neglecting the digits of an order lower than 1 and for rounding off to order 2 the digits present in orders smaller than 2.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for comparing with each other two numbers of the binary system, which comprises, in combination, two binary numeral devices including each a plurality of electric circuits, each corresponding to one of a sequence of binary orders, respectively and means for opening or closing said circuits, respectively, according to the representation, in each binary order, of the number to be expressed in the binary system by each of said binary numeral devices, two conductors corresponding each to one of said binary numeral devices respectively, a series of movable contact devices each associated with responsive to the opening and closing of two circuits of the same order of said numeral devices, respectively, and means for feeding electric current to the first of said series of contact devices, said contact devices being so constructed that each of them is adapted to transmit the current from the preceding one to the next one as long as the circuits corresponding to the contact device that is considered are either both open or both closed and to transmit the current to one of said conductors when one of the two last mentioned circuits is closed and the other open.

2. An apparatus for comparing with each other two numbers of the binary system, which comprises, in combination, two binary numeral devices including each a plurality of electric circuits, corresponding to a sequence of binary orders, respectively, a plurality of relays associated one with each of said circuits and responsive to the opening and closing thereof independently of the other circuits, respectively, and means for opening or closing said circuits, respectively, according to the representation, in each binary order, of the number to be expressed in the binary system by each of said binary numeral devices, a plurality of movable contact means associated with the relays of each numeral device, respectively, adapted to occupy either of two different positions according as the corresponding relay is energized or not, the successive contact means of both of said two respective binary numeral devices being alternately mounted in a single series so that the contact means corresponding to relays of the same order in both numeral devices are located immediately after each other and form a pair, two conductors corresponding each to one of said binary numeral devices, and means for feeding electric current to the first of said series of contact means, corresponding to the relay of the highest binary order, said contact means being so constructed that each of said pairs is adapted to transmit the current from the preceding pair to the next pair of contact means as long as the relays corresponding to said first mentioned pair are either both energized or both non energized, and to transmit the current to either of said conductors according as one of the two last mentioned relays is energized whereas the other is not.

3. In combination with a plurality of binary numeral devices, a relay totalizer for effecting the addition of at least two numbers of the binary system expressed by two of said numeral devices, which comprises, in combination, a plurality of addition triangles, corresponding each to a binary order, each addition triangle including a contact stud, two contact studs in a column, and three contact studs in a second column, at least two relays connected to the circuits of corresponding order of the numeral devices, switches adapted to be controlled by each said relays capable of connecting the first mentioned contact stud with either of the two studs of the first column, one of the studs of the first column with the first and second studs of the second column, and the other of the studs of the first column with the second and third studs of the second column, a source of current connected with the first mentioned contact stud, a total indicating binary numeral device comprising a relay for each order, means for electrically connecting each of said addition triangles with the relays of said total numeral device that are of the same order, and transfer means associated with the respective addition triangles and operatively connected to lower order triangles for operation thereby.

4. An apparatus for multiplying a binary number by another binary number, which comprises, in combination, two binary numeral devices for inscribing said two numbers, respectively, each of said numeral devices including a plurality of electric circuits, one for each order, respectively, means for connecting in series two by two the respective circuits of said binary numeral devices corresponding to orders the sums of which are equal to a given order of the product to form partial products, and a binary totalizer comprising a plurality of electrical devices connected to said plurality of circuits connected two by two in series having means for indicating the existence of one coefficient only of the product in any order and for transferring any part of a coefficient which is more than one to a higher order for adding up such partial products corresponding thereto.

5. An apparatus for multiplying a binary number by another binary number which includes, in combination, two binary numeral devices on which said numbers may be set respectively, each of said numeral devices including a plurality of electric circuits one for each order, a binary totalizer having addition triangles for different orders, means for operatively connecting the binary electric circuits in such a manner that when the two circuits corresponding to the two orders of the two factors of the product are not in a condition representing the coefficient one in such orders a unit is introduced to the addition triangle of the totalizer whose binary order is the sum of the binary orders of the two said circuits.

6. An apparatus for multiplying a binary number by another binary number, which comprises two binary numeral devices on which said numbers are set, each of said numeral devices including a series of elements one for each order capable of occupying two different positions corresponding respectively to the coefficients zero and 1 in each binary order, a binary totalizer having addition triangles in different orders, and means for operatively connecting the respective elements of the said binary numeral devices in such a manner that when the two elements corresponding to binary orders of two factors are in position representing coefficient 1 in such orders a unit is introduced into the addition triangle of the totalizer of the order which is the sum of the binary orders of the said two elements.

7. In an apparatus for calculating in the binary system, first and second binary numeral devices, an indicating means connected to the first device, means to drive said first device, a comparator operatively connecting said two devices, and means controlled by said comparator to control said driving means to drive said first device in one direction when the number set on the first devices is greater than that set on the second device and in the other direction when the number set on the first device is less than that set on the second device.

8. In an apparatus for calculating in the binary system, first and second binary numeral devices, an indicating means connected to the first device, means to drive said first device, a comparator operatively connecting said two devices, and means controlled by said comparator to control said driving means to drive said first device in one direction when the number set on the first device is greater than that set on the second device and in the other direction when the number set on the first device is less than that set on the second device, said comparator including first and second sets of relays each having one relay in each order connected to said first and second devices respectively, first and second terminals, and switches controlled by said relays to energize the first terminal when the first set contains an energized relay in a higher order in which both relays are not energized than the second set, the second terminal when the second set contains an energized relay in a higher order in which both relays are not energized than the first set, and neither of said first and second terminals when neither set contains an energized relay in an order in which both relays are not energized, said control means being connected to said terminals.

9. An apparatus for performing the division of a dividend number of the binary system by a divisor number also of the binary system which comprises, in combination, a binary multiplying device including first and second binary numeral devices upon the first of which the divisor is set, a comparator for binary numbers including third and fourth binary numeral devices upon the third of which the dividend is set, means for setting, on the second of the numeral devices, successive powers of 2, starting from the highest that can be set on said second numeral device, means for setting the result of the multiplication on the fourth numeral device, and means, controlled by said comparator, for controlling said first setting means to keep on the second numeral device only the powers of two that must be present in the quotient.

10. A device for translating a number marked in the binary system into a number marked in another numeration system, which comprises, in combination, a binary numeral device adapted to represent said number in the binary system, a second numeral device of a type corresponding to the other numeration system, a mechanism including a movable element the position of which corresponds to the value of a variable quantity, means for connecting said second numeral device with said mechanism in such manner that the number set on said second numeral device is equal to the number set on said mechanism, means to drive said mechanism, a comparator connected to said first numeral device and to said mechanism, and means controlled by said comparator to control said driving means to set said mechanism to a value corresponding to the value set on said first numeral device.

11. An apparatus for effecting an algebraic sum of numbers of the binary system, at least one of which is negative, which comprises, in combination, a binary totalizer, first and second binary numeral devices, at least one of said devices having means to signify that the number set thereon is negative, a mechanism connecting said totalizer to said one binary numeral device for transferring said negative number into its complement and subsequently entering said complement into the totalizer, control means for rendering said mechanism operative, said control means being responsive to said signifying means when a negative number is set, said mechanism including means for setting the absolute value of said negative number and replacing 1 by 0 and 0 by 1 in the number thus set and means for entering this number in the totalizer, and said mechanism further including means controlled by said signifying means for controlling the totalizer to add 1 in the zero order of the totalizer.

12. In a binary numeral calculating device, a single circuit in each binary order representing when energized one of the coefficients 0 and 1 in such order and when not energized the other of said coefficients, a single switch in such circuit for opening or closing the same to represent the selected coefficient in such order, a slide notched in conformity with values in the binary order, said switch having means engageable with said slide to sense the coefficient in the order and to set the switch in accordance with such coefficient.

13. In a binary calculating device, an inverter comprising first and second sets of relays each having one relay in each order respectively, means to energize the relays of the first set corresponding to the orders in which the number in question has a given coefficient, means operable when a negative number is set to energize the relays of corresponding order of the second set and to energize the relays of the first set, and means controlled by the energized relays of the second set to break the circuit to the relays of corresponding order of the first set while the remaining relays of the first set are energized.

PIERRE LOUIS COUFFIGNAL.